United States Patent [19]
Suda et al.

[11] Patent Number: 5,367,153
[45] Date of Patent: Nov. 22, 1994

[54] APPARATUS FOR DETECTING THE FOCUS ADJUSTING STATE OF AN OBJECTIVE LENS BY PERFORMING FILTER PROCESSING

[75] Inventors: Yasuo Suda; Akira Yamada; Yukio Odaka; Akira Akashi, all of Yokohama, Japan

[73] Assignee: Canon Kabushiki Kaisha, Tokyo, Japan

[21] Appl. No.: 969,352

[22] Filed: Oct. 30, 1992

[30] Foreign Application Priority Data

Nov. 1, 1991 [JP] Japan .................... 3-315503
Nov. 1, 1991 [JP] Japan .................... 3-315505

[51] Int. Cl.$^5$ .................................... G01J 1/20
[52] U.S. Cl. ........................... 250/201.8; 354/407
[58] Field of Search ............... 250/201.8, 201.2, 204; 354/406, 407, 408

[56] References Cited

U.S. PATENT DOCUMENTS

| | | | |
|---|---|---|---|
| 4,559,446 | 12/1985 | Suzuki | 250/204 |
| 4,734,571 | 3/1988 | Hamada et al. | 250/201.8 |
| 4,739,157 | 4/1988 | Akashi et al. | 250/201 |
| 4,792,668 | 12/1988 | Akashi et al. | 250/201 |
| 4,800,261 | 1/1989 | Akashi | 250/204 |
| 4,812,869 | 3/1989 | Akashi et al. | 354/408 |
| 4,833,313 | 5/1989 | Akashi et al. | 250/201 |
| 4,914,282 | 4/1990 | Akashi et al. | 250/201.8 |
| 5,022,555 | 4/1993 | Ishida et al. | 250/201.8 |
| 5,126,777 | 6/1992 | Akashi et al. | 354/402 |
| 5,191,201 | 3/1993 | Kusaka et al. | 250/201.8 |

FOREIGN PATENT DOCUMENTS

| | | | |
|---|---|---|---|
| 58-142306 | 8/1983 | Japan | G02B 7/11 |
| 59-107313 | 6/1984 | Japan | G02B 7/11 |
| 60-101513 | 6/1985 | Japan | G02B 7/11 |

*Primary Examiner*—David C. Nelms
*Attorney, Agent, or Firm*—Fitzpatrick, Cella, Harper & Scinto

[57] ABSTRACT

A focus detection apparatus includes an optical system for forming first and second optical distributions associated with object images whose relative positional relationship is changed in accordance with an imaging state of an imaging optical system subjected to focus detection, a photoelectric conversion element, having a plurality of picture elements, for outputting first and second signals respectively corresponding to the first and second optical distributions, and a calculating unit for performing filter processing of the first and second signals, sequentially displacing the first and second signals relative to each other on the calculation basis, calculating an evaluation amount representing a coincidence between the first and second signals at the relatively displaced positions, obtaining positional deviations between the first and second object images on the basis of a change in evaluation amount, and detecting the imaging state of the imaging optical system on the basis of the deviations. The filter processing is performed using a filter determined by the relatively displaced positions.

15 Claims, 47 Drawing Sheets

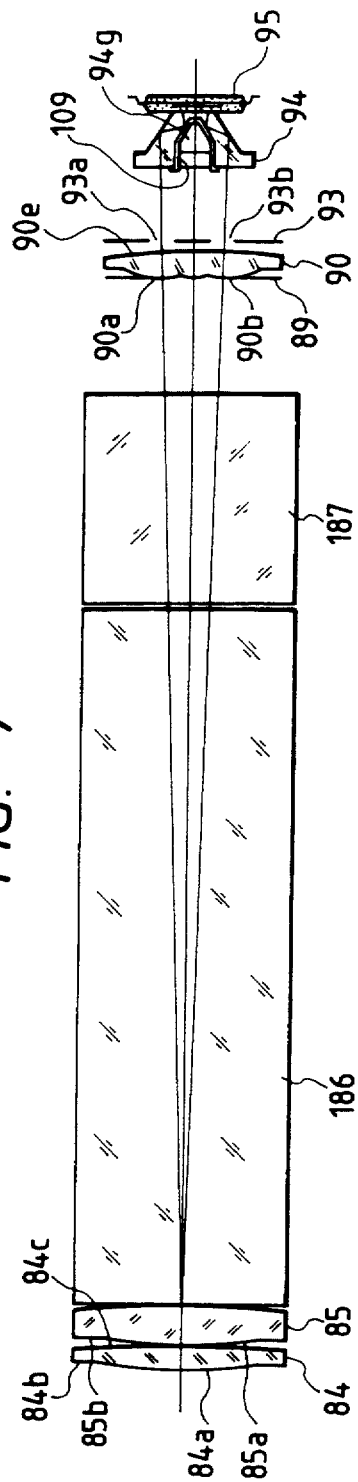
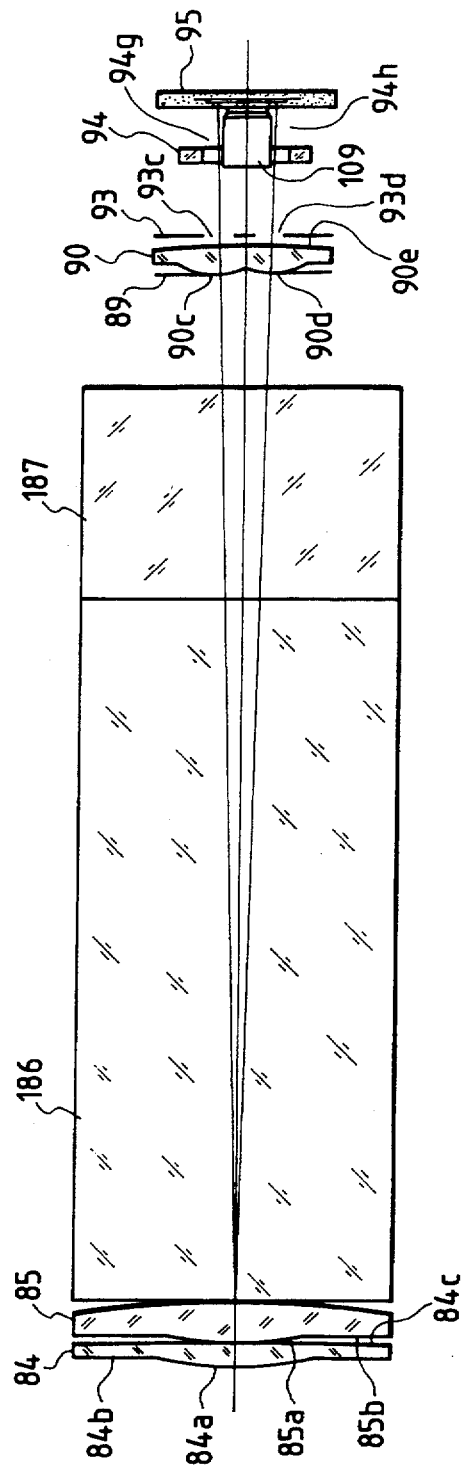

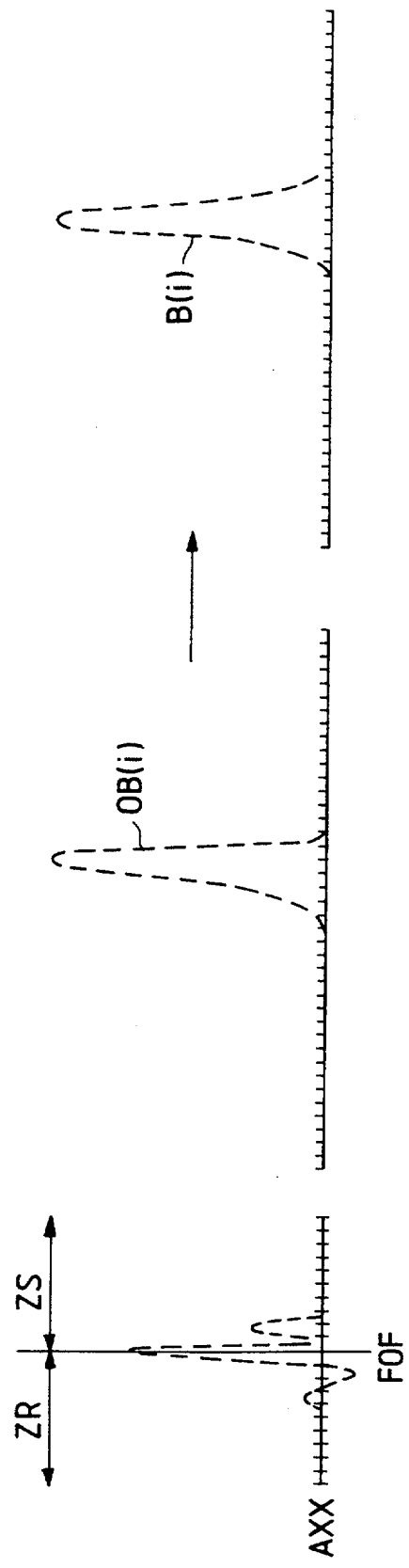

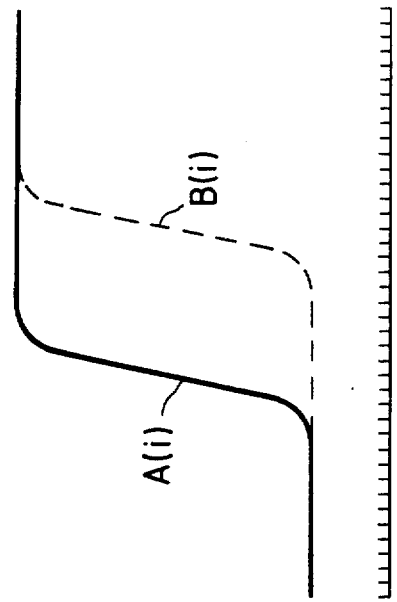
FIG. 25A
FIG. 25B

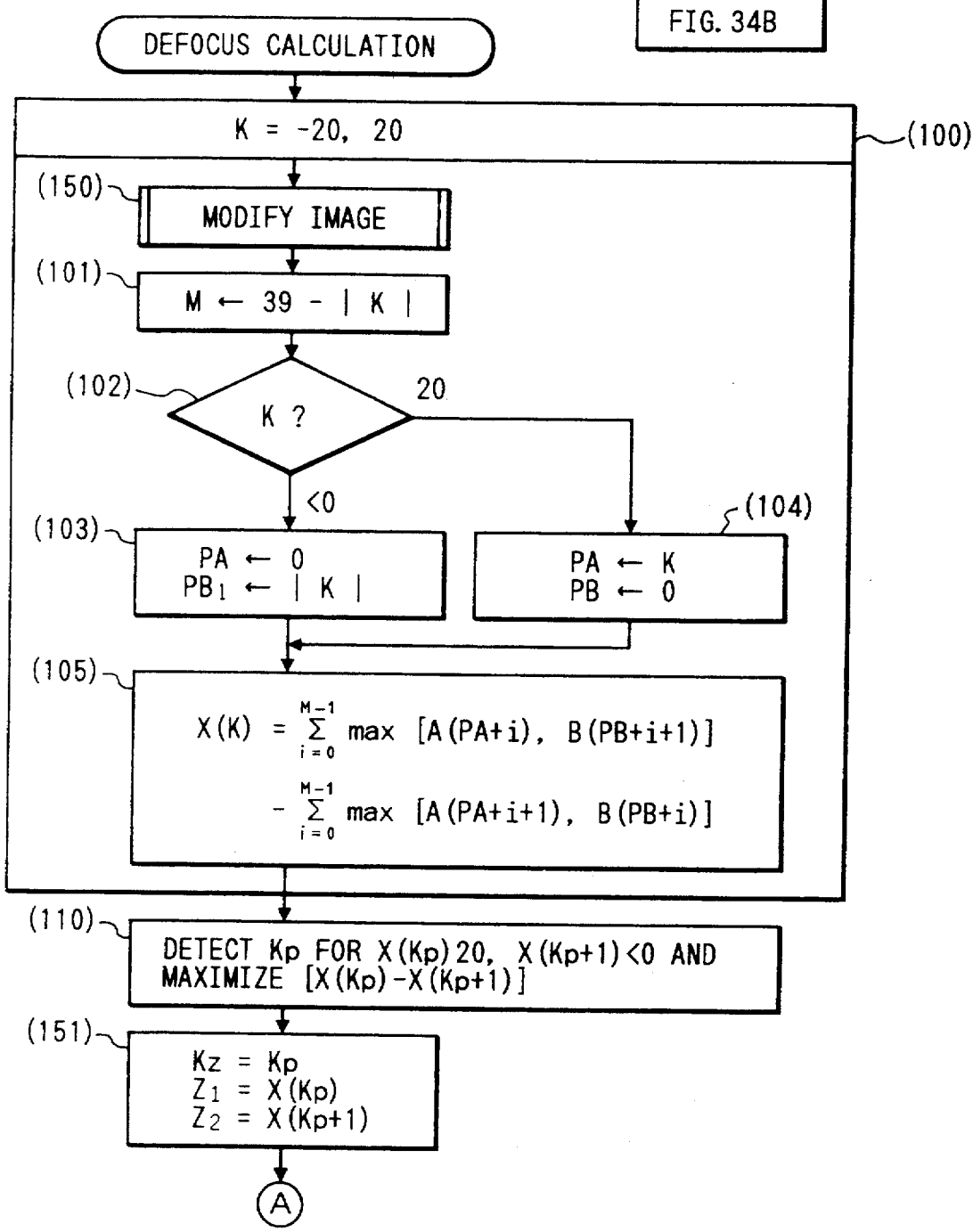

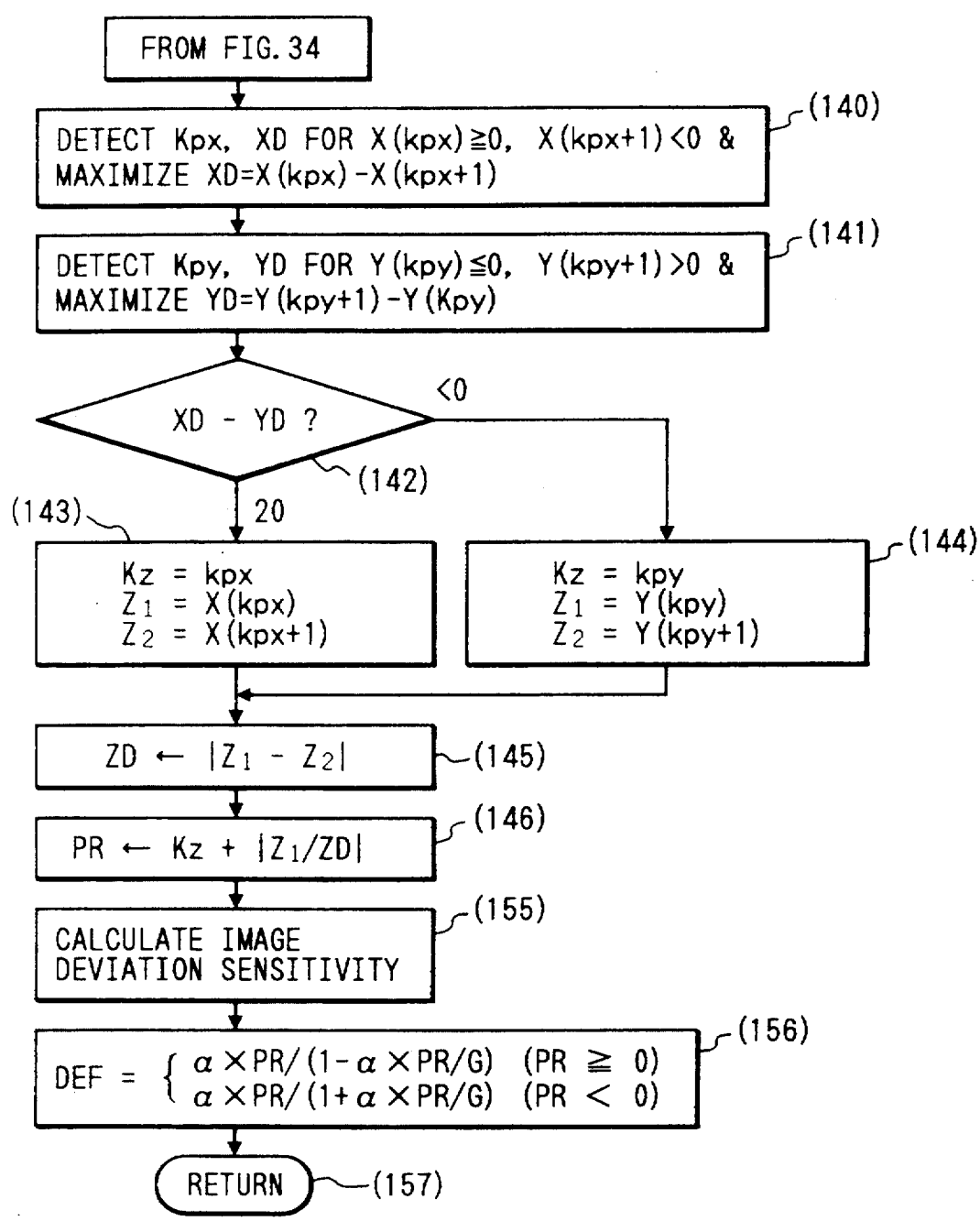

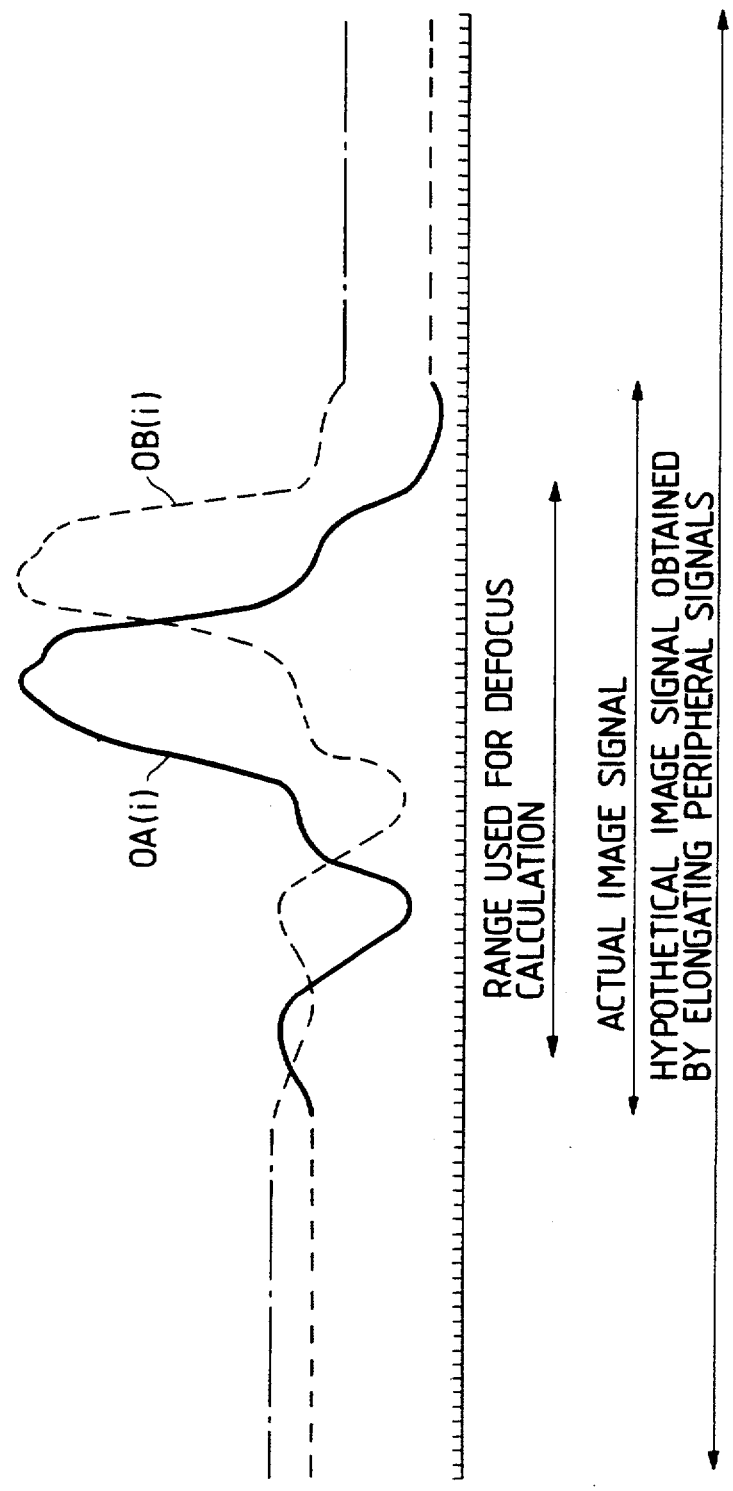

LINE-UP DIRECTION OF
PICTURE ELEMENTS

FILTER-1

FILTER-2

FOF

FOF

APPARATUS FOR DETECTING THE FOCUS ADJUSTING STATE OF AN OBJECTIVE LENS BY PERFORMING FILTER PROCESSING

BACKGROUND OF THE INVENTION

1. Field of the Invention

The present invention relates to a focus detection apparatus and, more particularly, to an improvement in a focus detection apparatus suitable for a photographic camera, a video camera, or the like to detect the imaging state of an imaging optical system in accordance with the relative positional relationship between two object images formed by a distance measuring optical system using a beam passing through a phototaking lens (imaging optical system).

2. Related Background Art

A focus detection apparatus of a so-called image correlation scheme as a conventional method of performing focus detection in a focus detection apparatus is disclosed in U.S. Pat. Nos. 4,559,446, 4,833,313, and many other patents. This scheme has an assumption that two object images (secondary images) to be compared with each other are identical images laterally deviated from each other. For this reason, the aperture ratio of the imaging optical system or the location of the distance measuring field is limited so as not to vignette a distance measuring beam.

High-pass filter processing is known to effectively improve precision of an image signal degraded by vignetting of the distance measuring beam. However, this processing mainly aims at eliminating small adverse influences of vignetting caused by manufacturing errors. The effect of high-pass filter processing cannot perfectly eliminate the limitations of the open f-number or allow free layout of the distance measuring field.

In a camera system obtained by applying this focus detection apparatus to, e.g., a single-lens reflex camera, open f-numbers of various phototaking lenses are assumed to be generally set to fall within the range from F1.0 to F8. For this reason, when this camera system is to be arranged as an auto-focus camera system, the open f-numbers of phototaking lenses used in the auto-focus operation are limited to ones smaller than F5.6. Alternatively, the distance measuring field is located at a position near the optical axis, e.g., a position within the range of 5 mm from the optical axis so as to reduce vignetting of the distance measuring beam. It is, therefore, very difficult to realize a camera system having an auto-focus mode which can use any kind of phototaking lens and can operate (distance measurement) in any area of the finder field.

The present invention is related to an improvement of the invention of U.S. Ser. No. 723,962 filed by the present applicant.

SUMMARY OF THE INVENTION

It is an object of the present invention to allow good focus detection by an apparatus for detecting the focus adjusting state of an objective lens on the basis of a relative positional deviation between a pair of optical distributions even if a detection beam is vignetted. In the present specification, the beam represents an invisible beam as well as a visible beam.

It is another object of the present invention to reduce limitations required to reduce the f-number of the objective lens in accordance with the f-number of a beam incident on a focus detection apparatus.

It is still another object of the present invention to provide a focus detection apparatus capable of reducing the aperture ratio of an imaging optical system, eliminating the limitations of the distance measuring field location, and performing high-precision focus detection by employing a filter having an appropriate arrangement although the distance measuring beam is slightly vignetted in focus detection using an image deviation scheme.

It is still another object of the present invention to provide a focus detection apparatus comprising a re-imaging optical system for forming first and second object images whose relative positional relationship is changed in accordance with an imaging state of an imaging optical system subjected to focus detection, photoelectric converting means, having a plurality of picture elements, for outputting first and second signals respectively corresponding to the first and second object images, and calculating means for performing filter processing of the first and second signals, sequentially displacing the first and second signals relative to each other on the calculation basis, calculating an evaluation amount representing a coincidence between the first and second signals at the relatively displaced positions, obtaining positional deviations between the first and second object images on the basis of a change in evaluation amount, and detecting the imaging state of the imaging optical system on the basis of the deviations, the filter processing being performed using a filter determined by the relatively displaced positions.

It is still another object of the present invention to provide a focus detection apparatus comprising a re-imaging optical system for forming first and second object images whose relative positional relationship is changed in accordance with an imaging state of an objective optical system subjected to focus detection, photoelectric converting means, having a plurality of picture elements, for outputting first and second signals respectively corresponding to the first and second object images, and calculating means for, when the first and second signals are sequentially displaced relative to each other on the calculation basis and an evaluation amount representing a coincidence between the first and second signals at the relatively displaced positions is calculated, performing filter processing of the first and second signals using a filter determined by the relatively displaced positions, obtaining deviations between the first and second object images on the basis of a change in evaluation amount, and detecting the imaging state of the imaging optical system, wherein (a) the calculating means has a first processing step of producing the filter from first original filter information and a second processing step for producing the filter from second original filter information, and further comprises selecting means for selecting one of the first and second processing steps in accordance with the relative displacement of the first and second signals, (b) the filter corrects the first and second signals even if the relative displacement is zero, (c) the filter has only a positive component in one direction and positive and negative components in the other direction with respect to an origin, and (d) the photoelectric converting means has picture elements used for the filter processing outside picture elements whose outputs are used to calculate the evaluation amount.

It is still another object of the present invention to provide a focus detection apparatus comprising a re-imaging optical system for forming first and second object images whose relative positional relationship is changed in accordance with an imaging state of an imaging optical system subjected to focus detection, photoelectric converting means, having a plurality of picture elements, for outputting first and second signals respectively corresponding to the first and second object images, and calculating means for, when the first and second signals are sequentially displaced relative to each other on the calculation basis and an evaluation amount representing a coincidence between the first and second signals at the relatively displaced positions is calculated, performing filter processing of the first and second signals, obtaining deviations between the first and second object images on the basis of a change in evaluation amount, and detecting the imaging state of the imaging optical system, wherein (e) the filter processing is performed using a filter determined in accordance with an aperture ratio of the imaging optical system subjected to focus detection, (f) the filter processing is performed using a filter determined in accordance with an exit pupil position of the imaging optical system subjected to focus detection, (g) the calculating means has the filter processing having an (A1)th processing process performed using the filter determined by the relative displacement and an (A2)th processing step performed next to the (A1)th processing step by using a specific filter without depending on the relative displacement, the specific filter in the (A2)th processing step being determined on the basis of the deviations obtained in the (A1)th processing step, (h) the calculating means has the filter processing having a (B1)th processing process performed using the filter determined by the relative displacement and a (B2)th processing step performed using a specific filter without depending on the relative displacement and comprises selecting means for selecting one of the (B1)th and (B2)th processing steps, (i) the filter processing is performed using a filter determined by a distance from an optical axis of the imaging optical system subjected to focus detection to a distance measuring field determined by the photoelectric converting means, and (j) the calculating means has a (C1)th processing step of performing filter processing of the first signal and a (C2)th processing step of performing filter processing of the second signal, the filter used in the (C2)th processing step being constituted by characteristics obtained by inverting the filter used in the (C1)th processing step.

BRIEF DESCRIPTION OF THE DRAWINGS

FIG. 7 is a sectional view showing a developed focus detection optical system in the short-side direction of the finder field;

FIG. 8 is a sectional view showing a developed focus detection optical system in the long-side direction of the finder field;

FIGS. 24A to 24C are views for explaining a defocused image and its correction filter, image data, and corrected image data;

FIGS. 25A and 25B are views for explaining correction of a general object image;

FIG. 34A and 34B are a flow chart of a "defocus calculation" subroutine;

FIG. 35 is a flow chart of the "defocus calculation" subroutine;

FIG. 40 is a view for explaining a state in which peripheral signals of image data are elongated;

DESCRIPTION OF THE PREFERRED EMBODIMENTS

Figure 1:
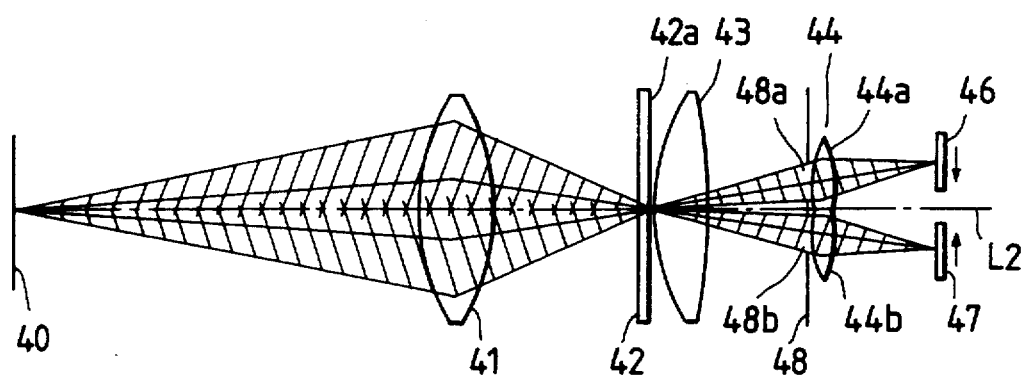
FIG. 1 is a sectional view of a focus detection optical system according to the present invention.

FIG. 1 shows the basic arrangement of a focus detection system in a focus detection apparatus according to the present invention. This embodiment is characterized in that a phototaking beam is aligned with a distance measuring beam to obtain an optimal in-focus position and is also in consideration of a spatial frequency included in an object image.

The arrangement of the focus detection system will be described below. Referring to FIG. 1, the object has an object surface 40. A diffusion plate 42 has a mat surface 42a having a fine three-dimensional pattern located near a prospective imaging plane of a phototaking lens 41. A field lens (condenser lens) 43 is located on the exit side of the diffusion plate 42. An aperture 48 has two openings 48a and 48b. A re-imaging lens (secondary imaging lens) 44 has two lens portions 44a and 44b located symmetrically about an optical axis L2 of the phototaking lens 41. The re-imaging lens 44 converges beams passing through the two aperture openings 48a and 48b to form secondary object images of the object on photoelectric element arrays 46 and 47 located behind the re-imaging lens 44. Photoelectric conversion outputs from the photoelectric conversion element arrays 46 and 47 are input to a microcomputer (to be described later) and used for focus detection of the phototaking lens.

The field lens 43 has a projection function for establishing a conjugate relationship between the aperture 48 and the exit pupil of the phototaking lens 41 if diffusion in the diffusion plate 42 is neglected. The diffusion characteristics of the diffusion plate 42 and the converging characteristics of the field lens 43 determine the area of the distance measuring beam passing through the exit pupil of the phototaking lens.

Figure 2:
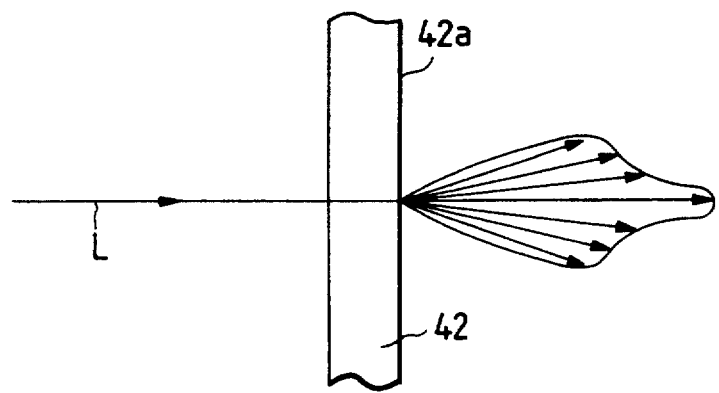
FIG. 2 is a view showing diffusion characteristics of a diffusion plate 42 in FIG. 1.

FIG. 2 is a view for explaining the diffusion characteristics of the diffusion plate 42. A beam L vertically incident from the phototaking lens 41 is diffused by the mat surface 42a on the re-imaging lens side. A straight incident component, which emerges at the same angle as the incident angle, is the strongest, and the intensity of light components is decreased away from the straight incident component. A beam incident from the phototaking lens side is readily understood to have a spread on the aperture 48 to some extent. A beam focused on a given point on the aperture 48 has a spread on the exit pupil to some extent in accordance with the principle of reverse light propagation.

Figure 3:
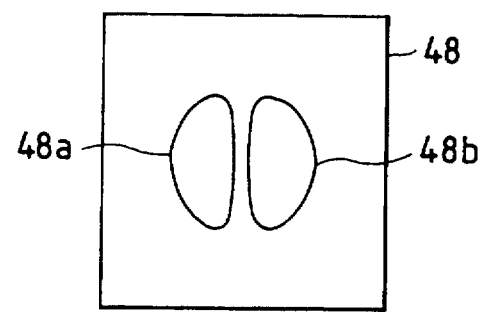
FIG. 3 is a plan view of an aperture 48 in FIG. 1.
Figure 4:
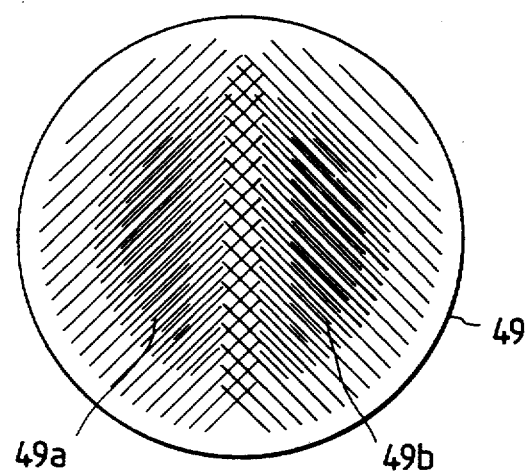
FIG. 4 is a view showing an aperture image on the exit pupil of a phototaking lens in FIG. 1.

FIGS. 3 and 4 are views for explaining the above phenomenon. FIG. 3 is a plan view of the aperture 48, and FIG. 4 is a view showing an image of the aperture 48 on the exit pupil of the phototaking lens 41. As shown in FIG. 3, the two aperture openings 48a and 48b have a shape obtained by dividing one circle into halves. The images of the aperture openings 48a and 48b are formed on the exit pupil of the phototaking lens 41. In this case, the resultant image has a blurred peripheral portion by the behavior of the diffusion plate 42. FIG. 4 schematically illustrates the blurred state.

Two opening images 49a and 49b in FIG. 4 are represented by lines hatched from the upper right side to the lower left side and lines hatched from the upper left side to the lower right side, respectively. These opening images partially overlap each other due to blurring. These two images spread entirely within the exit pupil. As a result, the distance between the centers of gravity of the aperture opening images 49a and 49b is set relatively small, and distance measuring beams can be incident from the large area of the exit pupil.

The principle of distance measurement in the focus detection apparatus having the above arrangement will be described below.

Figure 5A:
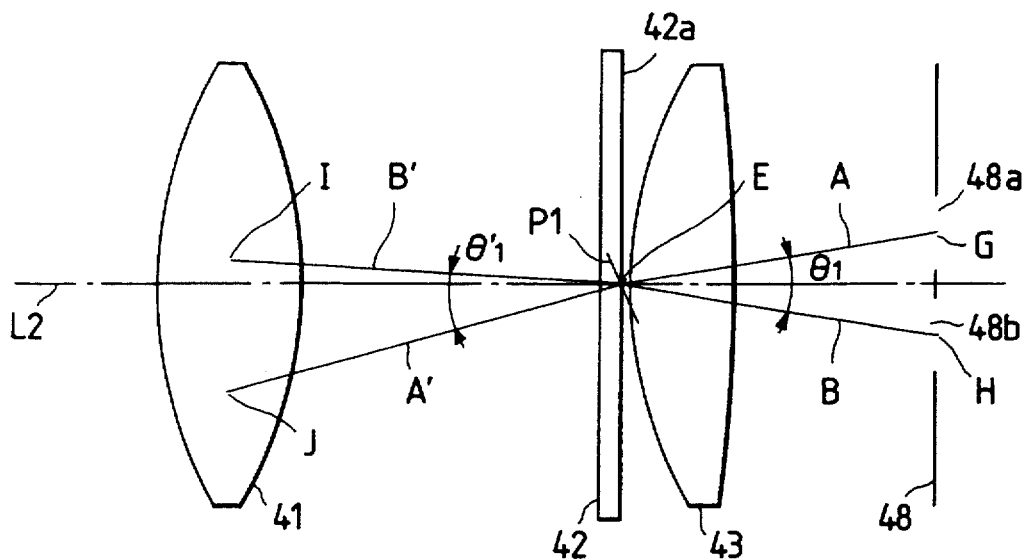
FIGS. 5A and 5B are views for explaining the principle of distance measurement in a focus detection apparatus.
Figure 5B:
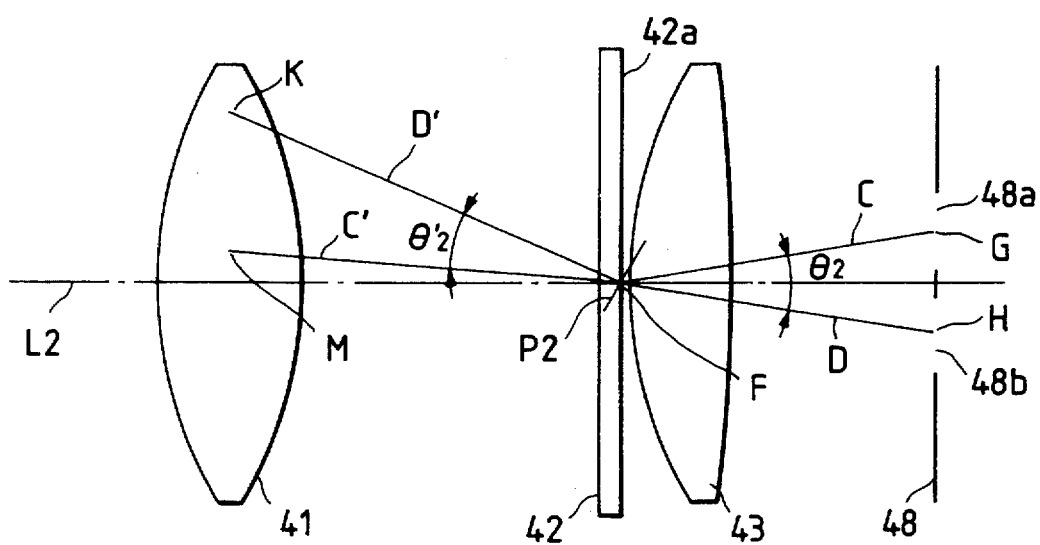

FIGS. 5A and 5B are views for explaining the above principle, showing the detailed arrangement from the phototaking lens 41 to the aperture 48. Strictly speaking, analysis by wave optics is required for diffusion on the mat surface 42a of the diffusion plate 42. However, an opto-geometric description will be made as an explanation similar to the analysis by wave optics.

Assume two beams A and B passing through optical paths connect points G and H in the aperture openings 48a and 48b and a point E on the optical axis of the mat surface 42a in FIG. 5A. For descriptive convenience, assume that the condenser lens 43 is thin and is adjacent to the mat surface 42a. An angle defined by lines connecting the point E to the points G and H on the openings of the aperture 48 is defined as $\theta 1$. Since the mat surface 42a is a diffusion surface, it is a continuous, fine three-dimensional pattern. If a plane tangential to the point E of the mat surface 42a is defined as a plane P1, the beams A and B are refracted at the point E into beams A' and B'. Points at which the two diffracted beams reach on the exit pupil of the phototaking lens 41 are defined as I and J, respectively.

A point F is set very close to a point E on the optical axis of the mat surface 42a in FIG. 5B, and the behavior of the beam at the point F will be taken into consideration in the same manner as in FIG. 5A. A plane tangent to the point F is defined as a plane P2, and an angle defined by lines connecting the point F to points G and H on the aperture openings is defined as $\theta 2$. Two beams C and D passing through the lines connecting the point F to the points G and H on the openings of the aperture 48 are diffracted into beams C' and D' in the same manner as in FIG. 5A. Points at which the two diffracted beams reach on the exit pupil of the phototaking lens 41 are defined as K and M, respectively.

The thickness of the focusing screen 42 is neglected, and angles between the points I and J and between the points K and M on the exit pupil of the phototaking lens 41 with respect to the points E and F are respectively defined as $\theta 1'$ and $\theta 2'$. The point E is very close to the point F. If the angles $\theta 1'$ and $\theta 2'$ and the inclination angles of the tangential planes are very small, the following relation can be approximated:

$$\theta 1' \simeq \theta 2'$$

When the angle defined by the lines connecting the intersection between the optical axis and the mat surface 42a to the points on the two aperture openings is small, the lengths of the distance measuring base lines of the beams diffracted within a given range are identical. The diffusion characteristics (FIG. 2) of the mat surface indicate that various planes tangent to the point E are opto-geometrically present, and the diffusion characteristics are the total characteristics obtained from the various planes. The diffusion characteristics of the mat surface fall within a given range in relation to the light amount, and explanation with reference to FIGS. 5A and 5B can be applied to all these tangential planes.

For the sake of descriptive simplicity, the description of FIGS. 5A and 5B has been made for distance measurement of a point on the optical axis. It is apparent that the same description as for FIGS. 5A and 5B can be applied to any point outside the optical axis. The distance measuring base line length in the focus detection apparatus of the present invention is determined by the distance between the openings of the aperture 48 and is not influenced by the characteristics of the diffusion plate.

The focus detection operation is basically identical to that of the conventional focus detection apparatus having no diffusion plate due to the above nature. For example, when the phototaking lens 41 is extended to the left in FIG. 1 to set a so-called front-focus state, the object images projected on the light-receiving surfaces of the photoelectric conversion element arrays 46 and 47 by the re-imaging lenses 44a and 44b are deviated in a direction indicated by an arrow. The front-focus state and its amount can be detected in accordance with changes in outputs from the photoelectric conversion element arrays 46 and 47, which changes correspond to a relative deviation between the object images. In the rear-focus state, the object images are deviated in a direction opposite to that in the front-focus state. The rear-focus state and its amount can be detected in the same manner as described above.

As described above, in the focus detection apparatus, by using the diffusion plate, a distance measuring beam having an intensity corresponding to a small f-number can be received without excessively increasing the distance measuring base line length. An optimal focus position corresponding to the spatial frequency of the object image can be detected. As will be described below, the focusing screen of a single-lens reflex camera can be used as the diffusion plate.

Figure 6:
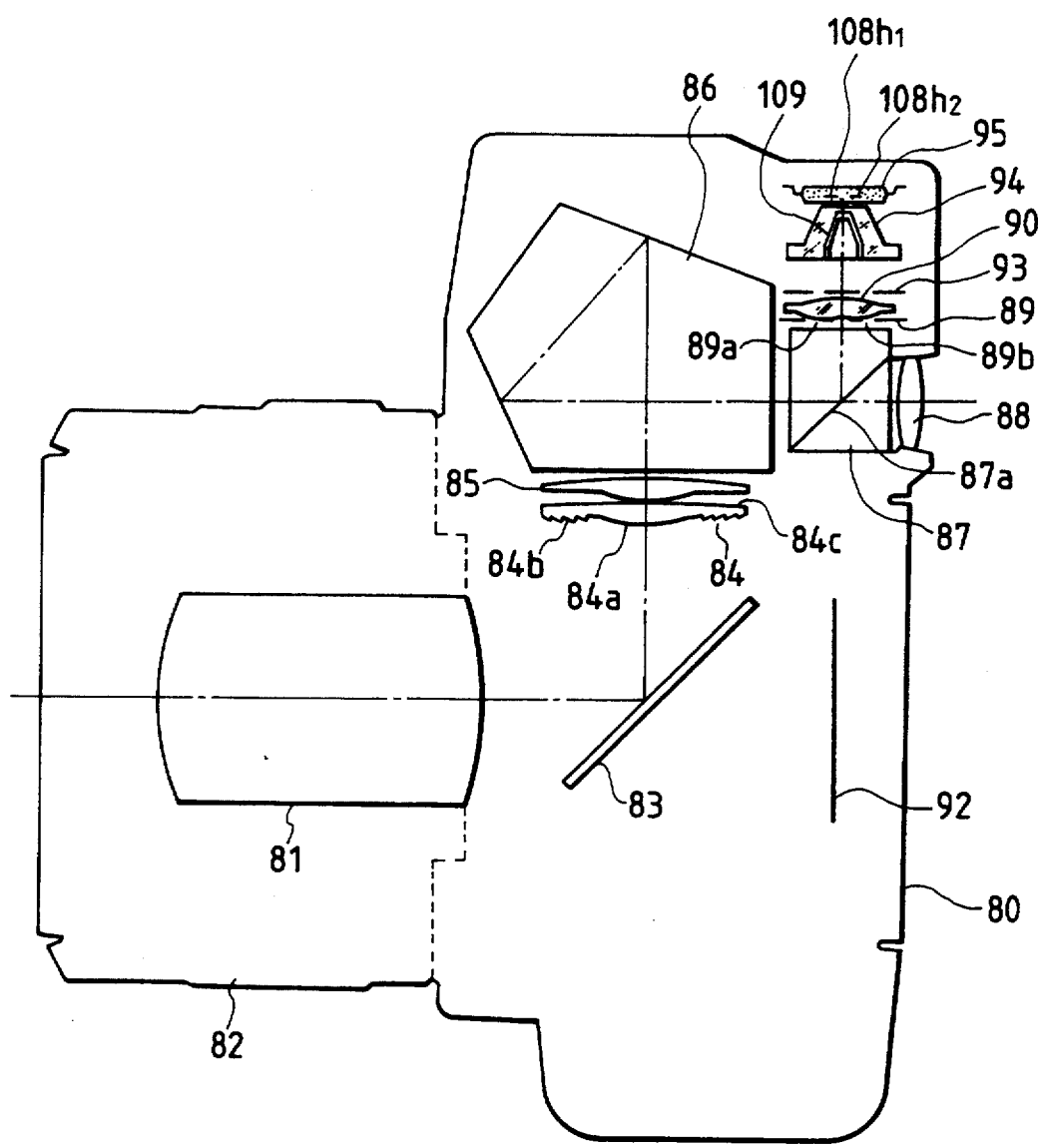
FIG. 6 is a sectional view showing a single-lens reflex camera which incorporates the focus detection apparatus.

FIG. 6 is a schematic view showing the main part of a single-lens reflex camera which employs the focus detection apparatus according to the present invention.

The camera has a single-lens reflex camera body 80. A phototaking lens 81 is mounted to be movable in a direction of the optical axis of a lens barrel 82. A movable mirror 83 is set in a mirror down state when the photographer observes an object. In this state, a beam from the phototaking lens 81 is deflected upward and guided to a finder and a focus detection system of the present invention. The movable mirror 83 is set in a mirror up state immediately before the start of exposure of a photographing film 92 in the phototaking mode so as not to vignet the beam from the phototaking lens. At the end of exposure, the movable mirror 83 returns to the mirror down state shown in FIG. 6.

The finder and the focus detection system will be described below. An object image is projected from the phototaking lens 81 on a focusing screen 84. The focusing screen 84 diffuses the distance measuring beam. The camera also includes a condenser lens (field lens) 85, a pentagonal prism 86, a beam splitter 87 for splitting the beam toward the focus detection system, and an eyepiece lens 88. A spherical surface portion 84a is formed on the beam incident surface of the focusing screen 84 to cause the beam to impinge, at almost a right angle, on a mat surface 84c foraged on the light exit surface of the focusing screen 84. A Fresnel lens 84b is formed in the peripheral portion serving as the range outside the distance measuring field. The mat surface 84c has a convex surface portion corresponding to the spherical surface portion 84a to correct the curvature of a prospective imaging plane. The beam diffused by the mat surface 84c is diffracted by the condenser lens 85 located behind the mat surface 84c so as to match the location of the eyepiece lens 88. The beam passes through the pentagonal prism 86 and a half mirror surface 87a of the beam splitter 87 and is deflected in a direction toward the eyepiece lens 88. The beam passing through the eyepiece lens 88 reaches eyes of the observer.

The beam splitter 87, located in front of the eyepiece lens 88, causes the half mirror surface 87a to reflect part of the beam supposed to reach the eyepiece lens 88 upward. The reflected beam is utilized for focus detection. The components from a light-shielding mask 89 belong to the focus detection system. The focus detection system includes a secondary imaging lens (re-imaging lens) 90 comprising a transparent plastic material, an aperture 93, a light guide prism 94, and photoelectric conversion element (picture element) arrays 108, 108h1 and 108h2 each made of a large number of picture elements. These picture element arrays are held by a transparent plastic package 95. The aperture 93 is projected on the exit pupil of the phototaking lens 81 by the secondary imaging lens 90, the condenser lens 85, and the spherical surface portion 84a of the focusing screen 84. The secondary imaging lens 90 serves to project the mat surface 84c of the focusing screen on the photoelectric transducer element arrays 108h1 and 108h2. The projected image of the object spreads and is blurred by the diffusion behavior of the mat surface 84c in the same manner as described with reference to FIG. 1.

FIGS. 7 and 8 are developed views of the focus detection optical system having the above structure along the optical axis. FIG. 7 shows the section in the short-side direction of the finder field, whereas FIG. 8 shows the section in the long-side direction of the finder field. Equivalent flat parallel members 186 and 187 have optical path lengths equal to that obtained by developing the pentagonal prism 86 and the beam splitter 87 along the optical paths, respectively.

The condenser lens 85 has a function of brightening the entire finder field by establishing the relationship of mutual projection between the exit pupils of the eyepiece lens 88 and the phototaking lens 81 with respect to the observation system and a function of widening the distance measuring field by establishing the relationship of mutual projection between the exit pupils of the aperture 93 and the phototaking lens 81 with respect to the focus detection system. These functions can be achieved by locating the eyepiece lens 88 and the aperture 93 at almost optically equivalent positions.

Upon establishment of these two functions, in the relationship of mutual projection with respect to the focus detection system, the distortion of the detection system adversely affects detection precision. Therefore, it is difficult to limit the curvature of each of the surfaces of the condenser lens 85. On the other hand, in the relationship of mutual projection with respect to the observation system, the curvature may be limited to some extent if a predetermined power can be obtained, thereby intentionally obtaining an arbitrary value. In order to arrange a compact camera by utilizing this characteristic, the first surface of the condenser lens 85 is constituted by two curvature portions.

Figure 9:
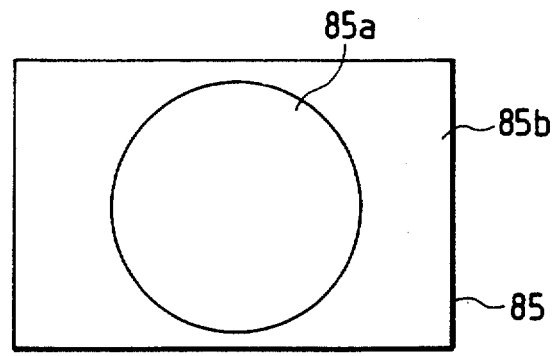
FIG. 9 is a plan view of a condenser lens 85.
Figure 10A:
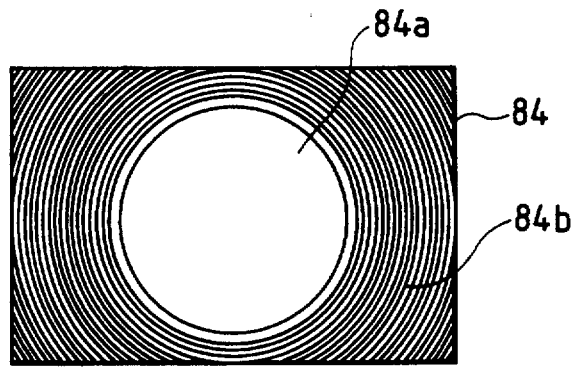
FIGS. 10A and 10B are views for explaining a focusing screen 84.
Figure 10B:
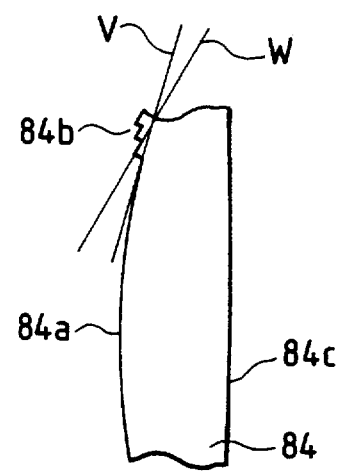

FIG. 9 is a plan view showing this state when the condenser lens 85 is observed from the light incident direction. The condenser lens 85 has a spherical surface portion 85a and a flat surface portion 85b. The diameter of the spherical surface portion 85a is determined so that the distance measuring beam passes through the range defined by this diameter. The outer flat surface portion is obtained by limiting the surface in view of the observation system. When the flat surface portion is formed in the peripheral portion of the condenser lens 85 as described above, the thickness of the condenser lens can be much smaller than that of a condenser lens having a curvature on the entire light incident surface. In this case, although the boundary between the spherical surface portion 85a and the flat surface portion 85b becomes discontinuous, discontinuity of refracting powers is different depending on areas can be eliminated by properly selecting the shape of the focusing screen 84. FIG. 10A is a plan view of the focusing screen 84 when viewed from the light incident direction, and FIG. 10B is a sectional view thereof. As shown in FIG. 10A, the focusing screen 84 is also constituted by two areas, i.e., the spherical surface portion 84a and the Fresnel lens portion 84b. The boundary between the two areas of the condenser lens 85 overlaps that of the focusing screen 84 when the photographer observes an image in the finder through the eyepiece lens 88 from the reference position on the optical axis.

FIG. 10B shows the section of the focusing screen 84, as described above. As can be apparent from two tangents V and W in FIG. 10B, the Fresnel portion 84b is added to the spherical surface portion 84a. For this reason, the refracting power of the Fresnel portion 84b is higher than that of the spherical surface portion 84a. As a result, a decrease in refracting power of the flat surface portion 85b of the condenser lens 85 in correspondence with the spherical surface portion 85a can be compensated. That is, in order to satisfy the relationship of mutual projection in the observation system with respect to the eyepiece lens system in the entire field, a total refracting power of the spherical surface portion 84a of the focusing screen 84 and the corresponding spherical surface portion 85b of the condenser lens 85 is set equal to that of the Fresnel portion 84b of the focusing screen 84 and the flat surface portion 85b of the condenser lens 85 with respect to the exit surface of the condenser lens 85.

Figure 11:
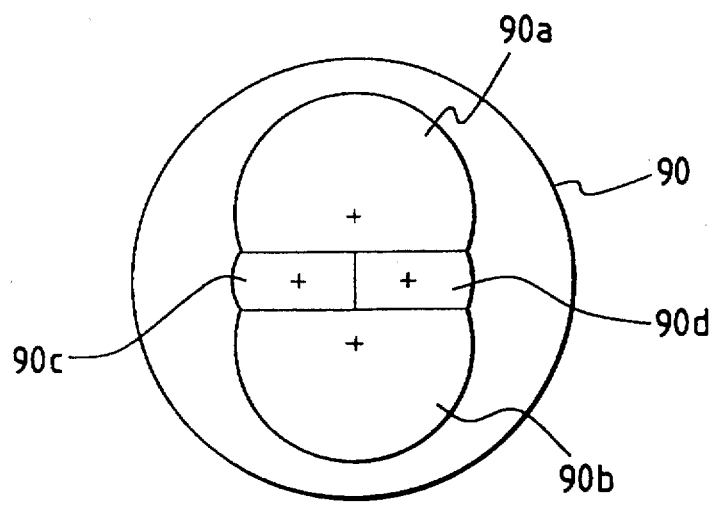
FIG. 11 is a plan view showing the shape of a re-imaging lens 90 when viewed from the light incident surface.

The imaging relationship of the focus detection system will be supplementarily described with reference to FIGS. 7 and 8 again. The secondary imaging lens 90 is a kind of double-convex multilens obtained such that two pairs of lens portions are integrally formed to constitute a light incident surface and a light exit surface has a curved surface coaxial with the optical axis of the phototaking lens. FIG. 11 shows the shape of the secondary imaging lens 90 when viewed from the light incident direction. Upper and lower lens portions 90a and 90b are located to sandwich central lens portions 90c and 90d. The lens portions 90a and 90b and the lens portions 90c and 90d are paired in the multilens to form two pairs of object images whose relative positions are changed in correspondence with an imaging state of the phototaking lens 81. These lens portions of the multilens are entirely constituted by spherical surfaces. The center of sphere is set such that beams passing through the centers of gravity of the four openings of the aperture 93 from the optical axis position of the mat surface 84c of the focusing screen 84 are incident almost perpendicularly to the lens portions respectively corresponding to the openings.

A light exit surface 90e of the secondary imaging lens 90 is a spherical surface common to the lens portions 90a to 90d. The optical axis of the light exit surface 90e is common to the phototaking lens 81. The center of sphere of the light exit surface 90e is located at an optically equivalent position close to the mat surface 84c of the focusing screen 84 serving as the object plane with respect to the secondary imaging lens 90. When the optical path length between the pentagonal prism 86 and the beam splitter 87 is measured in air, the center of the mat surface 84c almost coincides with the center of sphere of the light exit surface 90e of the secondary imaging lens 90. As described above, the four beams entering from the optical axis position of the mat surface 94c of the focusing screen 84 are vertically incident on the lens portions 90a to 90d even on the incident side in the secondary imaging lens 90, thereby obtaining an optical system wherein the four beams almost vertically emerge from the exit surface 90e as the main characteristic feature of this embodiment.

As described above, the secondary imaging lens 90 is arranged such that rays entering from the center of the focusing screen 84 and passing through the centers of gravity of the openings of the aperture 93, that is, rays passing through the centers of gravity of the beams passing through the lens portions 90a to 90d are guided to the photoelectric conversion element arrays 108. This indicates that the distance between two images constituting a pair can be very small even if the wavelength of light from the object is variously changed. Therefore, detection errors corresponding to the colors of the object, which are caused by influences of the chromatic aberration of the focus detection system can be almost eliminated.

When the optical system having the arrangement according to the present invention is employed, it is preferable to set an imaging magnification of the secondary imaging lens 90 within the range of about −0.2 to −0.5 so as to increase the distance measuring field while the chip area of the photoelectric conversion element arrays 108 is kept small. The arrangement shown in FIGS. 7 and 8 has an imaging magnification of about −0.2. In order to generally arrange this reduction imaging system by one convex lens, it is known that the curvature of the light incident surface is increased and the curvature of the light exit surface is decreased according to the aberration sharing rule, thereby reducing the size of a projected point image with a small aberration. As shown in FIGS. 7 and 8, the light exit surface 90e of the secondary imaging lens 90 is common to the lens portions on the incident side. In addition, since the center of sphere of the light exit surface 90e is optically very close to the mat surface 84c, the light exit surface 90e can have only a small curvature. On the other hand, the curvature of the small-diameter lens portions of the multilens is increased to compensate for a small curvature thereof on the exit side so as to maintain a given imaging magnification. In this sense, the embodiment shown in FIGS. 7 and 8 is based on the aberration sharing rule, thereby realizing a small point image. The small point image in the focus detection optical system indicates that distance measurement of a finer pattern can be performed, thereby contributing to the improvement of the detection performance.

The two pairs of positions of the light amount distributions of the object and the positions of the photoelectric conversion element (pixel element) arrays must be aligned with a precision of several μm or less so as to satisfy the distance measuring precision of the camera. The most important problem in the manufacture of a system using the secondary imaging lens integrally having the two pairs of lens portions and the photoelectric conversion element arrays arranged on a single chip is concentrated on the optical axis alignment within the secondary imaging lens. According to this embodiment, the light exit surface of the secondary imaging surface is constituted by a single spherical surface common to the two pairs of lens portions, thereby solving the above problem.

The plastic secondary imaging lens is manufactured by injection molding or compression molding. In this case, deviations between the light incident surface and the light exit surface of each secondary imaging lens element, and deviations between the secondary imaging lens elements cause a serious problem. In particular, when two pairs of second imaging lens elements are used as in the present invention, and the optical axes of the four secondary imaging lens elements are different on both the incident and exit sides, it is very difficult to achieve given alignment precision between the incident and exit sides. Components of mutual rotation of the portions constituting the light incident and exit surface portions of the molds require strict precision. If errors occur in these components, deformation of images of the secondary imaging lens elements is complicated by the aberration. As a result, point images of the secondary imaging lens elements for forming paired images cannot be similar to each other.

Upon focus detection, the object image from the phototaking lens 81 is formed as pairs of images respectively on the photoelectric conversion element arrays by the system through the secondary imaging lens 90. When the phototaking lens 81 is extended to the left in FIGS. 7 and 8 to set a front-focus state, the pair of object images formed on the light-receiving surfaces of the photoelectric conversion element arrays are deviated to come close to each other. The front-focus state and its amount are detected in accordance with changes in outputs from the photoelectric conversion element arrays in correspondence with the relative deviation between the images. In the rear-focus state, the pair of images are deviated in the direction opposite to that in the front-focus state. The rear-focus state and its amount can be detected in the same manner as in the front-focus state.

As described above, focus state detection is performed in accordance with the distance between the pair of images. This distance between the pair of images is directly represented as a distance measuring error. As in this embodiment, when the light exit surface is a spherical surface common to all the beams, mutual rotation does not adversely affect the precision, thereby facilitating its manufacture.

Figure 12:
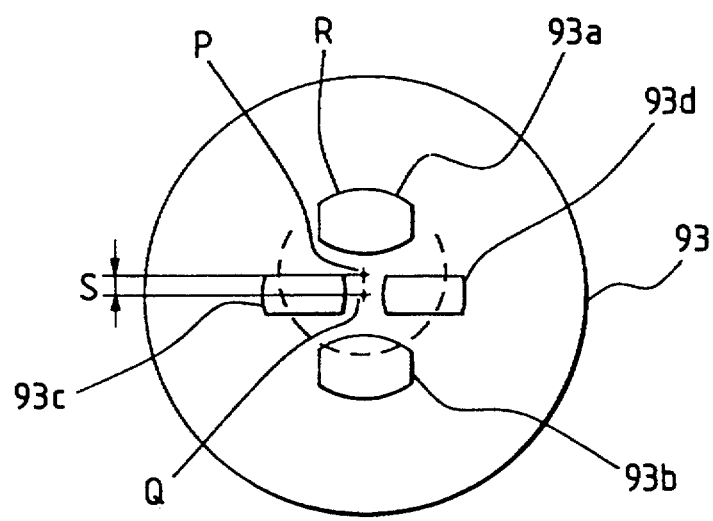
FIG. 12 is a plan view of an aperture 93.

The beams passing through the secondary imaging lens 90 are incident on the aperture 93 located behind the secondary imaging lens 90. As shown in FIGS. 7 and 8, the aperture 93 is located to be slightly spaced apart from the secondary imaging lens 90 and has two pairs of openings corresponding to the lens portions constituting the secondary imaging lens 90. FIG. 12 is a plan view of the aperture 93, showing the shapes of the openings. Openings 93a and 93b and openings 93c and 93d of the aperture 93 are paired to respectively correspond to the secondary imaging lens portions 90a and 90b and the secondary imaging lens portions 90c and 90d. The distance between the centers of gravity of the openings corresponds to the distance measuring base line length. As is apparent from FIG. 12, the distance measuring base line length determined by the openings 93a and 93b is larger than that determined by the openings 93c and 93d according to the characteristic feature of this embodiment. By utilizing this, the chip area of the photoelectric transducer element arrays can be reduced, and the system can be made compact as a whole.

Each of the four openings 93a to 93d has a shape surrounded by two arcs. The shape of the outer arc is set such that an image thereof projected on the exit pupil of the phototaking lens 81 through the spherical surface portion 84a, the condenser lens 85, and the secondary imaging lens 90 has the shape of an arc having its center on the optical axis of the phototaking lens 81. The inner arc is determined by translating the outer arc of one opening of the paired openings toward the other opening of the paired openings, thereby obtaining identical shapes of the paired openings. The shapes of the effective diameters of the paired secondary imaging lens portions coincide with each other on the phototaking lens 81. Even if the object image is defocused within the range in which the distance measuring beam is not vignetted, the similarity of the light amount distributions is not disturbed.

Figure 13:
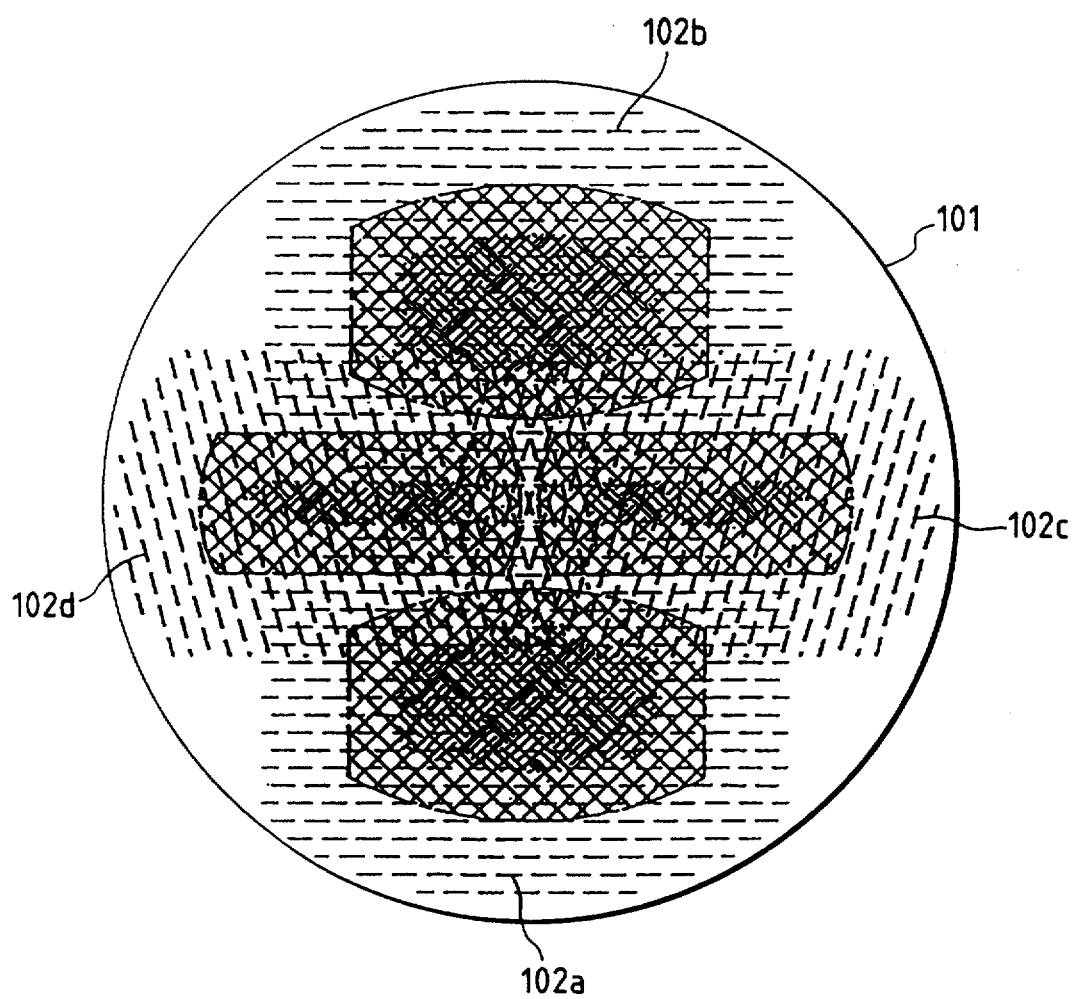
FIG. 13 is a view for explaining an image projected from aperture openings.

The shape of the outer arc of the aperture 93 should be noted. Since the secondary imaging lens 90 is a decentered system with respect to the phototaking lens 81, the center of the outer arc of the aperture 93 is different from the point Q at which the optical axis of the phototaking lens 81 crosses the aperture 93. Referring to FIG. 12, the center of the outer arc R of the opening 93a is given as P and is deviated from the intersection Q with the optical axis of the phototaking lens 81 by a length S. The outer arc is so decentered that an image thereof projected on the exit pupil of the phototaking lens 81 through the lens portion (spherical portion) 90a or the like of the secondary imaging lens 90 has a shape having its center on the optical axis of the phototaking lens 81, thereby most effectively receiving the beam. FIG. 13 is a view for explaining projected images of the aperture openings. The phototaking lens 81 has an exit pupil 101, and projected images 102a to 102d of the aperture openings 93a to 93d are formed. The distance between the paired aperture openings corresponds to the distance measuring base line length. Since the mat surface 84c of the focusing screen 84 is located within the optical path, the images of the openings of the aperture 93 are blurred and spread in accordance with the diffusion characteristics shown in FIG. 2. The hatched portions in FIG. 13 represent blurring. The aperture 93 is located behind the secondary imaging lens 90 to improve uniformity of the field angle of the point image.

Figure 14:
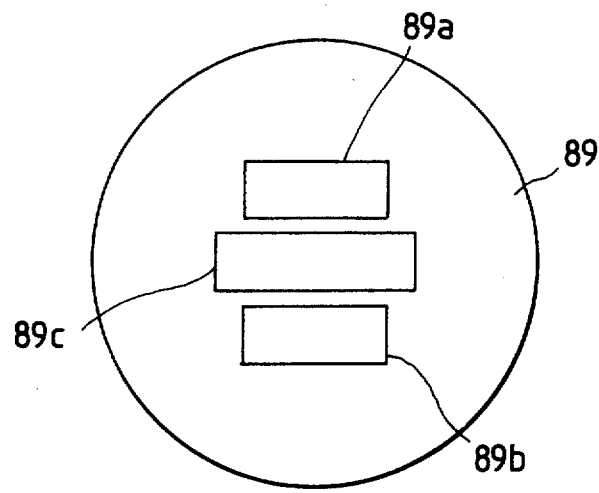
FIG. 14 is a plan view of a light-shielding mask 89.

FIG. 14 shows the shape of the light-shielding mask 89 located immediately before the secondary imaging lens 90. The light-shielding mask 89 has three openings 89a to 89c, and the remaining portion of the mask 89 serves as a light-shielding portion. The light-shielding effect of the light-shielding mask 89 can prevent production of ghosts caused by the bonding portions of the lens portions 90a to 90d of the secondary imaging lens 90.

Figure 15:
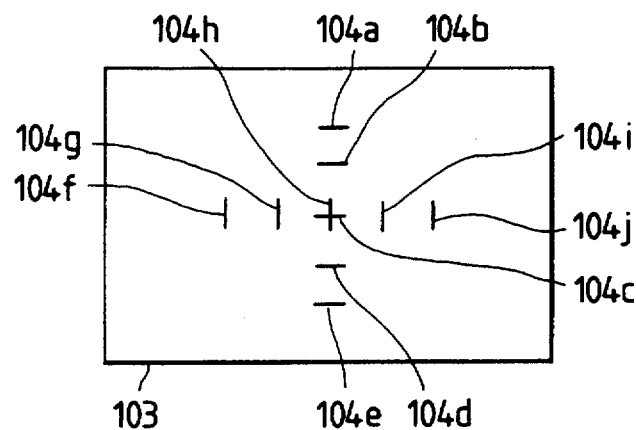
FIG. 15 is a view showing the positional relationship between a phototaking frame and a distance measuring field.

Since the focus detection optical system described in this embodiment is arranged through the pentagonal prism 86, the overall length of the focus detection optical system is large, as described above. On the other hand, in order to improve distance measuring precision, the distance between the centers of gravity of the openings 93a to 93d must be large. As a result, a pair of light amount distributions corresponding to an object are formed to be spaced apart from each other. FIG. 15 shows the relationship between the distance measuring field and the phototaking frame. When distance measuring fields 104a to 104j are arranged in a crossed shape in a phototaking frame 103 and are simply projected by the secondary imaging lens 90, secondary object images are formed to be considerably spaced apart from each other, thus requiring a large space for the arrangement of picture elements.

Figure 17:
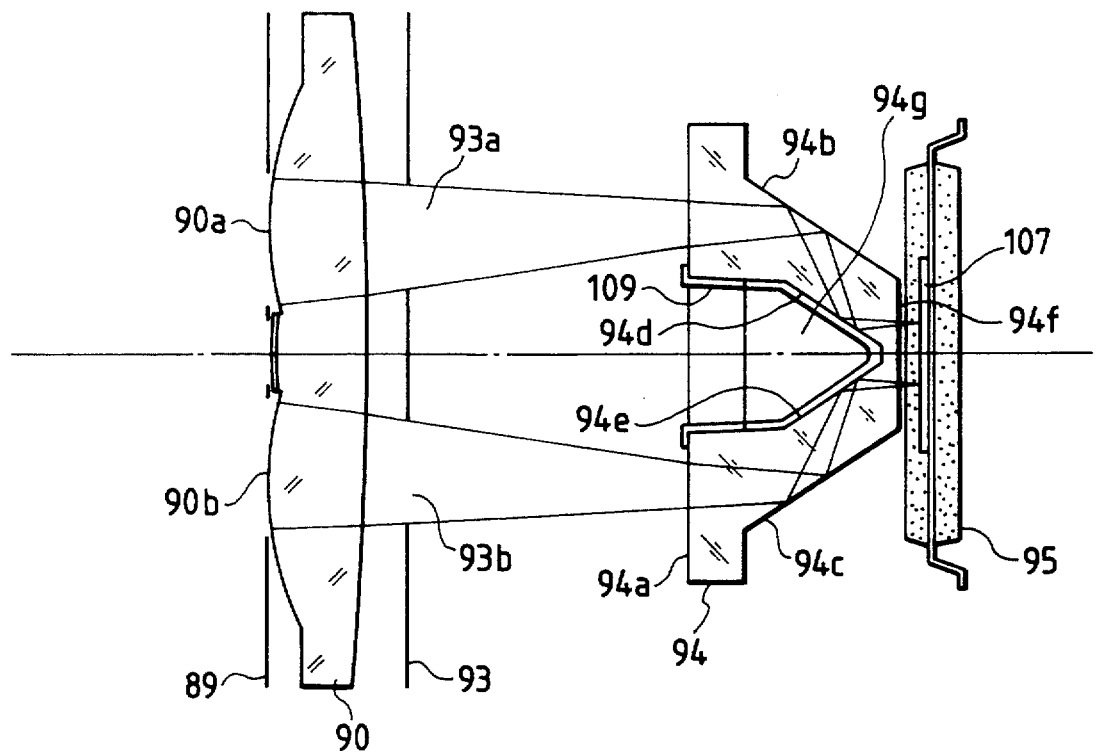
FIG. 17 is a partially enlarged view of a light guide prism in FIG. 6.
Figure 18:
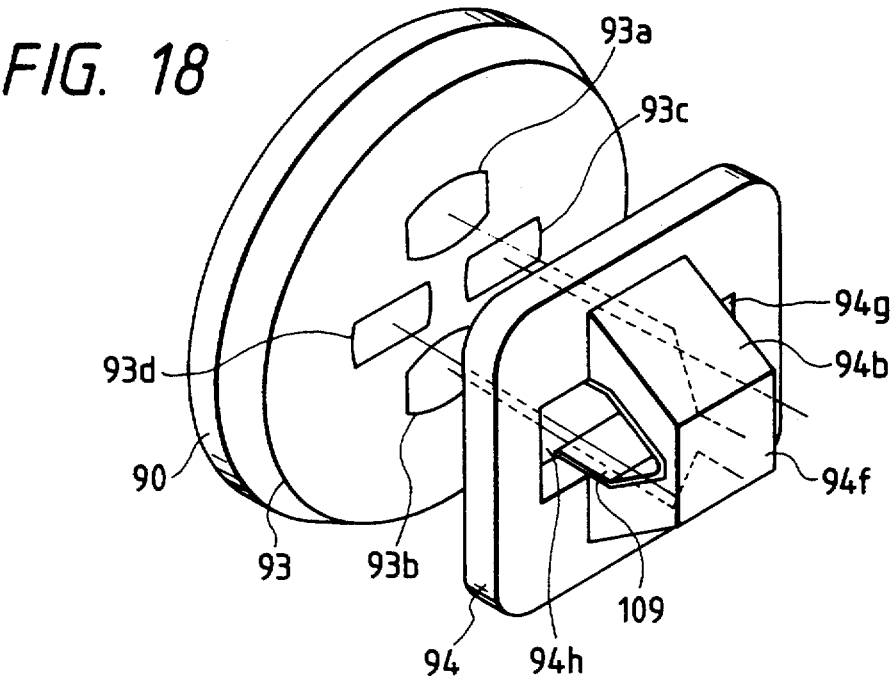
FIG. 18 is a perspective view of the light guide prism in FIG. 6.

In the embodiment shown in FIGS. 6, 7, and 8, the above problem is taken into consideration to reduce the chip size of the photoelectric conversion element arrays by using the light guide prism 94. FIGS. 17 and 18 are a partial enlarged view and a perspective view, respectively, of the light guide prism 94. FIG. 17 shows the section corresponding to that in FIG. 7. In this section, the light guide prism 94 made of a transparent plastic member has six optical surfaces 94a to 94f. These six optical surfaces have a function of folding the optical path in the optical axis direction of the phototaking lens 81 and a function of cutting off unnecessary light components.

The beams passing through the openings 93a and 93b in FIG. 17 are incident on the incident surface 94a. The beams are reflected twice by the total reflection surfaces 94b and 94c and the total reflection surfaces 94d and 94e and emerge from the light exit surface 94f toward a photoelectric conversion element 107. On the other hand, as can be apparent from FIG. 18, the beams passing through the aperture openings 93c and 93d pass through openings 94g and 94h formed in the light guide prism 94 and reach the photoelectric conversion element 107. The optical distance between the secondary imaging lens 90 and the photoelectric conversion element 107 has a difference in accordance with whether the beam is reflected by the light guide prism 94. Since the reflection optical path is present in the plastic component, the optical length is substantially decreased. Therefore, the optical path distance obtained with reflection by the light guide prism 94 is slightly different from that without reflection by the light guide prism 94. In addition, since the curvature values of the two pairs of lens portions of the multilens as the secondary imaging lens 90 can be independently selected, optimal imaging for the two different optical paths can be realized.

Figure 16:
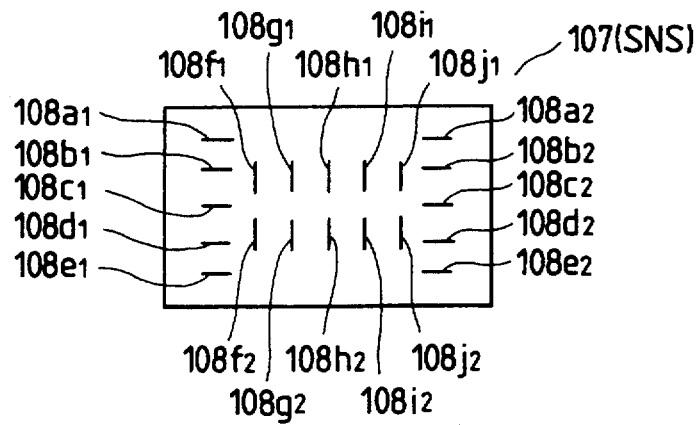
FIG. 16 is a view showing the picture element layout of a photoelectric conversion element.

The photoelectric conversion element 107 can be made compact by using the above light guide prism 94. FIG. 16 shows this state of the photoelectric conversion element 107. Picture element arrays 108a1 to 108e2 correspond to the distance measuring fields 104a to 104e, and picture element arrays 108f1 to 108j2 correspond to the distance measuring fields 104f to 104j. The suffixes indicate the correspondence of two images formed through the secondary imaging lens 90 even if the same distance measuring field is used. The picture element arrays 108f1 to 108j1 and 108f2 to 108j2, corresponding to the distance measuring fields 104f to 104j, are located in the area defined between the picture element arrays 108a1 to 108e1 and 108a2 to 108e2 corresponding to the distance measuring fields 104a to 104e, thereby eliminating wasteful areas. The economical advantage obtained by a decrease in the photoelectric conversion element is apparent, and the camera body itself can be made compact due to the folded optical path with use of the light guide prism 94.

In particular, since the picture element arrays of the distance measuring fields having the large distance measuring base line length are located inside, and the picture element arrays of the distance measuring fields having the short distance measuring base line length are located outside, compactness of the camera body can be further enhanced. This arrangement is advantageous not only in terms of economy but also in terms of compactness of the camera.

The focus detection apparatus described above is effective for a bright lens having a small f-number (aperture ratio), which requires strict focusing. However, in a system such as a single-lens reflex camera system using interchangeable lenses, a dark lens having a large f-number may be mounted on the camera body. The f-number may be increased in a zoom lens upon zooming. In this case, the distance measuring beam may be vignetted by the phototaking lens. A focus detection method corresponding to various types of phototaking lenses will be described below.

Figure 19:
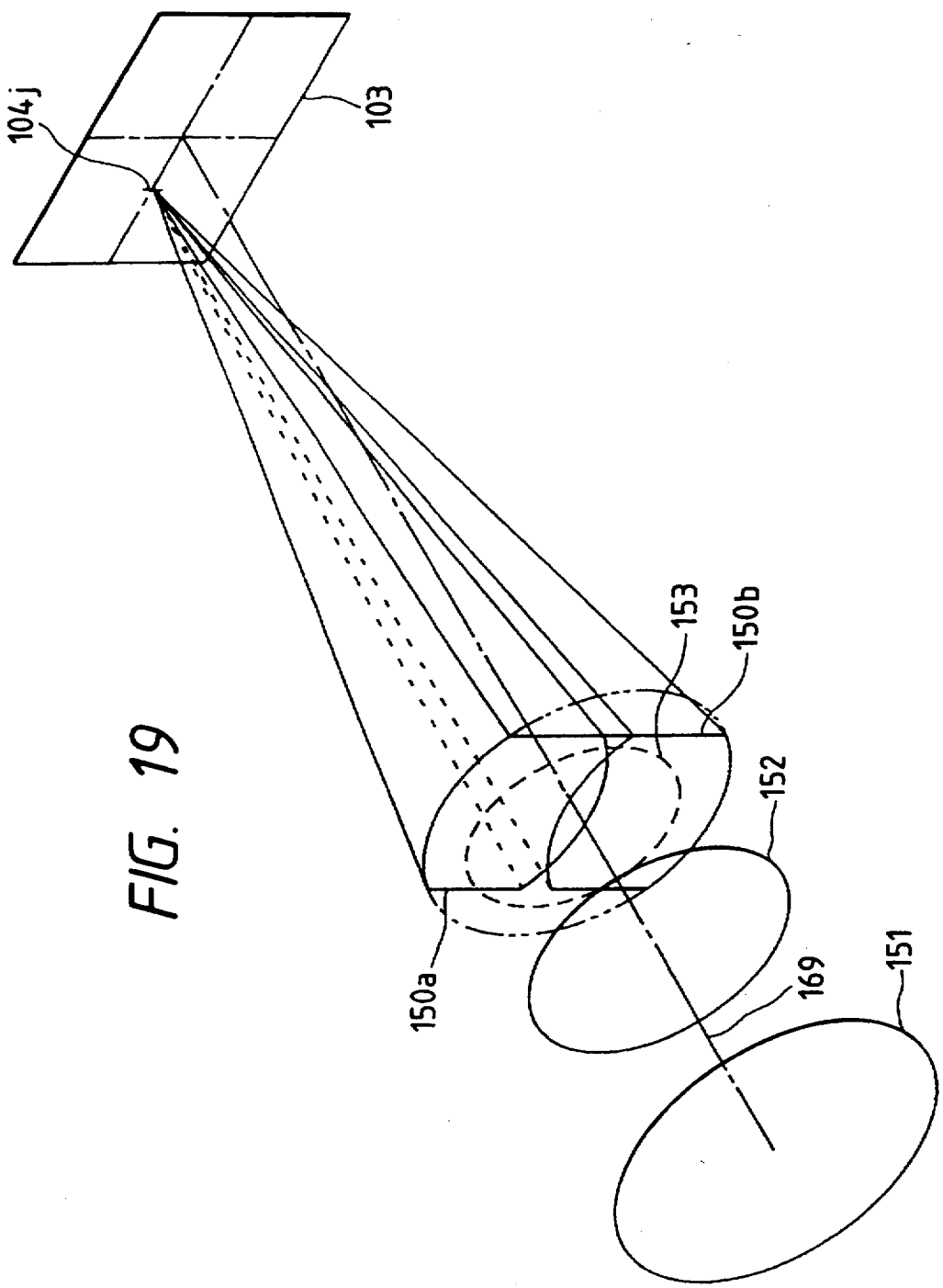
FIG. 19 is a perspective view showing a state in which a distance measuring beam is vignetted.

FIG. 19 is a perspective view for explaining the vignetting state of the distance measuring beam. Only a distance measuring beam to be incident on the distance measuring field 104j of all the distance measuring fields shown in FIG. 15 is illustrated. Referring to FIG. 19, each of the projected images 102a and 102b shown in FIG. 13 has an outermost shape 150a. Relatively dark phototaking lenses have exit windows 151 and 152.

In general, a decrease in pupil area, which is called "vignetting", occurs at a portion except for the central portion of the phototaking lens. This is caused by the fact that the number of surfaces for determining the width of the beam in an open aperture state is two or more when viewed from a given point on the image plane. These surfaces are called exit windows. For example, these surfaces are the frontmost and rearmost lenses. The two exit windows 151 and 152 exemplify this case. Judging from the degree of vignetting of the distance measuring beam, these exit windows may be represented by an intermediate exit pupil (to be described later).

Assume that a beam reaches the distance measuring field 104j through two circles slightly spaced apart from each other in a space in FIG. 19. In this case, the passing range of the distance measuring beam is fixed even at other distance measuring field positions, and the passing range of the phototaking beam is considered on the image formation plane of the aperture opening of the focus detection optical system. A region in which light actually pass through the above range is limited to the inside of a region 153. The presence of the aperture opening image outside the region 153 indicates that the distance measuring beam is vignetted. FIG. 19 shows only the distance measuring beam in the distance measuring field 104j. When the exit pupil is projected in the same manner as described above, the vignetting degree of light for other distance measuring fields can also be determined. Therefore, the beam tends to be vignetted in the peripheral portion of the phototaking frame 103, but not to be vignetted in the central portion thereof.

When the defocus amount of an image formed by the phototaking lens and the re-imaging lens is increased, the point image on the photoelectric conversion element has a shape close to that of the aperture. When the distance measuring beam is vignetted in this manner, the degree of blurring of the point image is asymmetrical about the vertical axis. Blurring is reversed in a pair of secondary object images, and symmetry of the two images is disturbed. As described above, the relative distance between the pair of secondary object images is obtained to calculate the defocus amount. The calculation precision of two images which are not similar to each other is low. For this reason, blurred images asymmetrical about the vertical axis are corrected for a dark phototaking lens having a large open f-number, thereby preventing degradation of image deviation calculation precision. This correction means will be described below after a description of vibrations of the light beam.

Figure 20A:
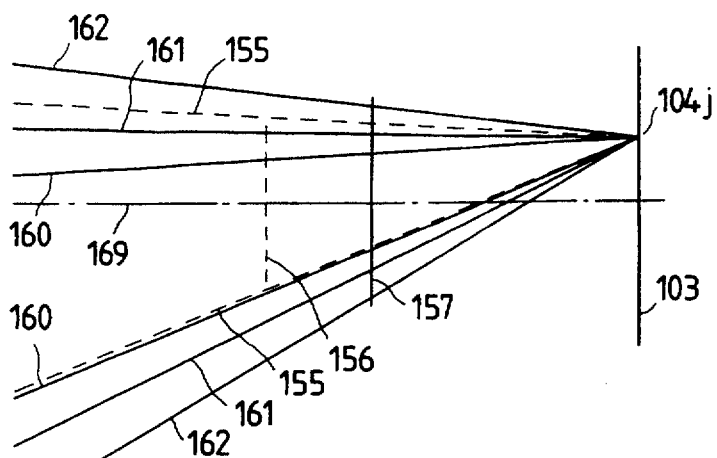
FIGS. 20A to 20C are plan views of optical paths to a position 104j of the distance measuring field shown in FIG. 15 when viewed from the top.
Figure 20B:
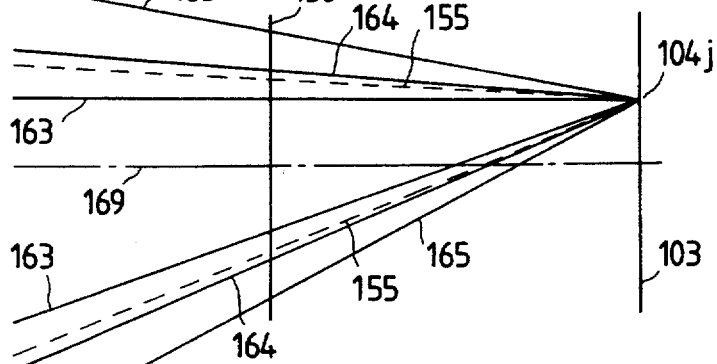
Figure 20C:
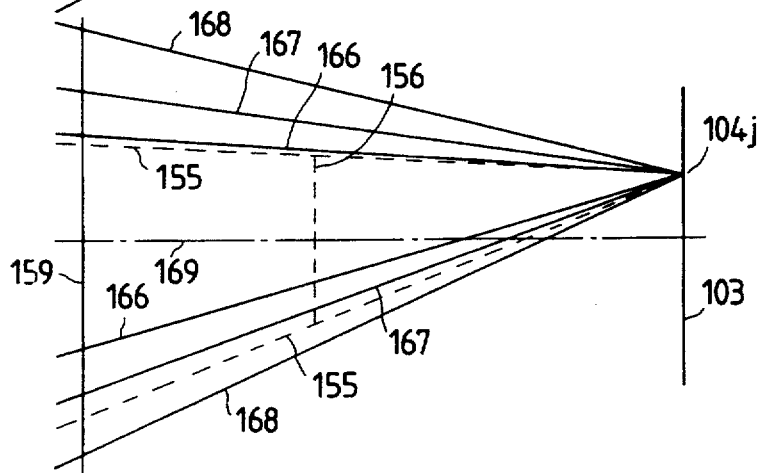
Figures 21A, 21B, 21C:
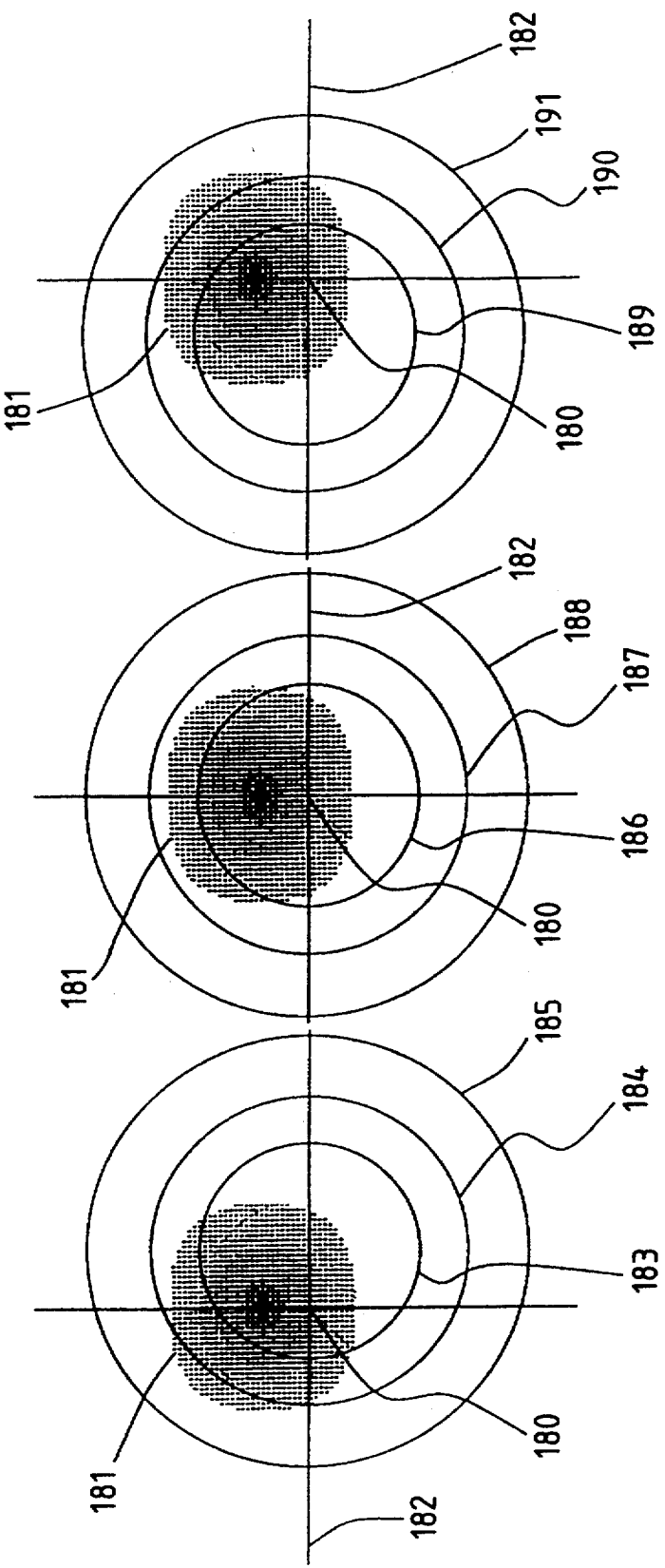
FIGS. 21A to 21C are views showing ranges of phototaking beams on a surface where aperture images of a distance measuring optical system are formed.

FIGS. 20A to 20C and 21A to 21C are views for explaining changes in vignetting of the distance measuring beam, depending on the characteristics of the phototaking lenses. FIGS. 20A to 20C are plan views illustrated when the optical path to the distance measuring field 104j of the distance measuring fields shown in FIG. 15 is viewed from the top. FIGS. 21A to 21C are views showing the range of phototaking beams passing on the aperture image formation surface of the distance measuring optical system.

Referring to FIGS. 20A to 20C, an alternate long and short dashed line 169 represents an optical axis of the phototaking lens. A broken line 156 represents a projection plane of the aperture opening image. A broken line 155 represents a distance measuring beam. The optical axis 169, the projection plane 156, and the distance measuring beam 155 are common in FIGS. 20A to 20C. A phototaking lens is located at positions corresponding to exit pupils 157, 158, and 159 in FIGS. 20A, 20B, and 20C. Each exit pupil represents a middle position of the two exit windows shown in FIG. 19. FIG. 20A shows a state in which the exit pupil position is relatively close to the phototaking frame, FIG. 20B shows a state in which the exit pupil coincides with the projection plane 156 of the aperture image, and FIG. 20C shows a state in which the exit pupil position is relatively away from the phototaking frame. The beams passing through each exit pupil are represented by solid lines 160 to 168. The innermost beam is obtained in a case for an f-number (aperture ratio) of 5.6, the middle beam is obtained in a case for an f-number of 4, and the outermost beam is obtained in a case for an f-number of 2.8. For illustrative convenience, the size in the vertical direction is increased. When a region common to the distance measuring beam 155 and the beam passing through each exit pupil on the projection plane 156 is measured, the degree of vignetting of the distance measuring beam can be detected.

As described above, since the distance measuring beam passes through the diffusion plate, its intensity distribution on the pupil plane is not uniform. In order to more accurately determine the degree of vignetting including this intensity distribution, the projection plane of the aperture opening image as in FIG. 19 is taken into consideration, and the relationship between the distance measuring beam and the phototaking beam on this plane is shown in FIGS. 21A to 21C. FIGS. 21A to 21C correspond to FIGS. 20A to 20C, respectively. FIG. 21A shows a state in which the exit pupil position is relatively close to the phototaking frame, FIG. 21B shows a state in which the exit pupil position coincides with the projection plane 156 of the aperture image, and FIG. 21C shows a state in which the exit pupil position is relatively away from the phototaking frame.

Referring to FIGS. 21A to 21C, a point 180 represents a position corresponding to the optical axis 169 of the phototaking lens. For illustrative convenience, spreading of one distance measuring beam 181 of the pair of distance measuring beams is illustrated. The size of the point indicates the density of the effective beam. Circles 183 to 191 drawn on the distance measuring beam 181 indicate the exit pupils of the phototaking lens. The innermost exit pupil indicates a case for an f-number of 5.6, the middle exit pupil indicates a case for an f-number of 4, and the outermost exit pupil indicates a case for an f-number of 2.8. The actual distance measuring beam is also distributed at a position symmetrical about an axis 182. Vignetting of the distance measuring beams occurs in a shape symmetrical about the axis 182.

Referring to FIGS. 20A to 20C and 21A to 21C, when the brightness of the phototaking beam is increased, and the projection plane 156 of the aperture opening image is closer to the exit pupil plane, it is understood that vignetting tends not to occur.

Figure 22A:
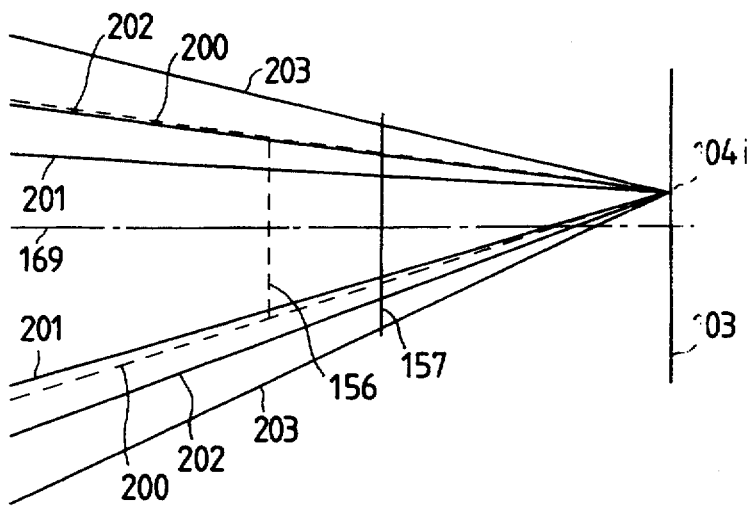
FIGS. 22A to 22C are plan views of optical paths to a position 104j of the distance measuring field shown in FIG. 15 when viewed from the top.
Figure 22B:
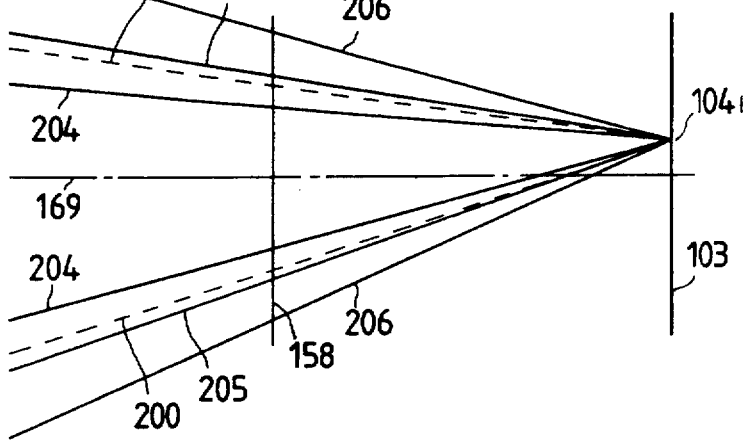
Figure 22C:
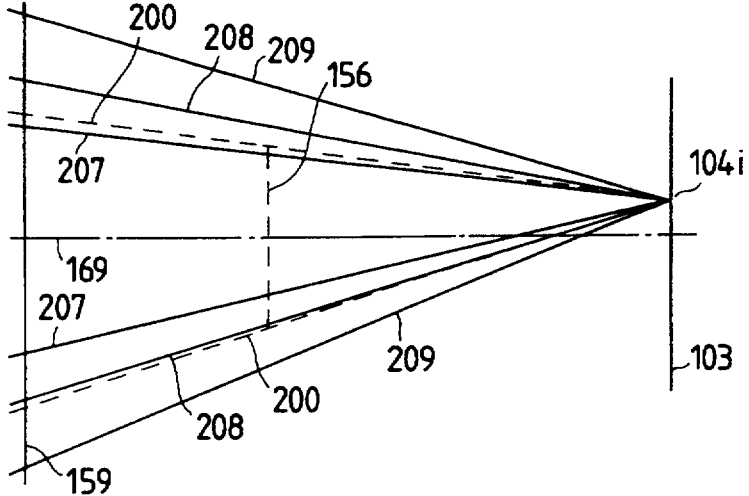

FIGS. 22A to 22C show states in which the distance measuring field is changed. The beam incident on the distance measuring field 104i shown in FIG. 15 will be exemplified.

Referring to FIGS. 22A to 22C, an alternate long and short dashed line 169 represents an optical axis of the phototaking lens, and a broken line 156 represents a projection plane of the aperture opening image as in FIGS. 20A to 20C. A broken line 200 represents a distance measuring beam in this distance measuring field. Beams passing through exit pupils 157, 158, and 159 of the phototaking lens are represented by solid lines 201 to 209. The innermost beam indicates a case for an f-number of 5.6, the middle beam indicates a case for an f-number of 4, and the outermost beam indicates a case for an f-number of 2.8.

As is apparent from comparison between FIGS. 20A to 20C and FIGS. 22A to 22C, when the exit pupil diameter is decreased and the exit pupil position is farther away from the aperture image formation plane, the degree of vignetting of the distance measuring beam is increased regardless of the position of the distance measuring field. The degree of vignetting is small when the distance measuring field position is closer to the optical axis 169 of the phototaking lens.

As described above, since vignetting occurs in the distance measuring beam, a pair of images on the photoelectric conversion element have characteristic shapes depending on the imaging state. The shapes are defined as a function of the exit pupil diameter, the exit pupil position, the distance measuring field position, and the aberration of the re-imaging lens. The shape of the blurred image adversely affects the conventional defocus calculation. In order to maintain high detection precision, some correction means is required. Note that the aberration of the phototaking lens is not taken into consideration because the re-imaging lens is generally constituted by a single lens and the aberration of the re-imaging lens is greatly smaller than that of the phototaking lens. For this reason, the aberration of the phototaking lens can be neglected.

The method of correcting a blurred image in this embodiment will be described below. An object image by an optical system is generally given as a convolution integral between the point image determined by the characteristics of the optical system and the brightness distribution of the object. The point image corresponds to an impulse response of the optical system. An adaptive inverse filter is produced on the basis of a transfer function serving as a Fourier transfer of the impulse response and is operated for the point image, thereby restoring the point image into the original point. When the inverse filter acts on a general object image, the brightness distribution of the original object can be obtained. When this principle is applied to the focus detection optical system described herein, the object image formed on the photoelectric conversion element is given by a convolution integral between the point image of the object image and the brightness distribution of the object. In addition, the original object brightness distribution can be restored by an appropriate inverse filter.

In this case, since focus detection is performed by examining the relative distance between images, the photoelectric conversion element is a one-dimensional line sensor. Image data correction performed for the sensor outputs can be correction of a line image obtained by integrating the point image in a direction perpendicular to the picture element array. The correction of the blurred image need not "restore" the line image to a perfect line. If the line images asymmetrical about the vertical axis, which are caused by vignetting of the distance measuring beams, are restored to have at least a symmetrical shape about the vertical axis, the relative distance between the two images can be obtained with high precision.

This operation will be described in more detail with reference to FIGS. 23A to 23C and 24A to 24C. FIGS. 23A to 23C and 24A to 24C show blurred images and their correction filters. FIGS. 23A to 23C or 24A to 24C show a correction filter, image data, and corrected image data, respectively. A pair of secondary object images formed by the focus detection optical system are defined as OA(i) and OB(i), respectively, and corrected image data are represented by A(i) and B(i), respectively. Since the distance measuring beams are incident on the re-imaging optical system through the diffusion plate, vignetting occurs depending on the open f-number (aperture ratio) of the phototaking lens. As a result, line images asymmetrical about the vertical axis are formed, as shown in FIGS. 23B and 24B. Since the two distance measuring beams are vignetted symmetrically about the optical axis of the phototaking lens, the resultant line images are reversed to each other. The line images spread to some extent because the phototaking lens is set in a defocus state. The distance between the two images is different from that in the in-focus state. The image OA(i) in FIG. 23B is deviated to the left and the image OB(i) in FIG. 24B is deviated to the right due to this reason. The distance between the two images is smaller than that in a case wherein the distance measuring beams are not vignetted. This must be taken into consideration in the calculation of the sensitivity of image deviation (to be described later).

Figure 23A:
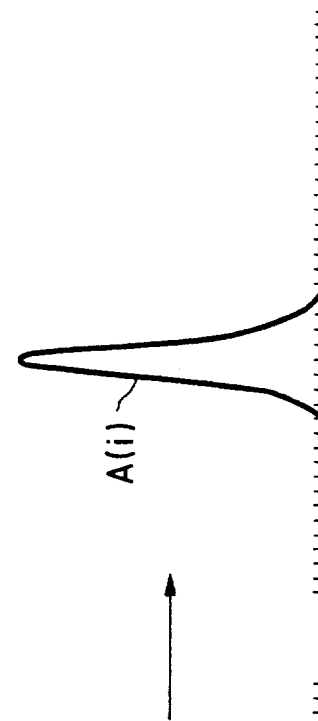
FIGS. 23A to 23C are views for explaining a defocused image and its correction filter, image data, and corrected image data.
Figure 23B:
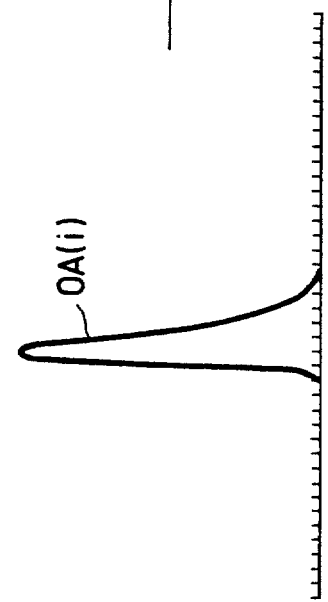

The filters for correcting these line images are shown in FIGS. 23A and 24A. Each correction filter has an origin FOF in the abscissa. The origin FOF is also used for inverting the correction filter (to be described later).

The algorithm performed in the calculating means has a "C1" processing step for performing filter processing of the first signal and a "C2" processing step for performing filter processing of the second signal. The filter used in the "C2" processing step is obtained by inverting the filter used in the "C1" processing step.

The filter component values are plotted with reference to an origin AXX. Since the two line images are reversed to each other, as described above, the characteristics of the filter in FIG. 23A are reversed from the characteristics of the filter in FIG. 24A. For this reason, one of the shapes of the filter can be stored in the camera, and original filter information (to be described later) can be efficiently utilized. The shape of the correction filter is determined to eliminate asymmetry of the line images and not to excessively restore the corrected images to the original line due to the following reason. A correction filter for faithfully restoring an image to the original line must have characteristics for greatly amplifying a high frequency. This correction filter is easily affected by random noise (particularly, a high-frequency component) caused by thermal noise of the photoelectric conversion element. When high-frequency noise superposed on the original image data is excessively amplified, the correlation between the two images is degraded to impair distance measuring precision. The shape of this filter will be described with reference to FIG. 23A. The right portion of the filter acts to shorten the bottom of the image OA(i) extending to the right, whereas the left portion of the filter acts to extend the left short bottom. In order to facilitate a subsequent description, a restoration portion is referred to as a ZR portion (e.g., the right portion in FIG. 23A with respect to the origin FOF) and the diffusion portion is referred to as a ZS portion (e.g., the left portion in FIG. 23A with respect to the origin FOF). When the ZS portion is constituted by only the positive component, and the ZR portion is constituted by positive and negative components, the image is not faithfully restored to the original line and the lengths of the right and left bottoms can be uniformed.

That is, the filter has only the positive component in one direction and both the positive and negative components in the other direction with respect to the origin.

Figure 23C:
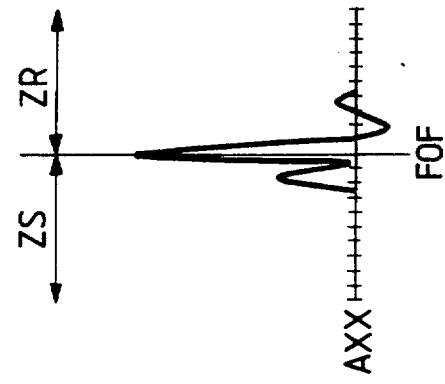

In order to correct the images, the lines shown in FIGS. 23B and 24B are subjected to the convolution integral using the correction filters in FIGS. 23A and 24A. The results are the corrected image data in FIGS. 23C and 24C. As shown in FIGS. 23C and 24C, the corrected image data represent images symmetrical about the vertical axis. Therefore, the relative distance between the images represented in FIGS. 23C and 24C can be calculated with high precision.

The line image correction has been described above. Correction of a general object image as a result of convolution integral between line images and the object brightness distributions will be described below, as shown in FIGS. 25A and 25B. The black edge of a monochrome pattern is selected as an object and is located at the center of the distance measuring field. FIG. 25A is a view showing overlapping image data of a pair of secondary images, and FIG. 25B shows corrected image data. The image data represented by the solid line is overlapping data of the point image of FIG. 23B, and the image data represented by the broken line is overlapping data of the point image of FIG. 24B. Since the shapes of the point images are different from each other, the shapes of the two images are different from each other.

The result obtained by causing the correction filters to act on these image data is shown in FIG. 25B. The correction filter shown in FIG. 23A is used for the image data represented by the solid line, while the correction filter shown in FIG. 24A is used for the image data represented by the broken line. The corrected images have the same shape, and the distance between the images can be calculated.

Figure 26A:
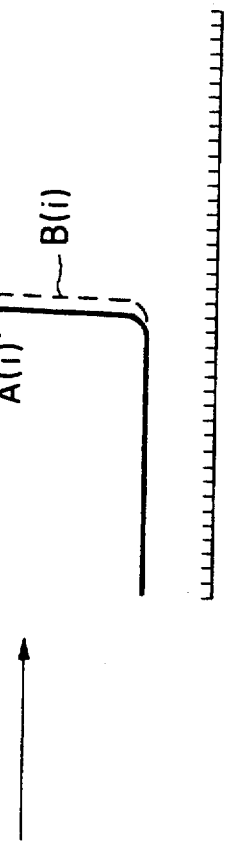
FIGS. 26A and 26B are views for explaining correction of another general object image.
Figure 26B:
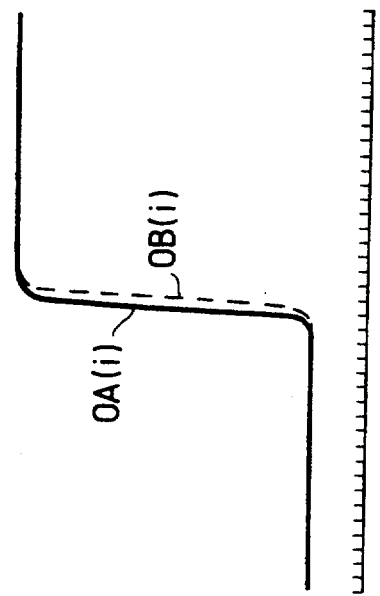

When the phototaking lens has a small defocus amount, image data shown in FIGS. 26A and 26B are obtained. Since the point images have a small size, the resultant images are sharp. In addition, the relative distance between the two images is different from that in FIGS. 25A and 25B. In this case, since the size of the blurred image on the primary imaging plane of the phototaking lens changes almost in proportion to the defocus amount, the magnification of the horizontal axis or abscissa is changed in accordance with the defocus amount to perform correction in the same manner as in FIGS. 25A and 25B. More specifically, the filters shown in FIGS. 23A and 24A are used such that they are compressed in the horizontal axis direction, the corrected images shown in FIG. 26B are obtained. This will be repeatedly described in a flow chart (to be described later). Prior to this description, the control system of the camera will be described below.

Figure 27:
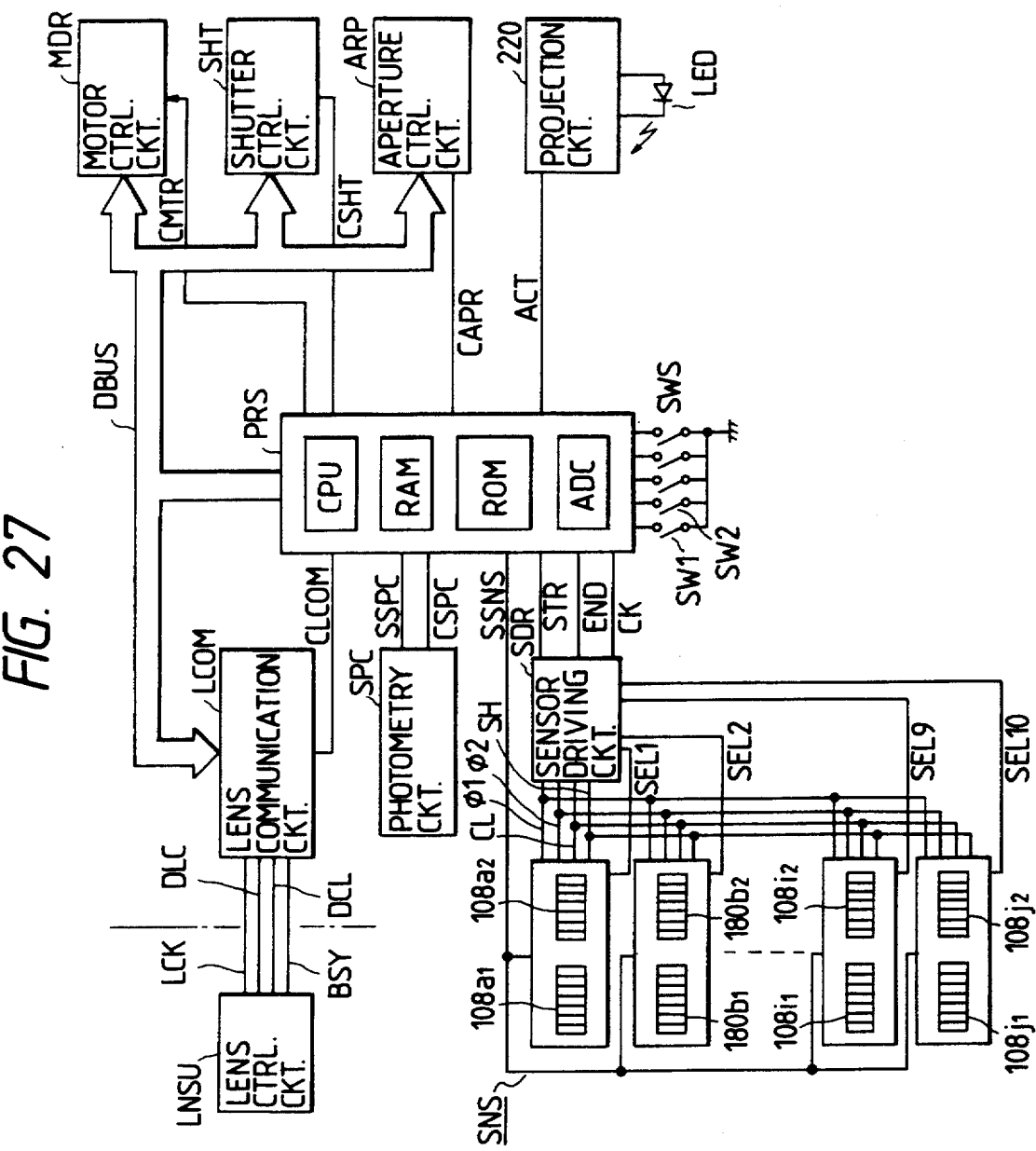
FIG. 27 is a block diagram showing a camera circuit according to the present invention.

FIG. 27 is a block diagram of the camera focus detection apparatus suitably embodying the present invention.

Referring to FIG. 27, a central processing circuit PRS is a one-chip microcomputer including a CPU, a RAM, a ROM, an ADC (A/D converter), and I/O ports. Software and parameters for controlling a series of camera operations including AF control are stored in the ROM. The central processing circuit PRS constitutes part of an arithmetic operating means.

The central processing circuit PRS is connected to a data bus DBUS. A shutter control circuit SHT receives data supplied through the data bus DBUS during reception of a control signal CSH from the central processing circuit PRS and controls to cause the front and rear curtains of a shutter (not shown) to run on the basis of the input data. An aperture control circuit APR receives data through the data bus DBUS during reception of a control signal CAPR and controls an aperture control mechanism (not shown) on the basis of the input data. A switch group SWS includes a release switch, a continuous photographic mode switch, various information setting switches, and a switch for selecting whether focus detection is performed in consideration of only the central portion of the frame or both the central and peripheral portions of the frame. A lens communication circuit LCOM receives data through the data bus DBUS during reception of a control signal CLCOM and performs serial communication with a lens control signal circuit LNSU on the basis of the input data. In synchronism with a clock signal LCK, the lens communication circuit LCOM supplies lens drive data DCL to a lens control circuit LNSU, and at the same time serially receives lens information DLC.

A signal BSY is used to inform the camera side that a focus adjusting lens (not shown) is being moved. During generation of this signal, the serial communication is prohibited. A photometry circuit SPC sends a photometry output SSPC to the central processing circuit PRS upon reception of a control signal CSPC from the control circuit. The photometry output SSPC is A/D-converted in an ADC in the central processing circuit PRS and is used as data for controlling the shutter control circuit SHT and the aperture control circuit APR.

A projection circuit 220 projects an auxiliary focus detection beam to drive an LED and cause the LED to emit light in accordance with a control circuit ACT and a clock signal LCK.

A distance measuring light-receiving circuit SNS has pairs of line sensors $108a1$ and $108a2$, . . . $108j1$ and $108j2$. The distance measuring light-receiving circuit SNS is arranged to cause the pairs of line sensors $108a1$ and $108a2$, . . . , $108j1$ and $108j2$ to receive images at positions corresponding to the distance measuring fields $104a$ to $104j$ of the frame. A sensor driving circuit SDR controls light-receiving circuits 1 to 10 (i.e., the pairs of $108a1$ and $108a2$ to $108j1$ and $108j2$) in accordance with a signal STR and the clock signal LCK supplied from the central processing circuit PRS. The light-receiving circuits 1 to 10 are controlled in accordance with control signals $\phi1$ and $\phi2$ and the control signals CL and SH, and one of the light-receiving circuits 1 to 10 is selected in accordance with selection signals SEL1 to SEL10. An image signal SSNS from the selected light-receiving circuit is transmitted from the sensor driving circuit SDR to the central processing circuit PRS.

Figure 28:
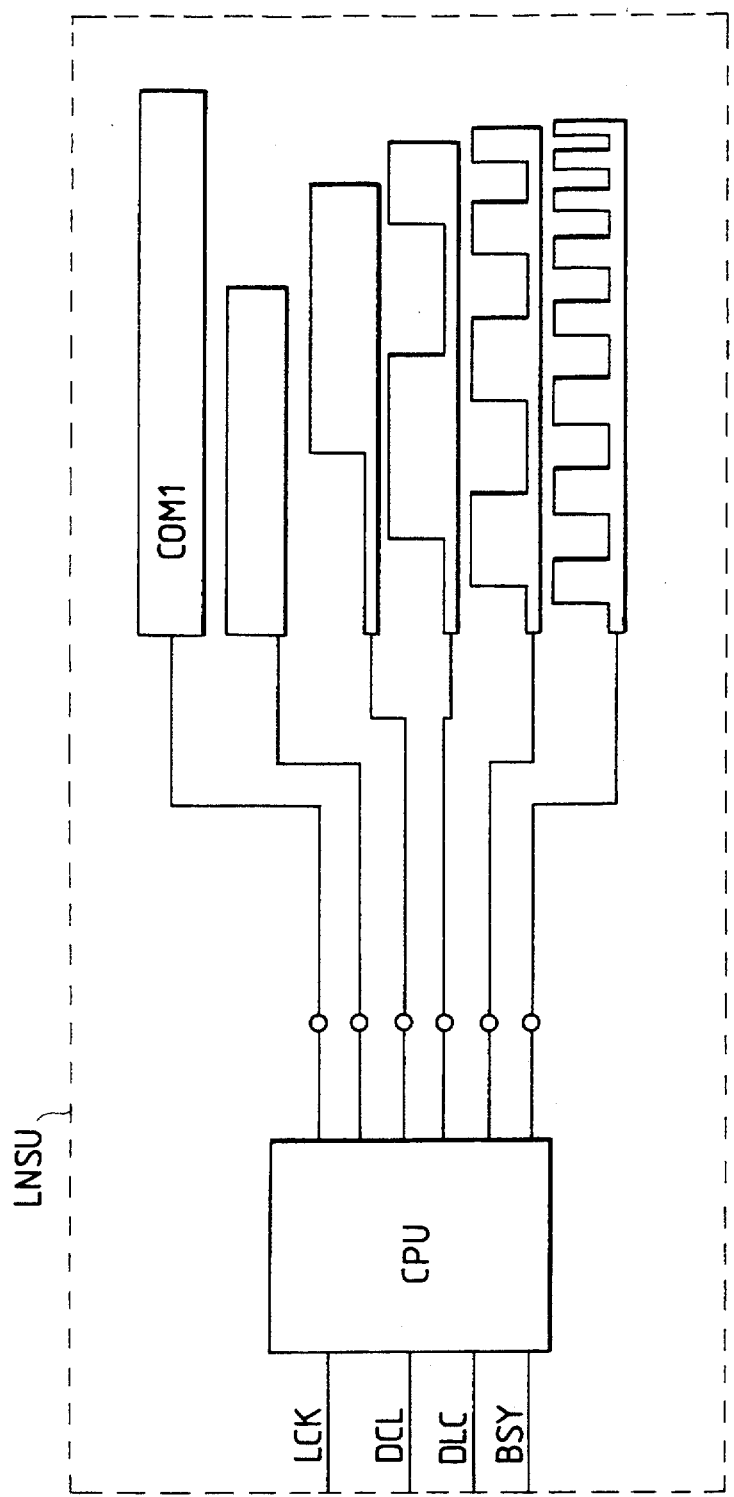
FIG. 28 is a view showing an arrangement for detecting the positions of a distance ring and a zoom ring of a phototaking lens.

FIG. 28 shows the operation of the lens control circuit LNSU to obtain lens focal length information and distance ring information. The distance ring position, the zoom ring position, the defocus amount vs. focus adjusting lens extension coefficients are converted into 5-bit signals by a brush. The 5-bit signals are calculated in the CPU in the lens control circuit LNSU as the lens information DLC. The lens information DLC is input to the central processing circuit PRS through the lens communication circuit LCOM. In this case, since the distance ring position information is not directly used in an in-focus operation, high precision is not required.

The operations of the camera having the above arrangement will be described with reference to a flow chart in FIG. 29.

When a power switch (not shown) is turned on, the central processing circuit PRS is powered on to start executing a sequence program stored in the ROM.

Figure 29:
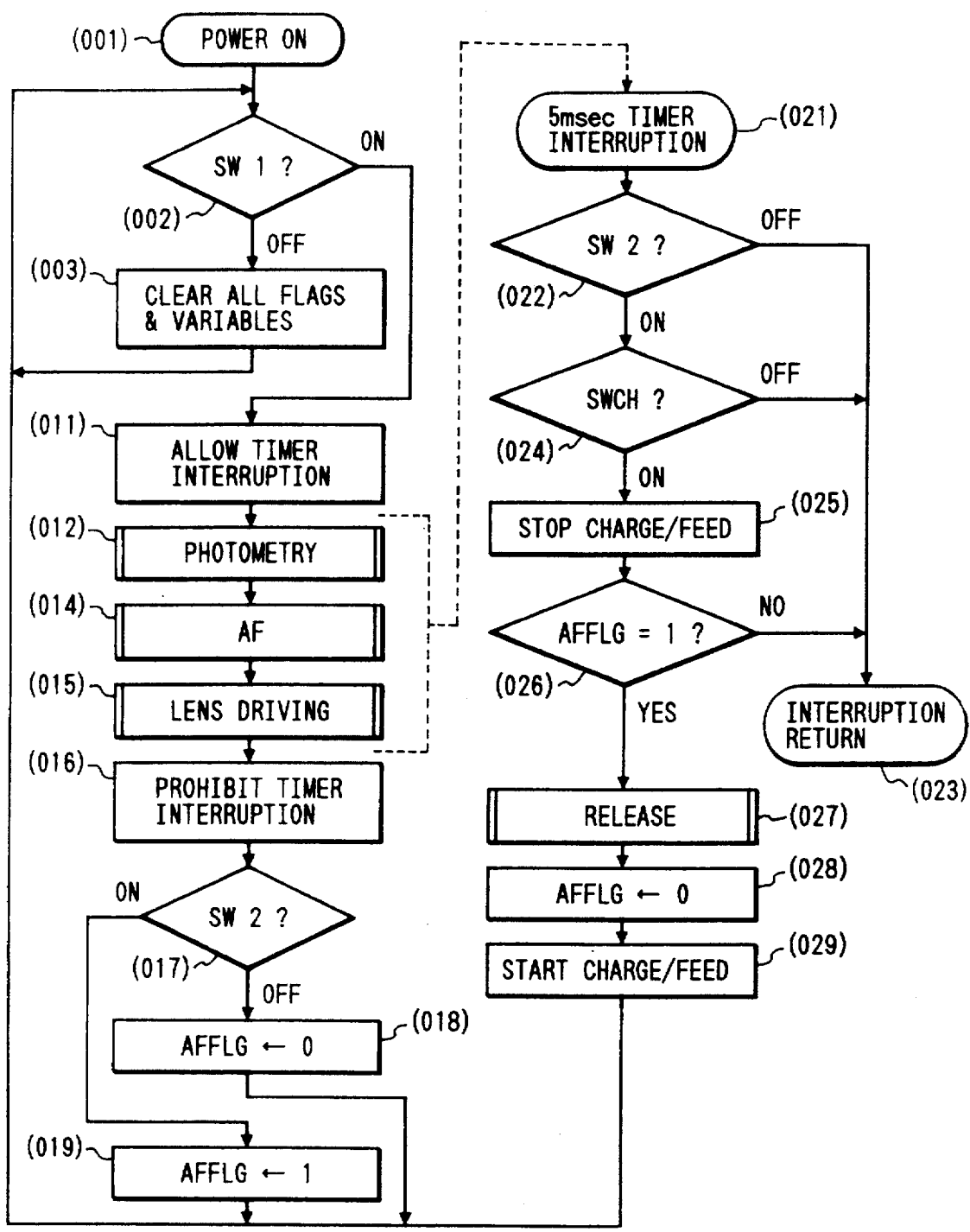
FIG. 29 is a flow chart for explaining a camera sequence.

FIG. 29 is the flow chart showing the overall flow of the program. When execution of the program is started by the above operation, the flow advances to step 002 through step 001. In step 002, the ON/OFF state of a switch SW1 turned on upon depression of the release button up to the first stroke is detected. If the switch SW1 is set in an OFF state, the flow advances to step 003 to clear all the control flags and variables set in the RAM in the central processing circuit PRS, thereby initializing the RAM. Steps 002 and 003 are repeated until the switch SW1 is turned on or the power switch is turned off. When the switch SW1 is turned on, the flow advances from step 002 to step 011. In step 011, a timer interruption operation is allowed. In this case, the timer interruption operation is periodically performed in steps from step 012 to detect various states. In step 012, the "photometry" subroutine for exposure control is executed. The analog input terminal of the central processing circuit PRS receives the photometry output SSPC from the photometry circuit or sensor SPC. The photometry output SSPC is converted into a digital signal to calculate an optimal shutter control value and an optimal aperture control value from the digital photometry value. The calculated values are stored at predetermined addresses of the RAM. The shutter and the aperture are controlled on the basis of the stored values during a release operation.

Step 014 is a subroutine for receiving an image signal and calculating a defocus amount. After the central processing circuit PRS receives the image signal from the distance measuring light-receiving circuit SNS, the central processing circuit PRS filters this image signal and performs a predetermined calculation on the basis of the image deviation scheme, thereby calculating a defocus amount of the phototaking lens. The detailed contents of this step will be described later.

Step 015 is a subroutine for driving the lens on the basis of the detected defocus amount DEF. This subroutine will also be described in detail later.

In step 016, the timer interruption allowed in step 011 is prohibited, and the timer interruption is kept prohibited in steps 017 to 019. In step 017, the ON/OFF state of a switch SW2 turned on upon depression of the release button up to the second stroke is detected. If the switch SW2 is set in an OFF state, the flow advances to step 018. Otherwise, the flow advances to step 019. A flag AFFLG in steps 018 and 019 defines whether AF control in steps 012 to 015 is completed in the ON state of only the switch SW1 or in the ON state of the switch SW2. The AF control is completed when the switch SW2 is OFF, i.e., only the switch SW1 is ON, the flag AFFLG is set at logic "0". If the AF control is completed when the switch SW2 is ON, the flag AFFLG is set at logic "1". In this case, since the switch SW2 is kept off, the flag AFFLG is set at logic "0".

A timer interruption operation in steps 012 to 015 executed if AF control is performed in steps 011 to 018 when only the switch SW1 is ON will be described below.

The timer interruption in step 021 has an interruption function of periodically monitoring the state of the switch SW2, the charge/feed state, and the AF history to detect whether a release operation is started. The interruption is performed every, e.g., 5 msec during execution of steps 012 to 015.

The respective steps will be described below.

The flow advances to step 022 through step 021 to determine the state of the switch SW2. If the switch SW2 is determined to be OFF, the interruption is ended in step 023 and the flow returns to the main routine. That is, even if an interruption is performed every 5 msec during AF repetition while only the switch SW1 is kept on, the subroutine immediately returns to the main routine because the switch SW2 is kept off.

If the switch SW2 is ON in step 022, the flow advances to step 024 to determine whether a switch SWCH is ON/OFF. If the switch SWCH is OFF, since the charge/feed operation upon completion of the release operation is still continued, the next release operation cannot be performed. Therefore, the flow returns to the main routine in step 023 to continue the AF operation. At the same time, the charge operation is also continued.

If the switch SWCH is determined to be ON in step 024, since the charge/feed operation is completed, a charge/feed stop signal is output in step 025 to stop a motor MTR1, and the flow returns to step 026.

In step 026, the logic state of the flag AFFLG is determined. If AFFLG=1 in step 026, it is determined that the AF operation is completed once upon the ON operation of the switch SW2. The flow advances to step 027 to perform a release operation. If AFFLG≠1, i.e., if the flag AFFLG is set at "0", since the AF operation is completed only one upon the ON operation of the switch SW2, the flow returns to the main routine in step 023, and the release operation is not performed.

The flag AFFLG is set to "0" in step 028 to start the charge/feed operation in step 029 (this operation is performed by one revolution of the motor MTR1). The flow returns to step 002 while the start of the charge/feed operation is being performed. The next focus detection operation is started from step 011.

Figure 30:
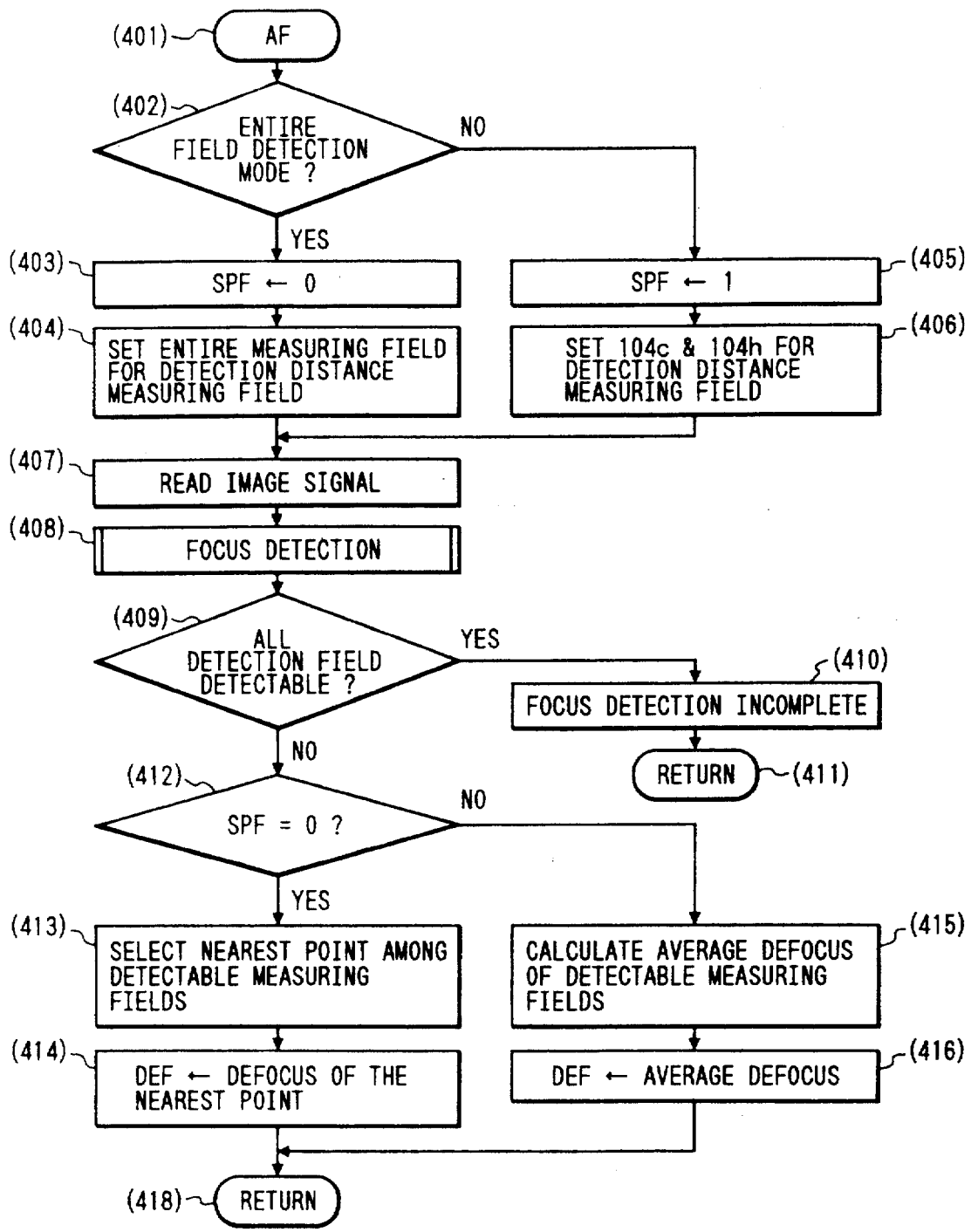
FIG. 30 is a flow chart of an "AF" subroutine.

The flow chart of the "AF" subroutine is shown in FIG. 30.

It is determined in step 402 whether an entire field detection mode for performing focus adjustment in accordance with distance measuring information of the entire distance measuring field or a specific field detection mode for performing focus adjustment in only a distance measuring field at the central portion of the frame is set. If the entire field detection mode is set, the flow advances to step 403. However, if the specific field detection mode is set, the flow advances to step 405. Note that the mode can be set by a photographer using the switch group SWS shown in FIG. 27.

In step 403, a flag SPF is reset. In step 404, the entire distance measuring field is set as a detection distance measuring field. In step 405, the flag SPF is set at "1".

In step 406, the distance measuring fields 104c and 104h shown in FIG. 15 are set as detection distance measuring fields.

In step 407 as the step next to step 404 or 406, the distance measuring light-receiving circuit (line sensors) SNS is driven through the sensor driving circuit SDR in FIG. 27. Analog output signals of the detection distance measuring field are converted into digital signals, and the digital signals are stored at predetermined addresses in the RAM.

In step 408, defocus detection is performed on the basis of the image signals stored in the RAM in the previous step. This subroutine will be described in detail later.

It is determined in step 409 whether defocus detection can be performed in the entire distance measuring field. If YES in step 409, the flow advances to step 410 to perform focus detection incomplete processing such as a search operation and a detection incomplete display. If any one of the measuring fields can be detected, the flow advances to step 412.

In step 412, the state of the flag SPF set in step 403 or 405 is checked. If the logic state of the flag SPF is zero, the flow advances to step 413. If NO in step 412, the flow advances to step 415.

In step 413, the nearest point among the detectable measuring fields is selected. In step 414, the defocus amount of the nearest point is stored in DEF. In step 415, an average defocus of the detectable measuring fields is calculated. In step 416, the average defocus is stored in the DEF. The subroutine returns to the main routine in step 418.

Figure 31:
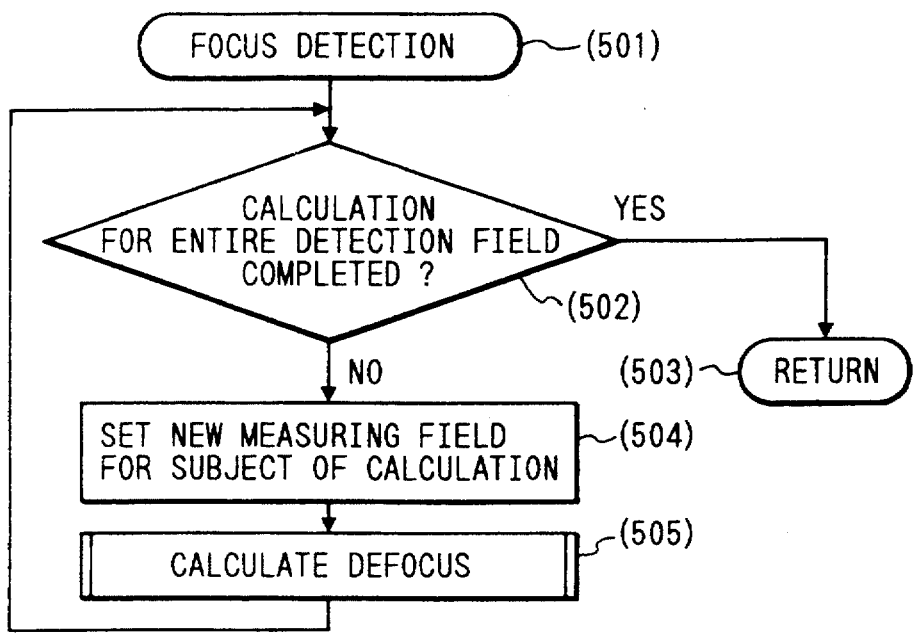
FIG. 31 is a flow chart of a "focus detection" subroutine.

The "focus detection" subroutine is shown in FIG. 31.

In the defocus detection subroutine, it is determined in step 502 whether the calculation of the entire detection distance measuring field is completed. If YES in step 502, the flow advances to step 503, and this subroutine returns to the main routine. However, if any distance measuring field whose defocus calculation is not completed is present, the flow advances to step 504.

In step 504, a new measuring field for the subject of calculation is set. In step 505, the defocus amount of the distance measuring field for the subject of calculation set in step 504 is calculated. The flow then returns to step 502. The calculation of defocus will be described in detail later.

Figure 32:
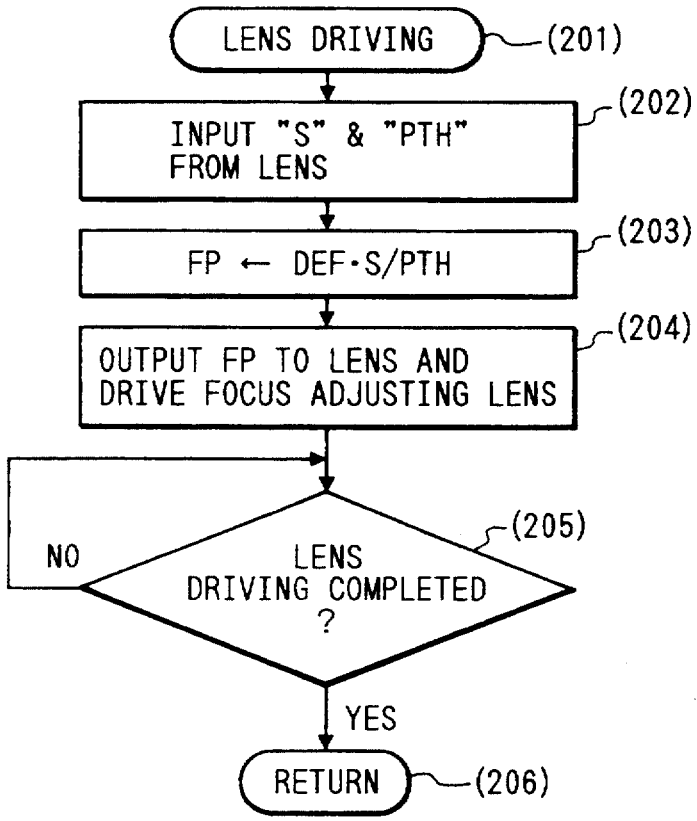
FIG. 32 is a flow chart of a "lens driving" subroutine.

FIG. 32 shows a flow chart of a "lens driving" subroutine.

When this subroutine is executed, the central processing circuit PRS communicates with the lens in step 202 in FIG. 32 to receive data "S" and "PTH". The "S" is a "coefficient of the defocus amount vs. focus adjusting lens extension amount" inherent to the phototaking lens. For example, when the phototaking lens is an entire extension type single lens, since the phototaking lens as a whole is a focus adjusting lens, condition "S=1" is established. When the phototaking lens is a zoom lens, the value of "S" is changed at each zoom position. The "PTH" is a focus adjusting lens extension amount per pulse from an encoder ENCF interlocked with movement of a focus adjusting lens LNS in the optical axis direction.

A value (i.e., a lens driving amount FP) of the focus adjusting lens extension amount as an output pulse count of the encoder ENCF in accordance with the defocus amount DEF to be focus-adjusted, and the coefficient S and the amount PTH can be given as follows.

$$FP = DEF \times S / PTH$$

The operation in step 203 is a direct calculation of the above equation.

In step 204, the amount FP obtained in step 203 is sent to a lens FLNS to command driving of the focus adjusting lens (the entire phototaking lens when the lens is the entire extension type single lens).

In step 205, the central processing circuit PRS communicates with the lens FLNS to determine whether driving of the lens by the lens driving amount FP commanded in step 204 is completed. If YES in step 205, the flow advances to step 206, and the "lens driving" subroutine returns to the main routine.

Figure 33:
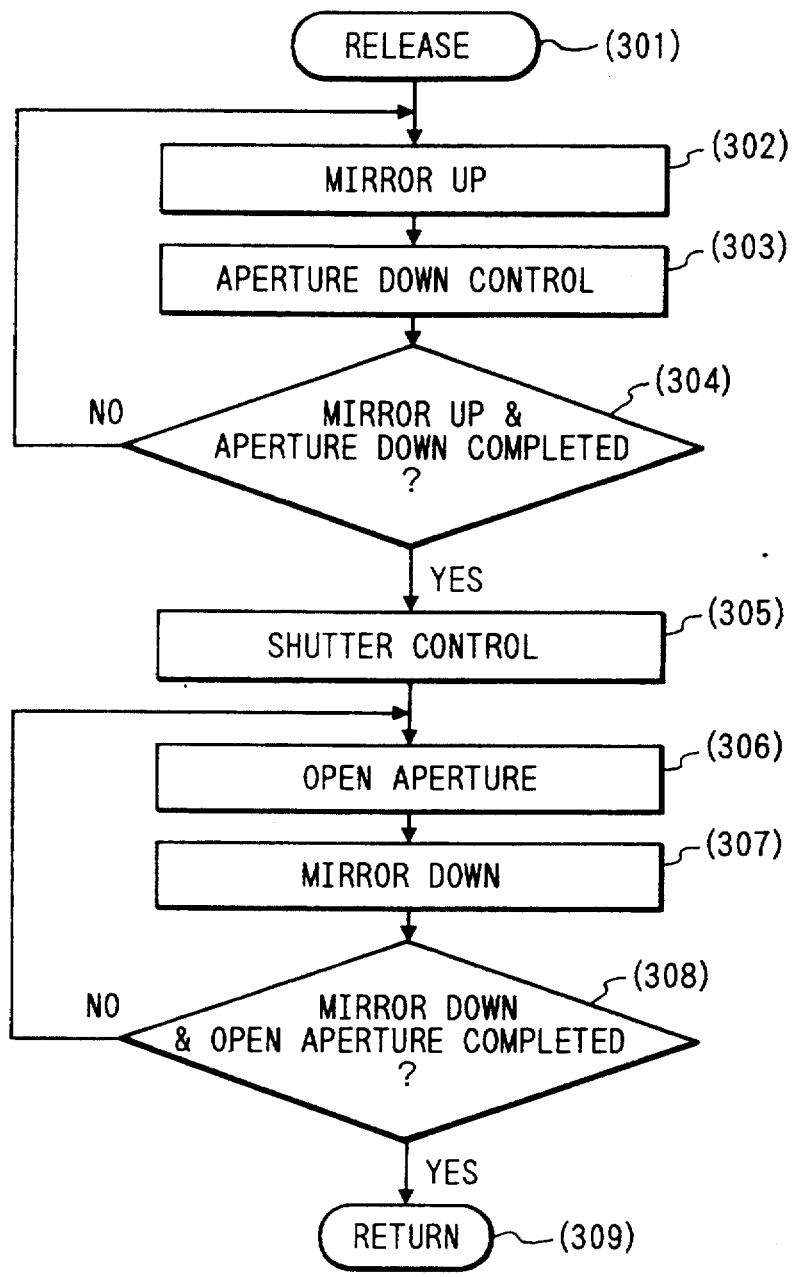
FIG. 33 is a flow chart of a "release" subroutine.

FIG. 33 shows a flow chart of a "release" subroutine.

In step 302, the quick return mirror of the camera is pivoted upward. This is performed by controlling a mirror driving motor (not shown) through the motor control circuit shown in FIG. 27.

In step 303, the aperture control value already stored in the "photometry" subroutine in step 012 is sent to the lens FLNS to cause the lens FLNS to perform aperture control.

It is determined in step 304 whether the mirror up operation and the aperture control in steps 302 and 303 are completed. Whether or not the mirror up operation is completed can be confirmed by a detection switch (not shown) attached to the mirror. Whether or not the aperture control is completed is confirmed in accordance with whether or not the lens FLNS is driven to the predetermined aperture value.

When either the mirror up operation or the aperture control is not completed, the central processing circuit PRS waits in step 304 and continues state detection. When both the mirror up operation and the aperture control are completed, the flow advances to step 305. At this time, preparation for exposure is completed.

In step 305, shutter control is performed using the shutter control value already stored in the "photometry" subroutine in step 012, thereby exposing the film.

When the shutter control is completed, a command for obtaining an open aperture state is supplied to the lens FLNS in step 306. A mirror down operation is performed in step 307. The mirror down operation is performed by controlling a mirror driving motor (not shown) as in the mirror up operation.

In step 308, the central processing circuit PRS waits for the completion of the mirror down operation and the open aperture control as in step 304. When both the mirror down operation and the open aperture control are completed, the flow advances to step 309, and the subroutine returns to the main routine.

The above flow will be summarized with reference to FIG. 29.

When only the switch SW1 is ON, steps 002, 011 to 017, and 018 are repeated. During execution in steps 012 to 015, an interruption from step 021 is executed every 5 msec. The switch SW2 is determined to be turned off in step 022, and the interruption returns to the main routine.

When the switch SW2 is turned on during the above cycle, the ON operation of the switch SW2 is determined by the first timer interruption upon the ON operation of the switch SW2 in step 022, and the flow advances to step 024. This flow is based on an assumption that the release operation will be performed for the first time. For this reason, the charge/feed operation has been completed. The ON state of the switch SWCH is determined in step 024, and the flow advances to step 025. However, execution of step 025 is meaningless, so that the flow advances to step 026. When the flow advances to step 026 for the first time, the flag AFFLG is set at "0", and the flow returns to step 023. When the AF operation and the timer interruption are alternately performed, and the AF operation is completed, the flow advances from step 017 to step 019. The flag AFFLG is set at "1", and the flow returns to step 002. In the first timer interruption upon advance from step 011 to step 012, the flow reaches steps 022 to 026. In step 026, the flag AFFLG=1 is determined, and the flow is allowed to advance to step 027 to perform the release operation.

Upon completion of the release operation, the flag AFFLG is reset to "0". While the charge/feed operation is started in step 026, the flow returns to step 023. The flow advances from step 011 to step 012 to start the next AF operation.

In the timer interruption during the initial period of the ON state of the switch SW2, since the switch SWCH is kept off, and the flag AFFLG is set at "0", the AF operation is repeated. When the switch SWCH is turned on first, the charge/feed operation is stopped. The central processing circuit PRS waits for the flag AFFLG=1, i.e., completion of one AF cycle. When the flag AFFLG is set at "1", the release operation is performed.

On the other hand, when the flag AFFLG is set at "1" first, the AF operation is repeated, and the central processing circuit PRS waits for the ON operation of the switch SWCH. When the switch SWCH is turned on, a film feed motor (not shown) is stopped, and the release operation is started.

Figure 34B:
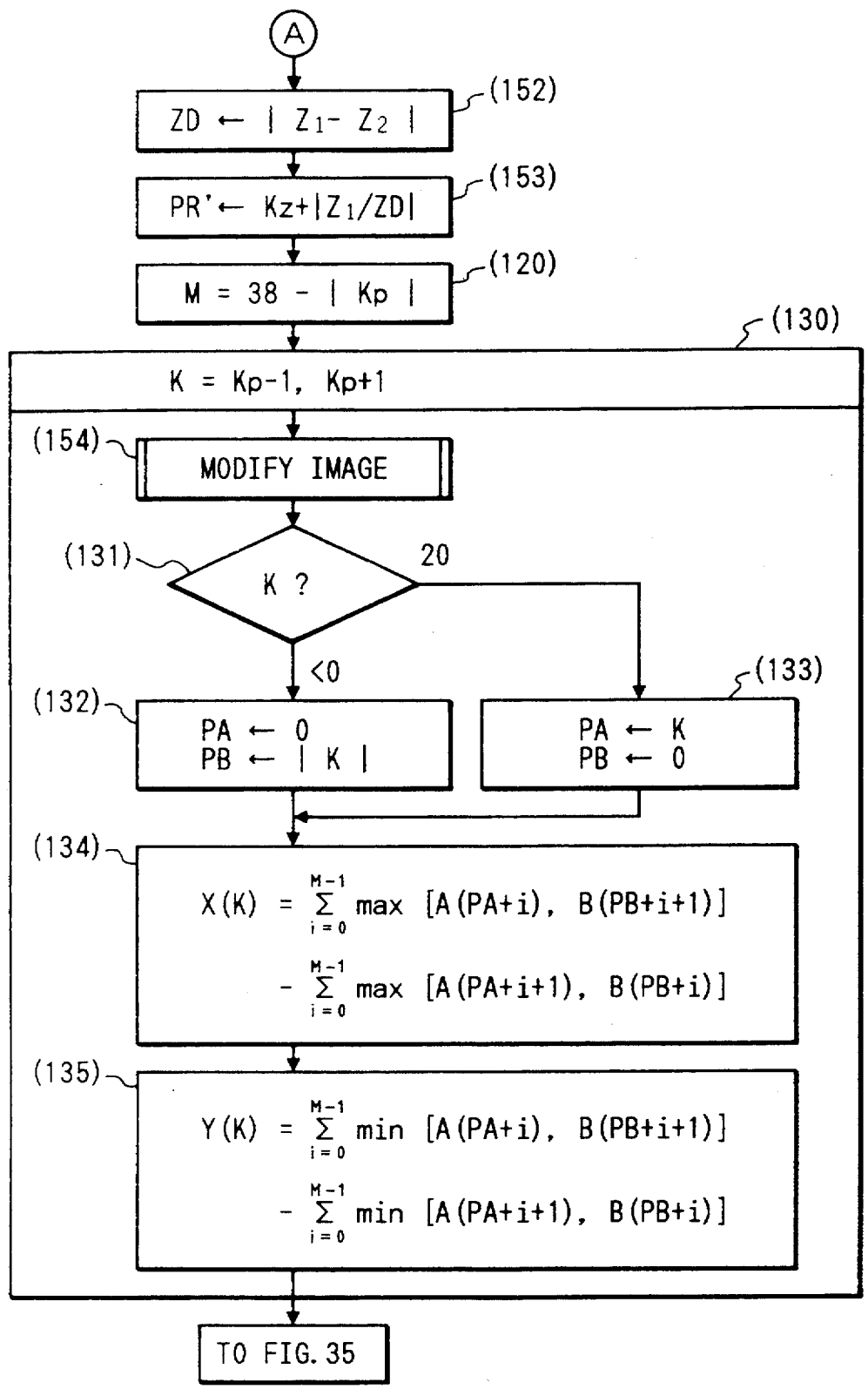

FIGS. 34 and 35 are flow charts of a "defocus calculation" subroutine. Correlation operations used in this subroutine and then the processing steps will be described in detail below.

Signal processing methods for detecting image deviation amounts from image signals output from arrays each consisting of a pair of sensor elements are disclosed in Japanese Laid-Open Patent Application Nos. 58-142306, 59-107313, and 60-101513. More specifically, assume that the number of picture elements constituting the sensor array is defined as N, and that image signals from the ith (i=0, ..., N-1) sensor array are defined as A(i) and B(i), the following equation is calculated for $k_1 \leq k \leq k_2$:

$$X(k) = \sum_{i=1}^{M-1} \max\{A(i), B(i + |k| + 1)\} -$$
$$\sum_{i=0}^{M-1} \max\{A(i + 1), B(i + |k|)\} \quad (k < 0)$$
$$= \sum_{i=0}^{M-1} \max\{A(i + k), B(i + 1)\} -$$
$$\sum_{i=0}^{M-1} \max\{A(i + k + 1), B(i)\} \quad (k \geq 0)$$
$$= X_1(k) - X_2(k)$$

or $$X(k) = \sum_{i=1}^{M-1} \min\{A(i), B(i + |k| + 1)\} -$$
$$\sum_{i=0}^{M-1} \min\{A(i + 1), B(i + |k|)\} \quad (k < 0)$$

-continued
$$= \sum_{i=0}^{M-1} \min\{A(i + k), B(i + 1)\} -$$
$$\sum_{i=0}^{M-1} \min\{A(i + k + 1), B(i)\} \quad (k \geq 0)$$
$$= X_1(k) - X_2(k)$$

where M is the number of calculation picture elements represented by $M=N-|k|-1$, k is called the relative displacement amount, so that $k_1$ and $k_2$ are often defined as $-N/2$ and $N/2$, max{a,b} is an operator for extracting a larger one of a and b, and min{a,b} is an operator for extracting a smaller one of a and b. Terms $X_1(k)$, $X_2(k)$, $Y_1(k)$, and $Y_2(k)$ in equations (1) and (2) can be defined as broad correlation amounts. When equations (1) and (2) are examined in detail, $X_1(k)$ and $Y_1(k)$ represent correlation amounts by a $(k-1)$ displacement, and $X_2(k)$ and $Y_2(k)$ represent correlation amounts by a $(k+1)$ displacement. Therefore, an evaluation amount $X(k)$ as a difference between the amounts $X_1(k)$ and $X_2(k)$ represents an amount of change in correlation amount of each of the image signals A(i) and B(i) by a relative displacement amount k.

As can be apparent from the above definitions, the correlation amounts $X_1(k)$ and $X_2(k)$ become minimum when the correlation between the two images is maximum. The amount of change $X(k)$ as the correlation amount is "0" when the correlation between the two images is maximum, and has a negative slope. However, since $X(k)$ is discrete data, actually, the peak of the correlation amount is assumed to be present in an interval [kp·kp+1] under the following conditions:

$$X(kp) \geq 0, \; X(kp+1) < 0 \quad (3)$$

and $X(kp)-X(kp+1)$ is maximum.

For this reason, the following interpolation is performed to detect the image deviation amount PR in units of sub-picture elements:

$$PR = kp + \frac{X(kp)}{X(kp) - X(kp + 1)} \quad (4)$$

On the other hand, the correlation amounts $Y_1(k)$ and $Y_2(k)$ are maximum when the correlation between the two images is maximum according to the above definitions. The amount of change $Y(k)$ as the correlation amount is "0" when the correlation between the two images is maximum, and has a positive slope. The peak of the correlation amount is assumed to be present in an interval [kp·kp+1] under the following conditions:

$$Y(kp) \leq 0, \; Y(kp+1) > 0 \quad (6)$$

and $Y(kp)-Y(kp+1)$ is maximum.

For this reason, the following interpolation is performed to detect the image deviation amount PR in units of sub-picture elements:

$$PR = kp + \left| \frac{Y(kp)}{Y(kp) - Y(kp + 1)} \right| \quad (7)$$

The image deviation amount can be detected regardless of whether the focus evaluation amount $X(k)$ or $Y(k)$ is used. As can be apparent from U.S. Pat. No. 4,618,236, the focus evaluation amount $X(k)$ is used for $|X(kp)-X(kp+1)| > |Y(kp+1)-Y(kp)|$, and the focus evaluation amount Y(k) is used for $|X(kp)-X(kp+1)| > |Y(kp+1)-Y(kp)|$ to obtain the image deviation amount PR with a higher S/N ratio.

Referring back to the flow chart in FIGS. 34 and 35, step 100 represents an "A1" processing step in this embodiment. In steps 100 to 105, the focus evaluation amount X(k) is obtained when the relative displacement amount k is changed within the range of "−20 to 20". The range of the relative displacement amount k is defined to be −20 to 20 because the number of picture elements of the sensor array is assumed to be "40". The range of processing target picture elements may be set variable in accordance with the focal length of the phototaking lens.

In step 150, image correction is performed to eliminate the influence of vignetting of the distance measuring beam. The "image correction" subroutine will be described in detail later. The image-corrected data can restore the similarity of the pair of images, and the precision of the correlation calculation is improved.

In step 101, the calculation picture element count M is calculated by $M=39-|k|$. The calculation picture element count M is set variable in accordance with the relative displacement amount k. The count M is decreased as the absolute value of the relative displacement amount k is increased. This is because when the relative displacement amount k is increased, the outputs from the corresponding sensors are omitted from the end. The sign (positive or negative) of the relative displacement amount k is checked in step 102. A start picture element position PA or PB for starting the calculation of the A or B image in accordance with the sign is calculated in step 103 or 104. The focus evaluation amount X(k) is calculated in step 105.

Figure 36A:
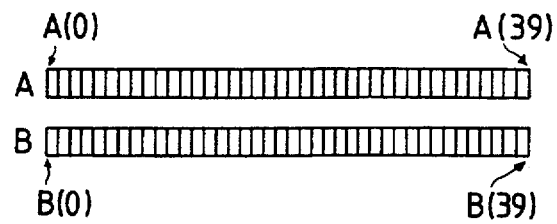
FIGS. 36A to 36D are views for explaining a correspondence between a relative displacement and calculation picture elements.
Figure 36B:
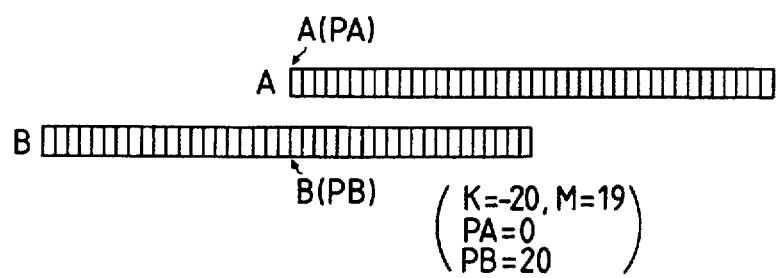

Processing in steps 100 to 105 will be described with reference to FIGS. 36A to 36D. FIG. 36A represents the two image signals A(i) and B(i). FIG. 36B represents a corresponding relationship of sensor arrays at $k=-20$. At this time, when $M=39-|20|=19$, PA is "0" and PB="20".

Since the relative displacement amount k is a negative value, the B image is relatively displaced to the left by k picture elements (−20 picture elements). The value calculated by the relationship obtained by displacing the B image by one picture element to the left from the above corresponding relationship is the first term of the equation for obtaining X(−20). The value calculated by the relationship obtained by displacing the A image by one picture element to the left from the above corresponding relationship is the first term.

Figure 36C:
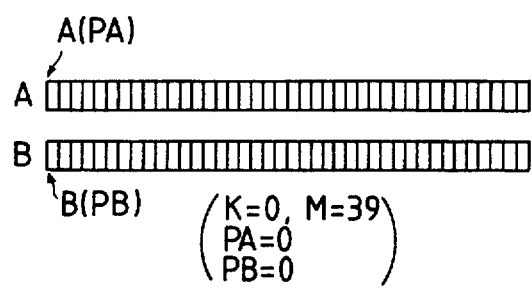
Figure 36D:
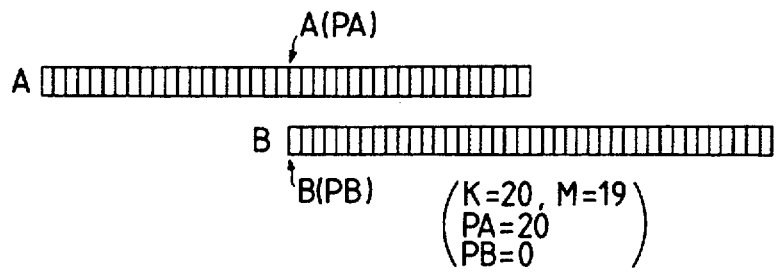

Since the A and B images are displaced every picture element to the left in the first and second terms, the calculation picture element count M is not defined as $M=40-|k|$ but as $M=39-|k|$. FIG. 36C shows a corresponding relationship at $k=0$. FIG. 36D shows a corresponding relationship of the correlation calculation at $k=20$ and represents the A image displaced by 20 picture elements to the left, unlike the case in FIG. 36B.

Figure 37:
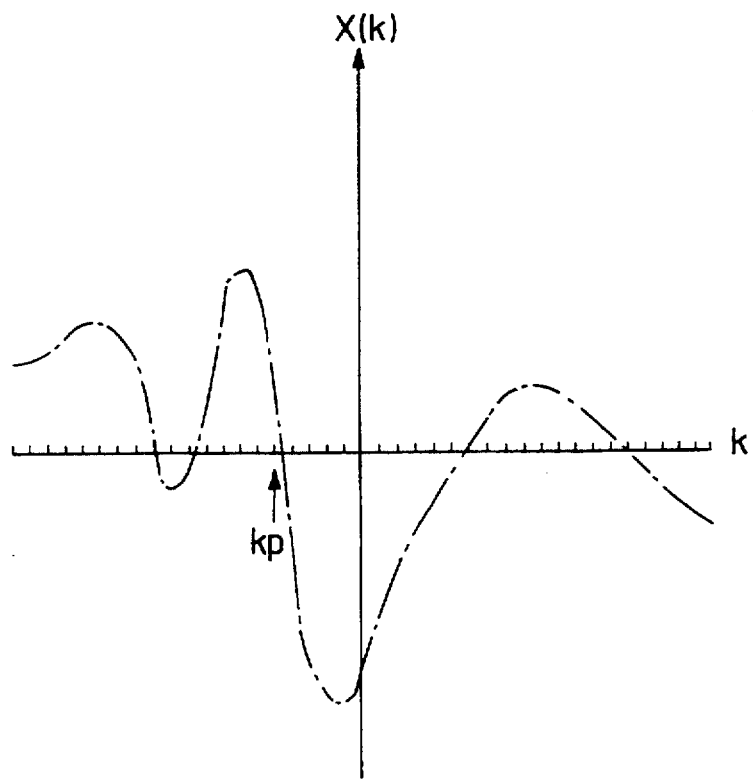
FIG. 37 is a graph showing the relationship between the relative displacement and the focus evaluation amount.

FIG. 37 is a graph obtained by plotting the focus evaluation values X(k) as described above.

Referring back to the flows in FIGS. 34 and 35, the peak value kp of the image deviation amount between two images, the A and B images in units of picture elements is detected. In steps 120 to 146, the image deviation amount PR in units of sub-picture elements is obtained. In steps 120 to 135, the two focus evaluation amounts X(k) and Y(k) are calculated again in steps 120 to 135 on the basis of the peak value kp obtained in step 110.

The above re-calculation is performed due to the following two reasons. According to one reason, in the step of calculating the peak value kp, the calculation picture element count M is set variable in accordance with the relative displacement amount k. When the focus evaluation amount X(k) calculated within the variable calculation range is interpolated to obtain the image deviation amount PR in units of sub-picture elements, an error caused by the non-coincidence of the calculation picture element count M may be included. The other reason lies in that a combination of X(k) and Y(k) is better than only the focus evaluation amount X(k) to obtain the image deviation amount PR so as to obtain a higher S/N ratio depending on the signal patterns of the object, as described in U.S. Pat. No. 4,618,236. Judging from the above, the focus evaluation amounts X(k) and Y(k) are simultaneously obtained on the basis of the peak value kp in steps 120 to 135 while the calculation picture element count M is kept constant (step 120).

The image deviation calculation using the constant calculation picture element count M is called a re-correlation calculation.

As will be described in an "image correction" subroutine in detail, the image correction filters used in step 150 are determined as a function of the relative displacement amount k. However, since the re-correlation calculation aims at obtaining the image deviation amount in units of sub-picture elements, the image correction filter must be set more strictly. For this purpose, processing in steps 151 to 153 is performed to obtain the relative displacement amount k for producing the image correction filters at a resolution of less than the units of picture elements.

In step 151, kz, $z_1$, and $z_2$ are set from the value kp obtained in the above step. In steps 152 and 153, $ZD=|z_1-z_2|$ and $PR'=kz+|z_1/ZD|$ are calculated. Note that this indicates that the "A2" processing step is performed using the fixed filter regardless of the relative displacement amount.

In step 120, $M=38-|kp|$ is calculated to obtain the value of the calculation picture element count M. In steps 130 to 135, the focus evaluation amounts X(k) and Y(k) are obtained at three points, i.e., $k=kp-1$, kp, and $kp+1$ using the kp as the center in the same manner as described above. In the calculation of the calculation picture element count M, the absolute value of each of the three points $k=kp-1$, kp, $kp+1$ is fixed to the calculation picture element count M at the maximum relative displacement amount.

Step 130 corresponds to the "A2" processing step.

In step 154, each image correction filter is produced using the value PR', and the corresponding image is corrected with high precision. In step 130, the operation in step 154 is repeated three times. In this case, the image correction using the same correction filter is performed three times.

In this embodiment, the calculating means has the "A1" processing step performed using the filter determined in accordance with the relative displacement amount and the "A2" processing step performed next to the "A1" processing step, using the fixed filter regardless of the relative displacement amount. The filter in the "A2" processing step is determined on the basis of the image deviation amount obtained in the "A1" processing step.

Figure 38:
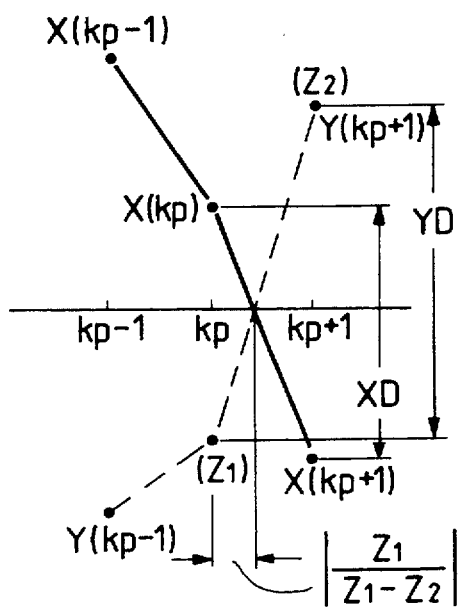
FIG. 38 is a view for explaining a method of calculating an image deviation on an order of sub-picture element.

The image deviation amounts kpx and kpy based on the focus evaluation amounts in units of picture elements are detected from the focus evaluation amounts X(k) and Y(k) (steps 140 and 141). At this time, XD (XD=(X(kpx)−X(kpx+1)) and YD (YD=Y(kpx+1)−Y(kpx)) roughly representing the contrast evaluation amounts of the focus evaluation amounts X(k) and Y(k) are also calculated due to the following reason. If a non-in-focus amount is large, the contrast evaluation amounts XD and YD obtained in consideration of the image information at the end portions are checked to obtain information as if the image signals at the end portions are checked every relative displacement. When the contrast evaluation amounts XD and YD are larger, the S/N ratio is higher. When the two contrast evaluation amounts XD and YD are compared and XD≧YD is satisfied in step 142, the focus evaluation amount X(k) is employed (step 143). However, if XD<YD is satisfied, the focus evaluation amount Y(k) is employed (step 144). In steps 145 and 146, an interpolation calculation is performed by PR=kz+$|z_1/ZD|$ using the employed ZD($z_1-z_2$) and kz, thereby obtaining the image deviation amount PR in units of sub-picture elements. This process is shown in FIG. 38. In this case, since condition XD<YD is established, the focus evaluation amount Y(k) is employed. kz=kpy, $z_1$=(kP), and $z_2$=Y(kp+1) are used in the calculation of the image deviation amount PR in units of sub-picture elements. In step 130, since filter processing using a predetermined correction filter is performed, the meanings of the focus evaluation amounts at kpx and kp(x+1) are identical.

When the image deviation amount in units of sub-picture elements is obtained, the defocus amount is calculated on the basis of this image deviation amount. An "image deviation sensitivity calculation" subroutine for obtaining a defocus amount conversion coefficient α from the required image deviation amount is executed in step 155.

In step 156, by using the defocus conversion coefficient α, the image deviation amount PR, and a constant G determined by the re-imaging optical system, the following calculations are performed to determine the DEF value as the output of this subroutine:

$$DEF = \begin{cases} \alpha \times PR/(1 - \alpha \times PR/G) & (PR \geq 0) \\ \alpha \times PR/(1 + \alpha \times PR/G) & (PR < 0) \end{cases}$$

The subroutine returns to the main routine in step 157.

The "image correction" subroutine will be described below. As described above, an image on the photoelectric conversion element is defined as an optical convolution integral between an object and a point image. That is, the optical impulse response is a point image, the input is the brightness distribution of the object, and the output is an image. On the other hand, when any digital filter is determined and is subjected to the convolution integral with the image signal, the shape of the blurred image can be changed by software. This digital filter is determined in accordance with the condition of the optical system, and the total result of the two convolution integral cycles is set equivalent to one transfer function symmetrical about the vertical axis. Even if line image data represents an image asymmetrical about the vertical axis due to vignetting of the distance measuring beams, the image data can be restored to represent an object shape upon filter processing.

In particular, the similarity of the image is important in the defocus calculation. A digital filter to be selected need not be an inverse filter for restoring the asymmetrical line image caused by the optical system, but can be a filter for restoring a symmetrical image with respect to the vertical axis, as previously described.

Figure 39:
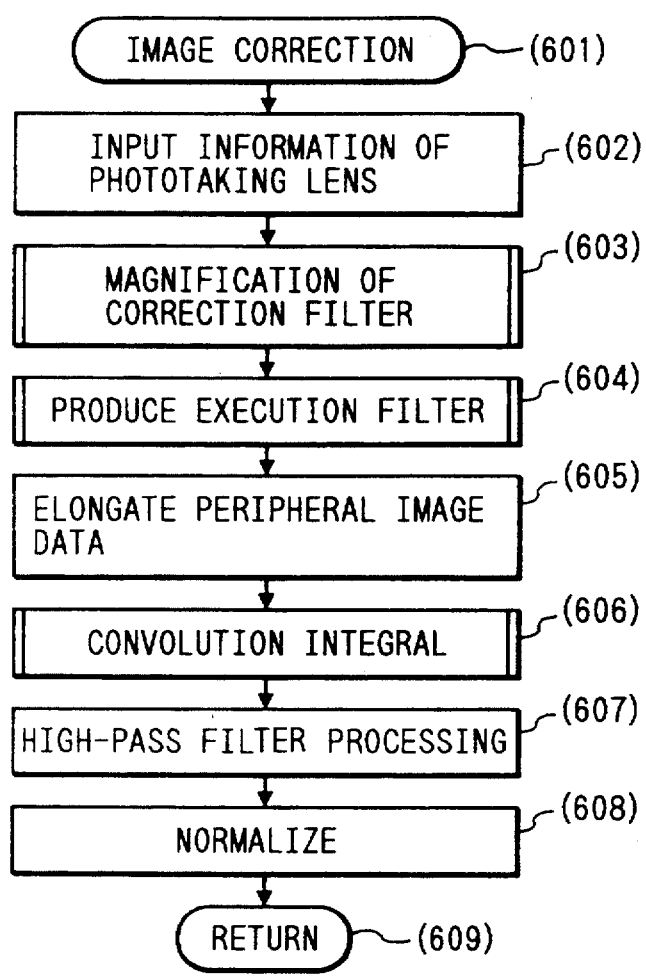
FIG. 39 is a flow chart of an "image correction" subroutine.

FIG. 39 shows the "image correction" subroutine. The blurred image is corrected such that a correction filter is produced in accordance with the state of the phototaking lens, the convolution integral between the image data and the correction filter is performed to correct the image, the corrected image data is filtered through a high-pass filter, and finally normalization is performed. The shape of the blurred image correction filter described with reference to FIG. 39 is changed in accordance with the state of the distance measuring optical system, the type of phototaking lens, its distance ring position, and the zoom position. For this reason, it is difficult to store all the data in the ROM. Only original data of the filter is stored in the ROM and is processed in accordance with the above conditions.

In step 601, information such as an open f-number, the exit pupil position, and the like of the phototaking lens is fetched.

In step 603, a "correction filter magnification" subroutine for determining parameters for producing the image correction filter is executed. The information fetched in the previous step is used in this subroutine.

In step 604, an "execution filter production" subroutine for producing a correction filter actually used in image correction is executed in accordance with the parameters. Steps 603 and 604 will be described later.

In step 605, in order to minimize the error caused particularly in peripheral image correction, both the peripheral image data are elongated in opposite sides to produce a hypothetical image signal. FIG. 40 is a view for explaining production of the hypothetical image signal. Signals having the same level as that of the peripheral value are added to both the sides of the actual central image signal.

As will be described later, this processing is required to perform image correction as the convolution integral with the image correction filter. That is, since a signal of a given picture element is corrected upon reception of an influence of a noncorrected signal located at a location remote by the image correction filter, the end portions of the actual image signal are not strictly corrected. If only a perfectly corrected image is used in focus detection, a considerably large number of image correction picture elements must be added in as the peripheral picture elements of the picture element used in the defocus calculation. However, when the defocus amount of the phototaking lens is considerably large, i.e., when the defocus amount is 5 mm or more, strict image correction precision need not be required. For this reason, the correction processing operation of the entire image signal can be performed. In order to minimize the image correction error, the peripheral image data are elongated, as illustrated in FIG. 40.

On the other hand, when the defocus amount is less than several millimeters, the image signal must be strictly corrected. The number of picture elements used in the defocus calculation is set to be smaller than 5 picture elements at each peripheral portion of the actual image signal. The length of a correction filter suitable for a given defocus amount is smaller as the defocus amount is decreased. By this characteristic, correction picture elements corresponding to the given defocus amount are arranged to cause a filter corresponding to a small defocus amount to operate without any error.

In this embodiment, the photoelectric conversion element has picture elements used for the filter processing, which elements are located outside the picture elements whose outputs are used to calculate the evaluation amounts.

Note that image data A(i) and B(i) represent data falling within the defocus calculation range, unless otherwise specified.

In step 606, the image correction filter obtained in step 604 and the hypothetical image signal obtained in step 605 are subjected to the convolution integral. By this processing, the image signal is restored to have a shape as if the distance measuring beam is not vignetted, thereby restoring the similarity between the two images. The "convolution integral" subroutine will be described in detail later.

In step 607, high-pass filter processing for eliminating a low-frequency component contained in the image signal is performed. When a strong beam spot is incident on the phototaking lens, a low-frequency ghost component may be contained in the image signal. For this reason, in order to improve the precision of the defocus calculation described with reference to FIGS. 34 and 35, a low-frequency component must be cut off.

Figure 41A:
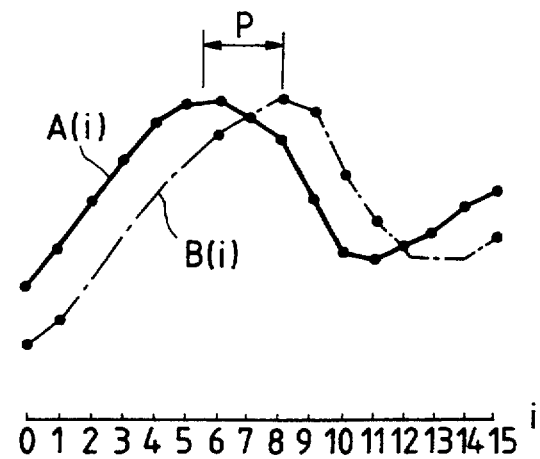
FIGS. 41A to 41C are charts showing an image signal free from low-frequency noise, an image signal superposed with low-frequency noise, and an image signal processed in high-pass filter processing, respectively.
Figure 41B:
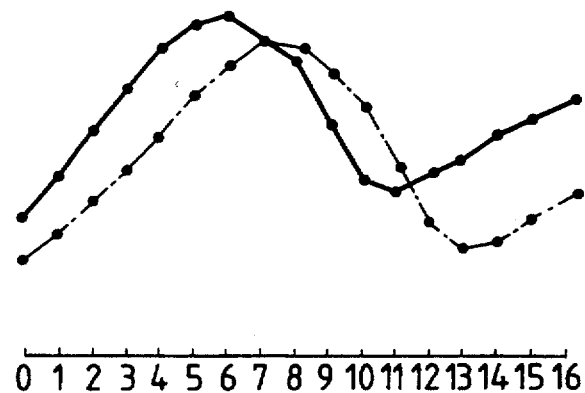
Figure 41C:
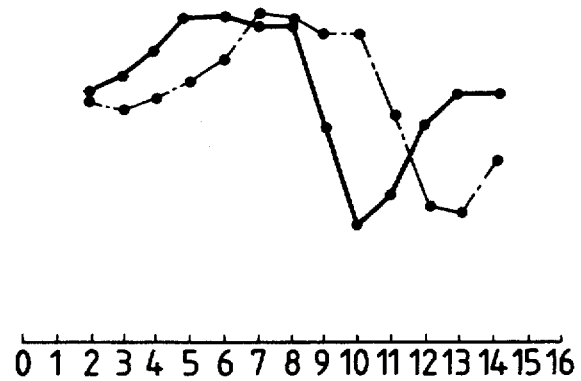

FIG. 41B shows a state in which a low-frequency component is superposed on the image signal in FIG. 41A. The filter processing of this image signal is performed as follows:

$$HA(i) = -A(i-2) + 2 \times A(i) - A(i+2)$$

where A(i) is the corrected image data, HA(i) is the high-pass filtered image data, and i is the sensor picture element position. If A(i) is substituted with HA(i) again, image data shown in FIG. 41C is obtained, and an accurate image deviation amount can be detected.

In step 608, the image data is normalized into 8-bit data, and the subroutine returns to the main routine in step 609.

The filter processing using the filter determined in accordance with the aperture ratio of the imaging optical system subjected to focus detection and the filer determined in accordance with the exit pupil position of the imaging optical system subjected to focus detection will be described below with reference to FIGS. 42 to 44D.

Figure 42:
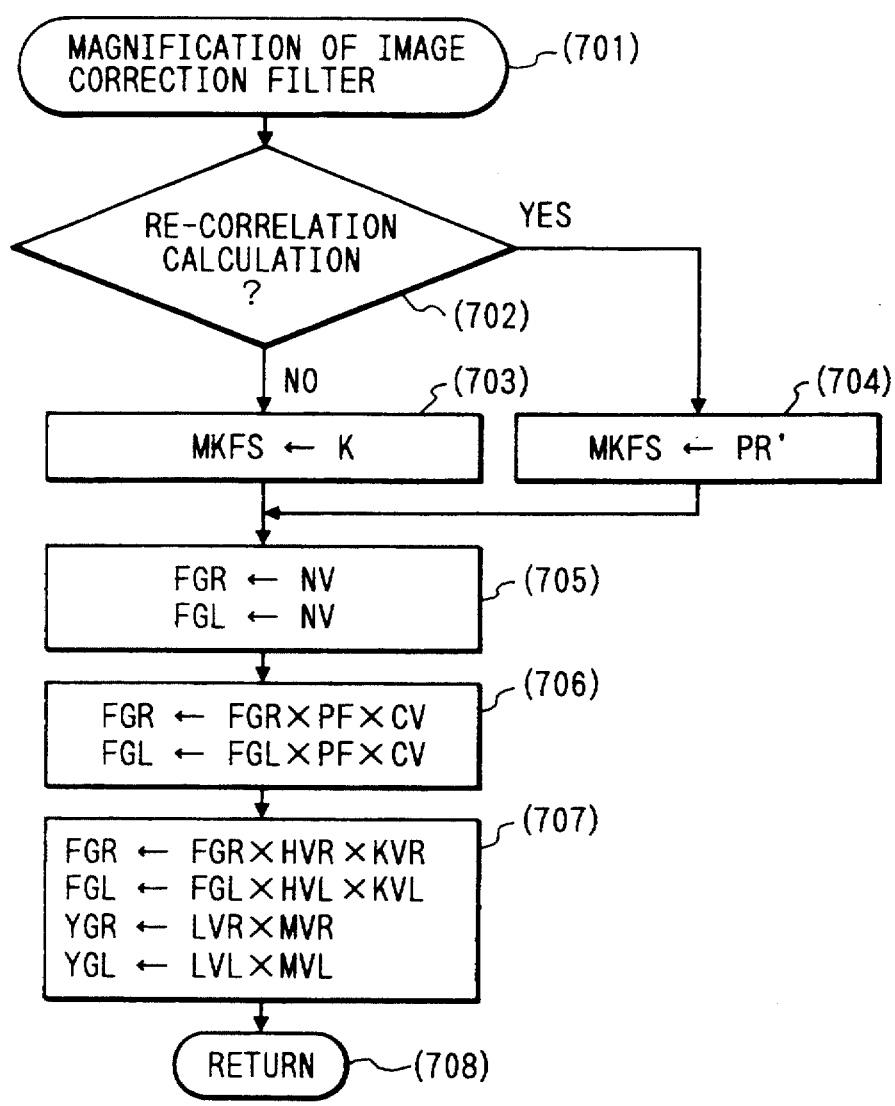
FIG. 42 is a flow chart of a "magnification of image correction filter" subroutine.
Figure 43A:
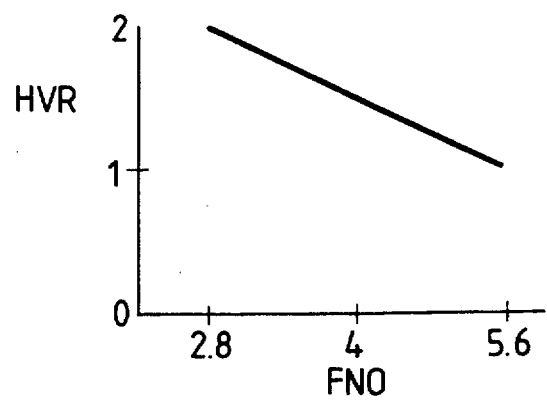
FIGS. 43A to 43D are graphs showing f-number correction coefficients and pupil position correction coefficients.
Figure 43B:
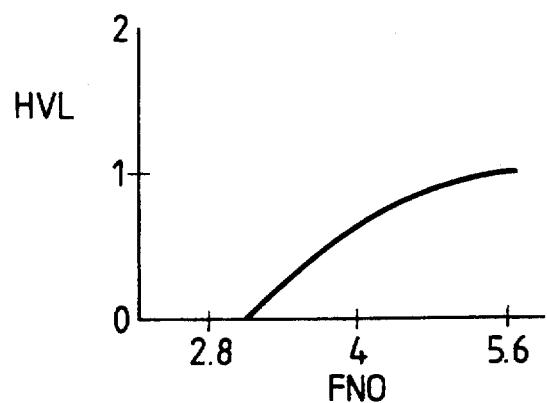
Figure 43C:
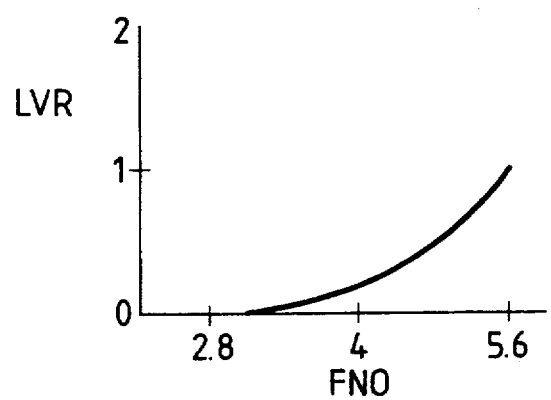
Figure 43D:
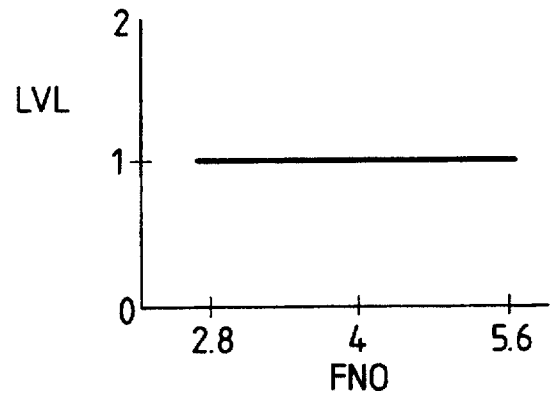
Figure 44A:
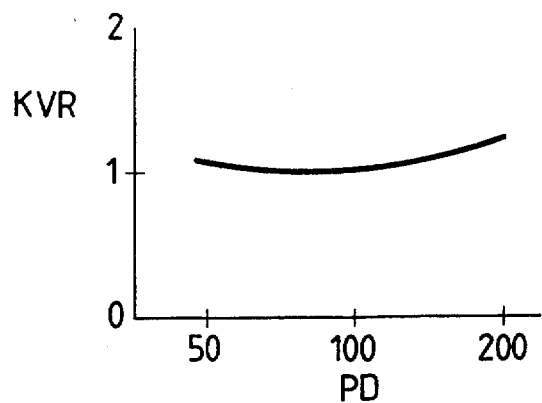
FIGS. 44A to 44D are graphs showing other f-number correction coefficients and other pupil position correction coefficients.
Figure 44B:
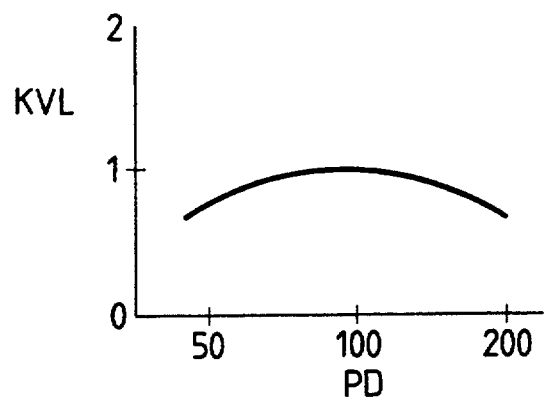
Figure 44C:
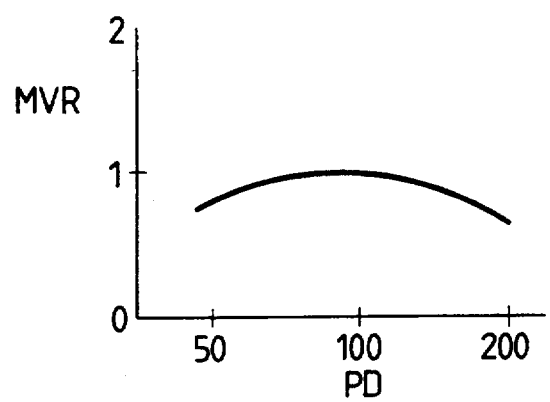
Figure 44D:
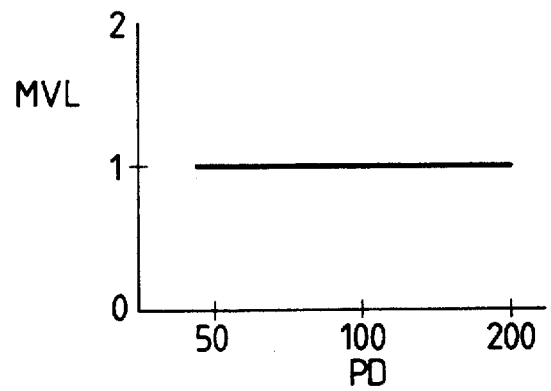

FIG. 42 shows the "correction filter magnification" subroutine. This subroutine is the preparation for producing a correction filter actually used in image correction from the original filter information of the correction filter. More specifically, a horizontal axis magnification 1FGR, a horizontal axis magnification 2FGL, a vertical axis magnification 1YGR, and a vertical axis magnification 2YGL used in the next "execution filter production" subroutine are determined. The horizontal axis magnification and the vertical axis magnification are axis magnifications for producing the correction filters by reducing or enlarging the original filter stored in the ROM.

F-number (aperture ratio) correction coefficients 1HVR to 4HVR, 1HVL to 4HVL, 1LVR to 4LVR, and 1LVL to 4LVL and pupil position correction coefficients 1KVFR to 4KVR, 1KV3L to 4KVL, 1MVR to 4MVR, and 1MVL to 4MVL used in the subsequent steps are shown in FIGS. 43A to 43D and FIGS. 44A to 44D. The f-number correction coefficients 1HVR to 4HVR, 1HVL to 4HVL, 1LVR to 4LVR, and 1LVL to 4LVL are functions of an open f-number FNO of the phototaking lens. The pupil position correction coefficients 1KVR to 4KVR, 1KVL to 4KVL, 1MVR to 4MVR, and 1MVL to 4MVL are functions of a distance PD between the exit pupil of the phototaking lens and a prospective imaging plane. These relationships are determined in accordance with the diffusion characteristics of the diffusion plate inserted in the optical path of the distance measuring optical system.

A description will be made from a re-correlation calculation in step 702 in FIG. 42. It is determined in step 702 whether this subroutine in step 100 ("A1" processing step) of the "defocus calculation" subroutine shown in FIGS. 34 and 35 is called, or this subroutine is called in step 130 ("A2" processing step). If this subroutine is called in step 100, the flow advances to step 703 (i.e., the "B1" processing step). If this subroutine is called in step 130 (i.e., the re-correlation calculation ("A2" processing step)), the flow advances to step 704 ("B2" processing step).

The calculating means of this embodiment has the "B1" processing step performed using the filter determined in accordance with the relative displacement amount and the "B2" processing step performed using the fixed filter regardless of the relative displacement amount and includes a selecting means for selecting one of the "B1" and "B2" processing steps.

In step 703, the relative displacement amount k is stored as a parameter MKFS for determining the length of the correction filter. In the "defocus calculation" subroutine described above, the value k is changed to shift the image data because the defocus amount every k is assumed. In this case, the value k is used to set the length of the correction filter on the basis of the assumed defocus amount. On the other hand, PR' having a resolution less than the units of picture elements is stored in step 704.

This step is executed when this subroutine is called in re-correlation. In this case, since the image deviation amount is almost known, MKFS=PR' is set to fix the correction filter for each relative displacement amount. This operation is performed to perform more accurate correction filtering and to improve linear interpolation precision in step 146 of the "defocus calculation" subroutine by determining a predetermined correlation evaluation amount regardless of the value of the relative displacement amount k when an image deviation amount which is less than the units of picture elements is calculated in step 146 of the "defocus calculation" subroutine in FIG. 35.

Figure 45:
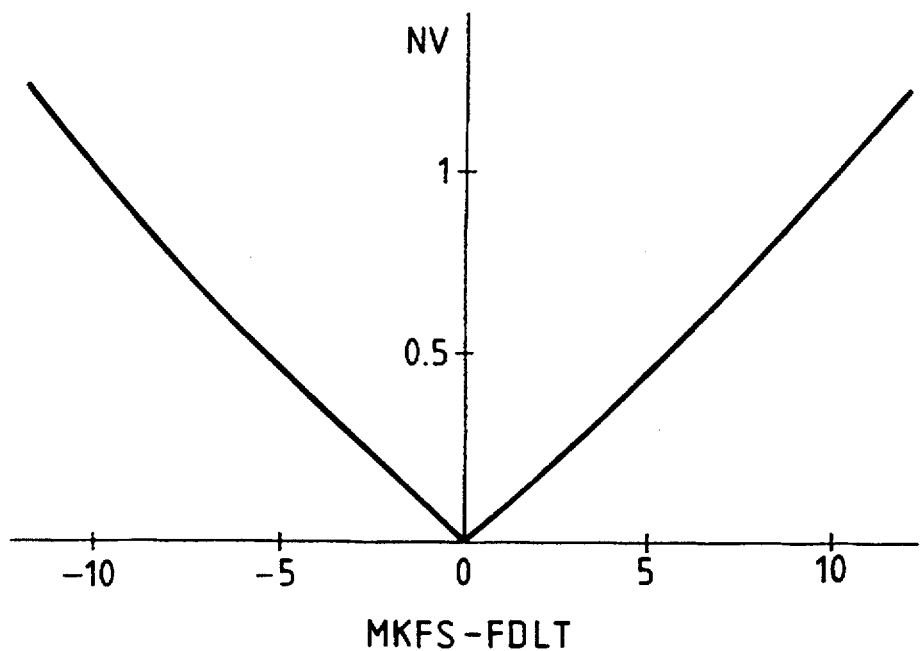
FIG. 45 is a graph showing the relationship between MKFS-FDLT and NV.

In step 705, a parameter NV determined by the defocus amount of the assumed phototaking lens is stored as the horizontal axis magnification 1FGR and the horizontal axis magnification 2FGL. This parameter NV is a function of MKFS-FDLT shown in FIG. 45. FDLT is the correction term for operating the correction filter to some extent even if the image becomes asymmetrical due to the aberration of the phototaking lens and vignetting of the beam in the zero defocus state of the phototaking lens.

The filter corrects the first and second signals even if the relative displacement amount is zero.

The parameter NV generally assumes a value of 1 or less, and the original filter is enlarged to produce an execution filter, thereby preventing degradation of precision. Since the defocus amount of the phototaking lens is almost proportional to the size of the blurred image, NV has characteristics almost proportional to the absolute value of the MKFS-FDLT. Note that the parameter NV is not perfectly proportional due to the aberration of the re-imaging lens. The secondary term is added in consideration of the above aberration to determine the MKFS-FDLT in FIG. 45.

Figure 46:
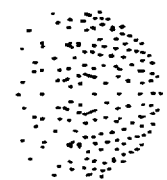
FIG. 46 is a spot diagram of a point image.

The FDLT used herein will be described in more detail. When the distance measuring beam is vignetted in the in-focus state of the phototaking lens, a point image on the photoelectric conversion element is not symmetrical about the vertical axis, as will be described with reference to FIG. 46. FIG. 46 shows a spot diagram on the photoelectric conversion element in the in-focus state. The direction of an arrow is the line-up direction of the picture elements. Asymmetry of the light amount distribution is found in this direction. By setting the FDLT, this asymmetry can be eliminated. A slight image noncoincidence in the in-focus state can be corrected. The FDLT value is stored in the ROM in the phototaking lens and is properly fetched in the RAM in the microcomputer through the communication between the phototaking lens and the camera body.

In step 706, the product of the horizontal magnification 1FGR, the distance measuring field position PF, and a proportional constant CV is stored as the horizontal axis magnification 1FGR. The product of the horizontal axis magnification 2FGL, the distance measuring field position PF, and the proportional constant CV is stored as the horizontal axis magnification 2FGL. These storage operations can be performed since the degree of vignetting of the distance measuring beam is approximately proportional to the distance from the optical axis of the phototaking lens to the distance measuring field.

That is, the filter processing is performed using a filter determined by the distance from the optical axis of the imaging optical system subjected to focus detection to the distance measuring distance determined in accordance with the photoelectric converting means.

In particular, in this embodiment, when the defocus amount conversion calculation of the image deviation amount is performed to detect the imaging state of the imaging optical system, the defocus conversion calculation of the image deviation amount is set as a function of a representative distance from the optical axis of the imaging optical system subjected to focus detection to the distance measuring field determined by the photoelectric converting means comprising a plurality of picture elements.

In step 707, the product of the horizontal axis magnification 1FGR, the f-number correction coefficient 1HVR, and the pupil position correction coefficient 1KVR is stored as the horizontal axis magnification 1FGR, and the product of the horizontal axis magnification 2FGL, the f-number correction coefficient 2HVL, and the pupil position correction coefficient 2KVL is stored as the horizontal axis magnification 2FGL.

The product of the f-number correction coefficient 3LVR and the pupil position correction coefficient 3MVR is stored as the vertical axis magnification 1YGR, and the product of the f-number correction coefficient 4LVL and the pupil position correction coefficient 4MVL is stored as the vertical axis magnification 2YGR, thereby specifying all the final correction coefficients.

The subroutine returns to the main routine in final step 708.

Figure 47:
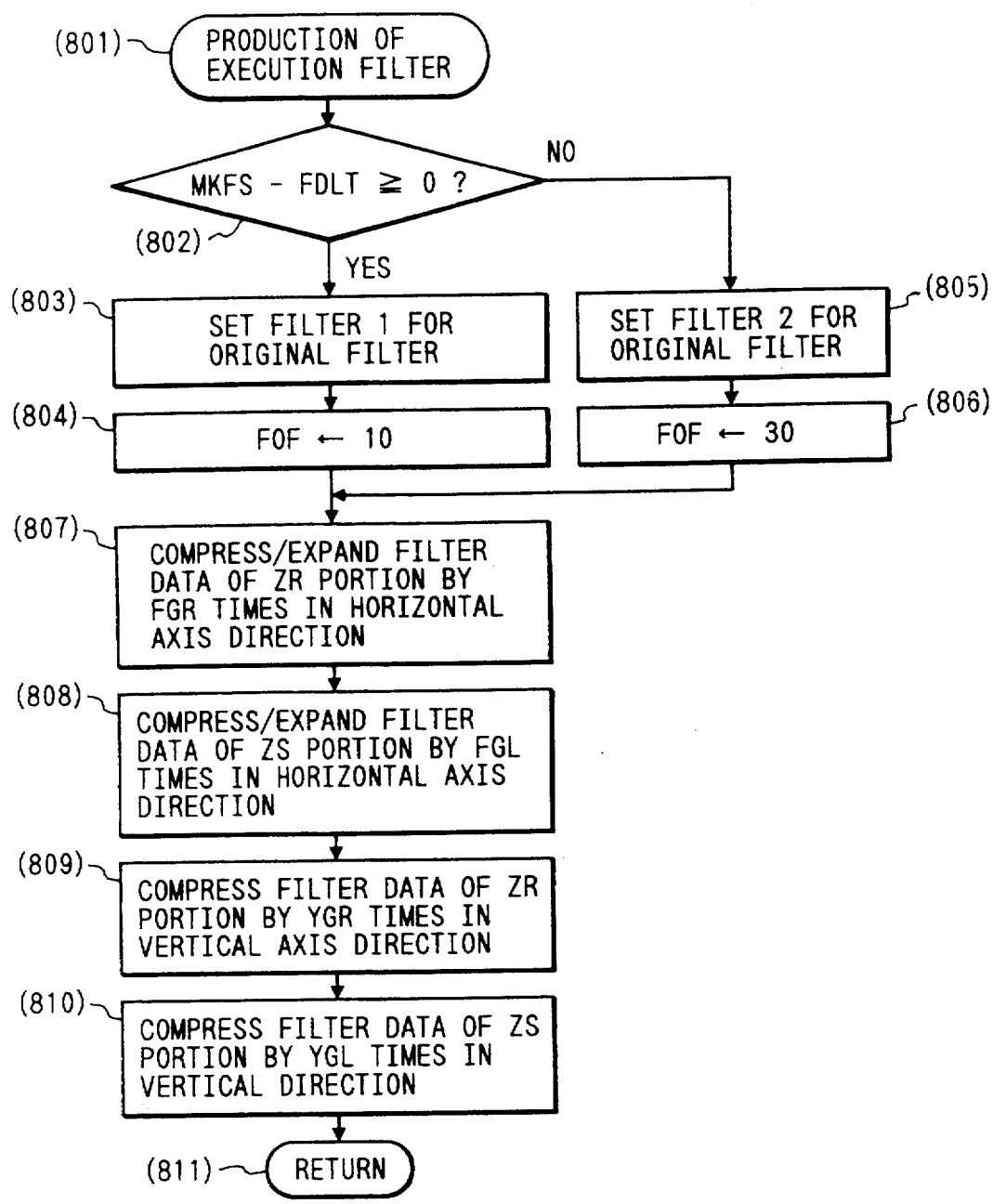
FIG. 47 is a flow chart of a "production of execution filter" subroutine.

FIG. 47 shows the "execution filter production" subroutine. In this subroutine, a correction filter is produced from the original filter in accordance with the axis magnifications determined in the previous "correction filter magnification" subroutine. Two different original filters are stored in the ROM and are selectively used in accordance with the positive or negative sign of the MKFS-FDLT due to the following reason. The shape of a line image is determined by mainly the re-imaging lens regardless of the type of phototaking lens. In addition, the sign of the MKFS-FDLT can be determined in accordance with the front-focus and rear-focus states. In other words, since the re-imaging lens comprises a single lens, the aberration of the single lens is considerably larger than that of the phototaking lens.

Figure 48:
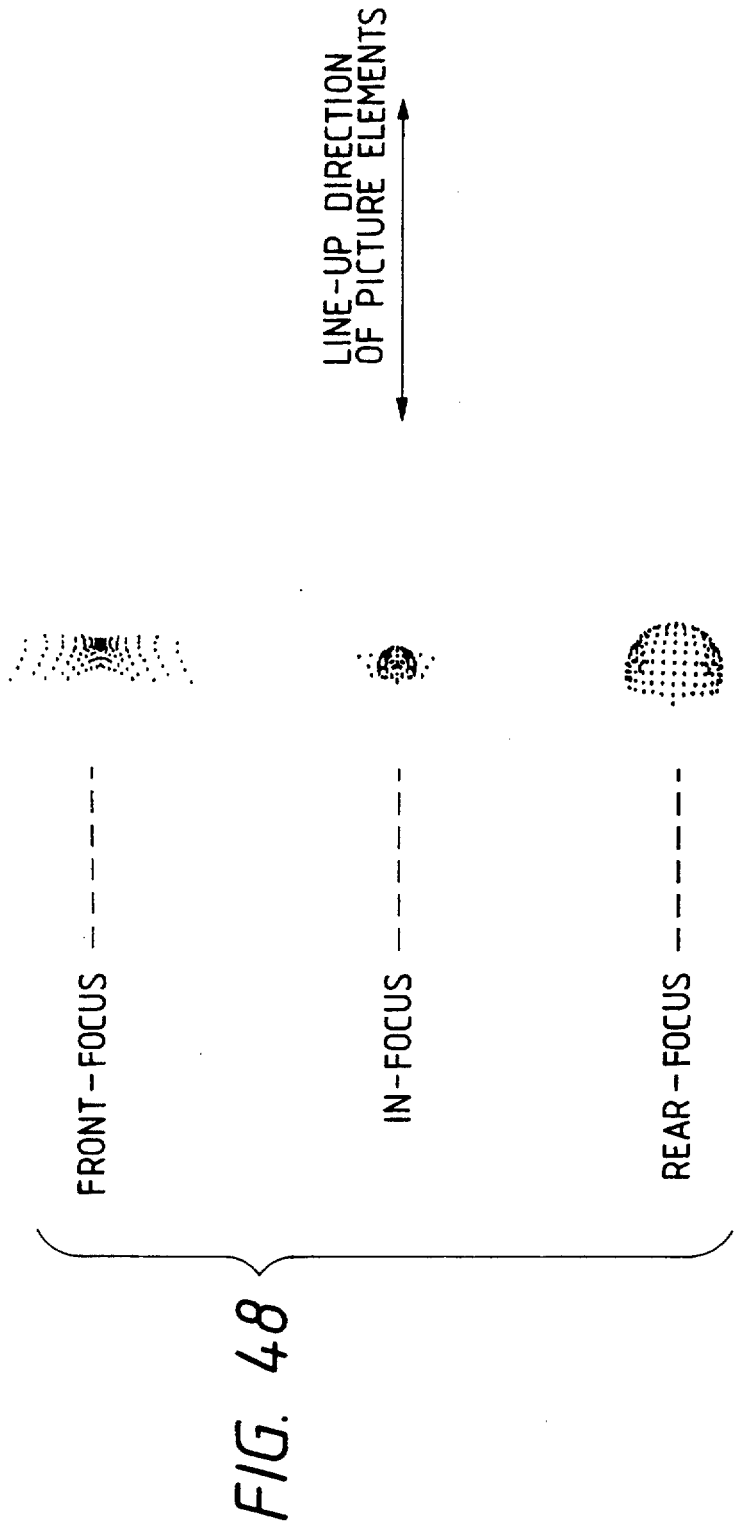
FIG. 48 is a spot diagram for explaining changes in a point image in different imaging states.

FIG. 48 is a view for explaining this, showing a spot diagram when the object distance is shifted between the front and rear sides of the in-focus position. The primary image of the object is set on three points on the optical axis of the phototaking lens. A beam reaching the photoelectric conversion element through a dark phototaking lens is traced. When the distance measuring beam is vignetted in this manner, the right side of the point image is omitted in the front-focus state. Similarly, the left side of the point image is omitted in the rear-focus state. This indicates that the direction of tailing of the point image in the front-focus state is opposite to that in the rear-focus state. In addition, since the shape of the point image in the front-focus state is entirely different from that in the rear-focus state, it is apparent that the correction filters suitable for these states are not identical even if one of the filters is reversed.

The "execution filter production" subroutine will be described with reference to FIG. 47.

In step 802, the sign of the MSFS-FDLT is checked. If the sign is positive or zero, the flow advances to step 803. However, if the sign is negative, the flow advances to step 805.

Figure 49A:
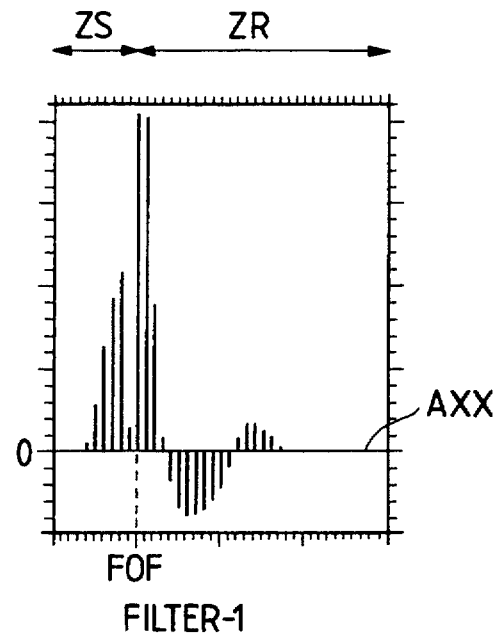
FIGS. 49A and 49B are views showing original filters, respectively.
Figure 49B:
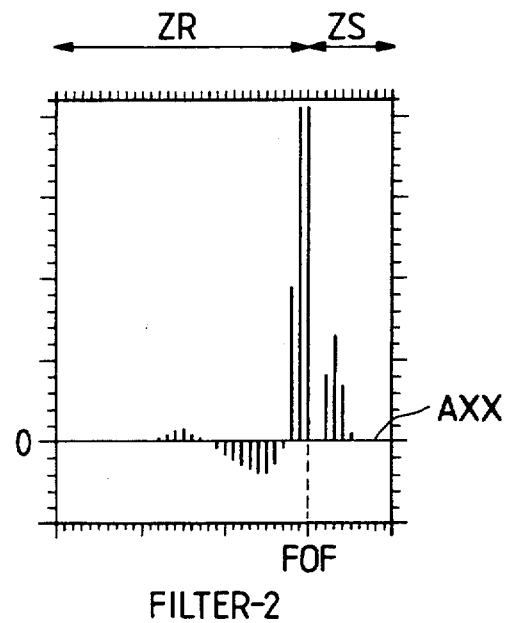

In step 803, a "first original filter 1" shown in FIG. 49A is selected as the original filter and stored as the correction filter in the RAM. In step 804, 10 is stored in the FOF. In step 805, a "second original filter 2" shown in FIG. 49B is selected from the original filters and stored as the correction filter in the RAM. In step 806, 30 is stored in the FOF. Note that each original filter comprises 41 8-bit data. The FOF is a variable representing the position of origin of the original filter data. The FOF is set as a variable because the original filter is elongated in one direction with respect to the origin.

Steps 807 to 810 are executed to produce a target correction filter by compressing or expanding the original filter data stored in the RAM as the correction filter in each previous step.

More specifically, in step 807, the ZR portion of the filter data having an effect for reducing tailing is multiplied with FGR times in the horizontal axis direction. In step 808, the ZS portion having a function of increasing tailing is multiplied with FGL times in the horizontal axis direction.

When the filter lengths are determined, the data of the ZR portion is compressed by YGR times in the vertical axis direction in step 809. In step 810, the data of the ZS portion is compressed by YGL times. Note that the data of the origin FOF is not subjected to compression.

In final step 811, this subroutine returns to the main routine.

In this embodiment, as described above, the calculating means has the first processing step of producing the filter from the first original filter information and the second processing step of producing the filter from the second original filter information and includes a selecting means for selecting one of the first and second processing steps in accordance with the relative displacement amount between the first and second signals.

The correction filter is thus produced.

In this embodiment, as described above, the first or second original filter is used in accordance with the relative displacement amount. For example, the "filter 1" mainly corresponding to the rear-focus state and the "filter 2" mainly corresponding to the front-focus state are used to produce an appropriate correction filter corresponding to any focus state.

As described in the "correction filter magnification" subroutine, the horizontal axis magnification 1FGR, the horizontal axis magnification 2FGL, the vertical axis magnification 1YGR, and the vertical axis magnification 2YGL are set as a function of the open f-number FNO of the phototaking lens, the distance PD between the exit pupil of the phototaking lens and the prospective imaging plane, and the distance measuring field position PF. Therefore, an appropriate correction filter can be formed for any distance measuring field regardless of the type of phototaking lens.

The shape of the correction filter is changed in accordance with changes in horizontal axis magnifications 1FGR and 2FGL and vertical axis magnifications 1YGR and 2YGL as follows. When the f-number of the phototaking lens is decreased, the f-number correction coefficient 2LVL and the pupil position correction coefficient 1MVL shown in FIGS. 43B and 43C come close to zero, and the vertical axis value of the ZR portion of the image correction filter comes close to zero. On the other hand, the image correction capacity of the ZS portion is gradually decreased as the filter length comes close to zero.

Since all the correction filters used for image correction are produced by using one of the two different original filters, the volume of information stored in the ROM can be small.

Figure 50:
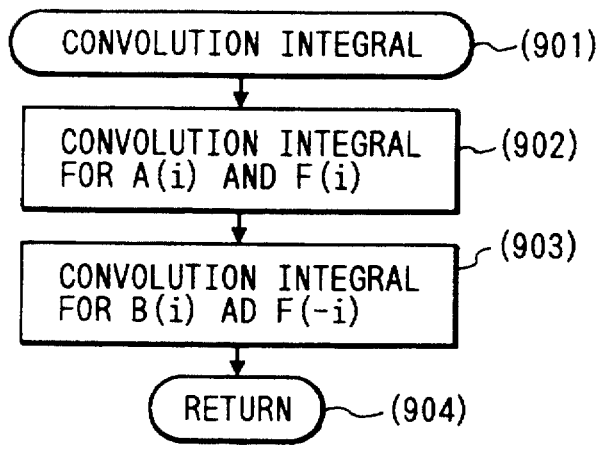
FIG. 50 is a flow chart of a "convolution integral" subroutine.

FIG. 50 shows the "convolution integral" subroutine. The convolution integral equation for discrete data is given as follows for two series D(i) and E(i):

$$S(i) = \sum_h D(h) \times E(i - h)$$

and S(i) is the output of this equation. If D(i) is defined as image data, and E(i) is a correction filter, S(i) is defined as the corrected image data. In this subroutine, a pair of secondary images are set as the image data. As previously described, since two blurred images have symmetry about the optical axis of the phototaking lens, the correction filter is reversed, and the reversed correction filter is operated for one image data, thereby obtaining corrected images.

The "convolution integral" subroutine in FIG. 50 will be described below. A pair of image data are called images OA(i) and OB(i).

In step 902, i.e., the "C1" processing step, the image OA(i) and a correction filter F(i) produced in the "execution filter production" subroutine are subjected to the convolution integral as follows:

$$A(i) = \sum_h OA(h) \times F(i - h)$$

thereby obtaining a corrected image A(i).

In step 903, i.e., the "C2" processing step, the image OB(i) and a correction filter F(-i) obtained by reversing the above filter about the origin FOF are subjected to the convolution integral as follows:

$$B(i) = \sum_h OB(h) \times F(-i - h)$$

thereby obtaining a corrected image B(i). In this manner, a single corrected filter is used in two ways, i.e., with and without a reverse operation. In the "execution filter production" subroutine described above, only one filter is produced. Therefore, the calculation time for producing the correction filter can be almost halved, and the volume of the original filter information stored in the ROM can also be reduced.

This subroutine returns to the main routine in step 904.

When the imaging state of the imaging optical system is to be detected by performing a defocus amount conversion calculation of the image deviation amount, the defocus conversion calculation of the image deviation amount is a function of the aperture ratio or exit pupil position of the imaging optical system subjected to focus detection. This will be described below.

Figure 51:
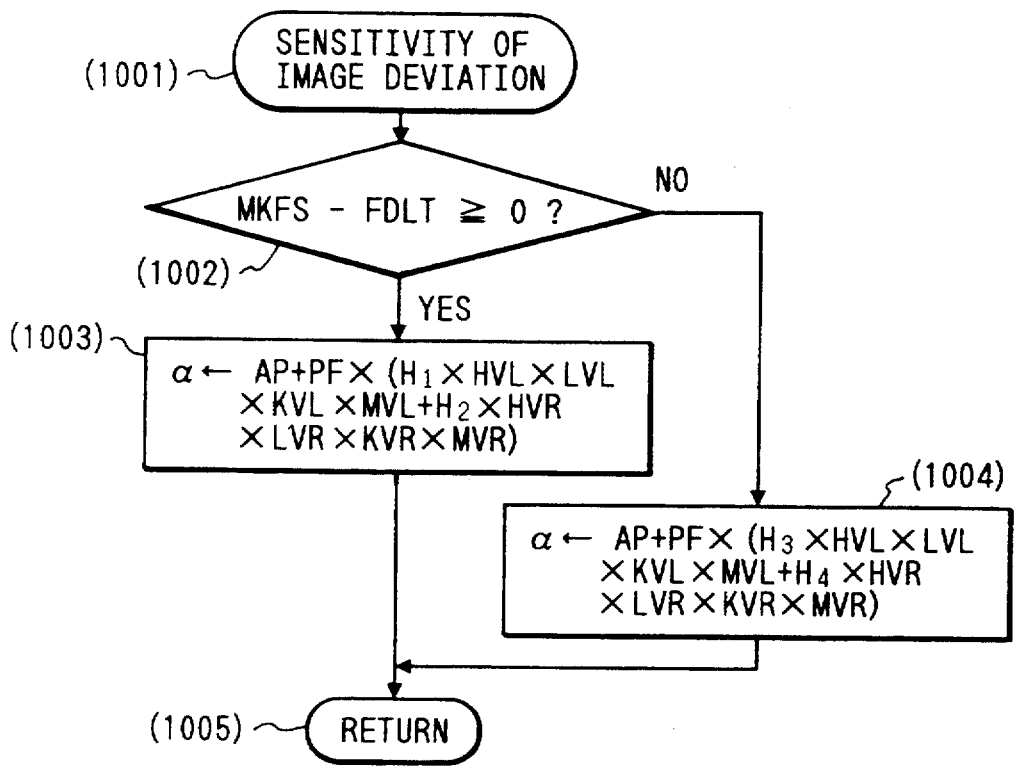
FIG. 51 is a flow chart of a "sensitivity of image deviation" subroutine.

FIG. 51 shows a "sensitivity of image deviation" subroutine. This subroutine is to calculate the defocus conversion coefficient $\alpha$ from the image deviation amount. The shape of an appropriate correction filter is changed in accordance with not only the defocus amount of the phototaking lens but also the degree of vignetting of the distance measuring beam. The sensitivity of image deviation is also a function of the open f-number, the exit pupil position, and the distance measuring distance position.

When the defocus amount conversion calculation of the image deviation amount is to be performed to detect the imaging state of the imaging optical system, the defocus conversion calculation is a function of the aperture ratio or exit pupil position of the imaging optical system subjected to focus detection, or a representative distance from the optical axis of the imaging optical system to the distance measuring field.

In step 1001, the sign of the MKFS-FDLT is checked. If the sign is positive or zero, the flow advances to step 1003. However, if the sign is negative, the flow advances to step 1004. This determination is branched in accordance with the original filter used.

In step 1003, an image deviation sensitivity AP free from vignetting of the distance measuring beam is corrected using the f-number correction coefficients 1HVR to 4HVR, 1HVL to 4HVL, 1LVR to 4LVR, and 1LVL to 4LVL, the pupil position correction coefficients 1KVR to 4KVR, 1KVL to 4KVL, 1MVR to 4MVR, and 1MVL to 4MVL, and the distance measuring field position PF. The correction equation is given as follows:

$$a = AP + PF \times (H1 \times HVL \times LVL \times KVL \times MVL \times H - 2 \times HVR \times LVR \times KVR \times MVR)$$

where H1 and H2 are correction coefficients by the shape of the correction filter.

Similarly, in step 1004, the image deviation sensitivity is determined using correction coefficients H3 and H4 as follows:

$$a = AP + PF \times (H3 \times HVL \times LVL \times KVL \times MVL + H4 \times HVR \times LVR \times KVR \times MVR)$$

In final step 1005, this subroutine returns to the main routine.

As described above, the image deviation sensitivity $\alpha$ of each correction filter is prepared on the basis of the corresponding equation as a function of the open f-number FNO of the phototaking lens, the distance PD between the exit pupil of the phototaking lens and the prospective imaging plane, and the distance measuring field position PF. An accurate defocus calculation of each distance measuring field can be performed regardless of the type of phototaking lens.

The above equations will be described below. According to the characteristic features of the image correction filters, the ZS portion has a function of increasing the tails of the image, and the ZR portion has a function of decreasing the tails of the image, as described previously with reference to FIGS. 23A to 23C. These functions will be taken into consideration in view of image movement. The ZS and ZR portions in FIG. 23A have a function of moving the center of gravity of the line image in FIG. 23B to the left. The ZS and ZR portions in FIG. 24A have a function of moving the center of gravity of the line image in FIG. 24B to the right. Therefore, it is understood that the centers of gravity of two images are separated from each other by this filter processing. In this case, since the distance measuring beam is vignetted from its peripheral portion, the distance between the images is smaller than a case in which the distance measuring beam is not vignetted. Therefore, even if the two images are separated from each other, it can be said that the state of the two images comes closer to a state free from vignetting.

Judging from the above characteristics of the filter, in order to convert an image deviation amount into a defocus amount, it is understood that this conversion function must be set as a function of the correction filter. The correction term of the filter for the image deviation sensitivity is defined as the sum of the function of the ZS portion and the function of the ZR portion in accordance with the characteristics of the ZS and ZR portions of the filter. More specifically, the image deviation sensitivity AP free from vignetting of the distance measuring beam is corrected by using the f-number correction coefficients, the pupil position correction coefficients, and the distance measuring field position for determining a correction filter required for image correction, i.e., by obtaining the sum of the product of the f-number correction coefficients 2HVL, 4HVL, 2LVL, and 4LVL and the pupil position correction coefficients 2KVL, 4KVL, 2MVL, and 4MVL and the product of the f-number correction coefficients 1HVR, 3HVR, 1LVR, and 3LVR and the pupil position correction coefficients 1KVR, 3KVR, 1MVR, and 3MVR, and multiplying the resultant sum with the distance measuring field position PF. Therefore, the image deviation sensitivity suitable for this correction filter can be obtained. By these calculations, the image deviation sensitivity can be obtained in consideration of:

① vignetting of the distance measuring beam occurs more easily when the position of the distance measuring field is farther away from the optical axis of the phototaking lens;

② vignetting of the beam occurs more easily when the aperture ratio is increased; and ③ vignetting of the beam occurs more easily when the exit pupil position of the phototaking lens is farther away from the set pupil position of the focus detection optical system.

The description of this subroutine has thus been made. The operation of the defocus detection in FIG. 34 will be described again below.

Figure 52A:
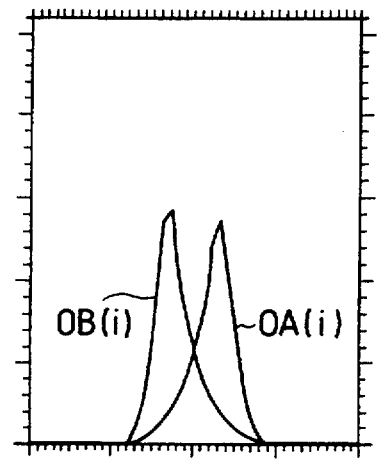
FIGS. 52A to 52C are views showing image data of line images in different imaging states of the phototaking lens, respectively.
Figure 52B:
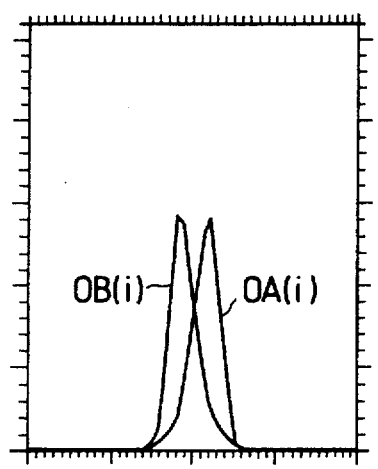
Figure 52C:
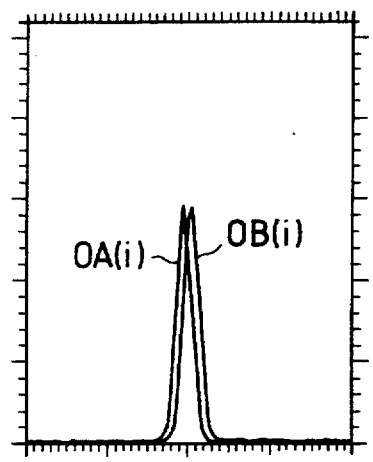

If a diffusion plate is located on the prospective imaging plane of the phototaking lens in the optical path of the focus detection optical system, distance measuring precision is improved for a bright lens having a small f-number. When a dark phototaking lens having a large f-number is mounted on the camera incorporating this focus detection apparatus, the distance measuring beam is vignetted. For example, image data shown in FIGS. 52A to 52C are obtained as outputs from the photoelectric conversion element.

FIGS. 52A to 52C and FIGS. 53A and 53B show imaging states of a phototaking lens. The phototaking lens is changed in an order of a front-focus state (FIGS. 52A and 52B), an in-focus state (FIG. 52C), and a rear-focus state (FIGS. 53A and 53B), and line images in the respective states are illustrated. Line images OA(i) and OB(i) are obtained from a pair of picture element arrays. Since the line images are impulse responses of the composite system of the phototaking lens and the distance measuring optical system and can be restored to be symmetrical about the vertical axis, the shapes of the pair of object images formed by the distance measuring optical system can be restored to have a similarity, thereby detecting a relative distance between the two images.

The pair of illustrated line images are reserved from each other, and their shapes can be classified into front- and rear-focus shapes. The degree of spreading of each line image changes in almost proportion to the image deviation amount. Front- and rear-focus blurred image correction filters shown in FIGS. 49A and 49B are prepared, and the filter length is appropriately adjusted in accordance with the corresponding defocus amount. Therefore, the line images can be restored to be symmetrical about the vertical axis.

A method of filtering image data through a correction filter while an image deviation amount is unknown is the "defocus calculation" subroutine shown in FIGS. 34 and 35. In this subroutine, in step 100, the value of the relative displacement amount k is sequentially changed, and the correlation evaluation amounts (equations (1) and (2)) of the paired images are obtained while image correction is being performed using the correction filters as a function of the amount k.

FIGS. 54A to 54C and FIGS. 55A and 55B are views showing the shapes of correction filters for various k values. FIGS. 54A to 54C and FIGS. 55A and 55B show filters for appropriately correcting the line images in FIGS. 52A to 52C and FIGS. 53A and 53B. The relative evaluation amount is obtained for one line image by causing such a filter to act on this line image. When the relative displacement amount k is different from the actual image deviation amount, image correction becomes inappropriate. However, when the relative displacement amount k is gradually changed to come close to the actual image deviation amount, image correction comes close to an appropriate state accordingly. An optimal image correction state can be obtained when the relative displacement amount k is closest to the actual image deviation amount. Therefore, to find a relative displacement amount k corresponding to the zero relative evaluation amount is to find an optimal image correction filter. When appropriate correction filters act on line images, the line images are obtained as shown in FIGS. 56A to 56C and FIGS. 57A and 57B, thereby satisfactorily achieving symmetry of the line images about the vertical axis. As a result, each pair of images are similar to each other, and it is possible to obtain a distance between the two images with high precision. As previously described, if the line images are corrected in this manner, a general object image can also be corrected to two similar images.

Figure 53A:
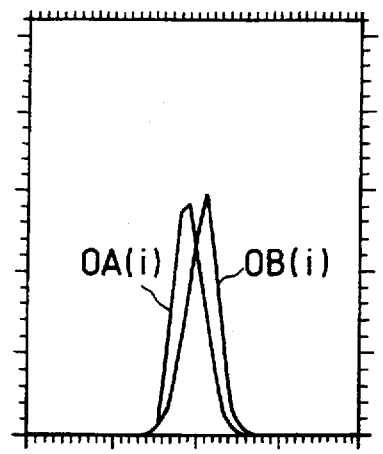
FIGS. 53A and 53B are views showing image data of line images in different imaging states of the phototaking lens.
Figure 53B:
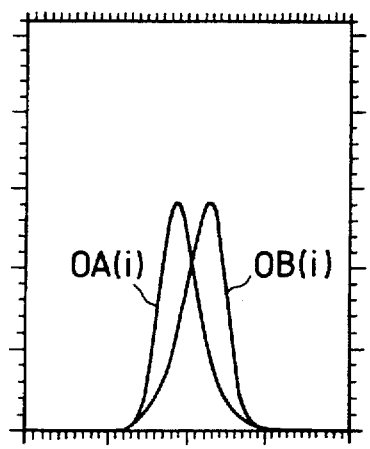
Figure 54A:
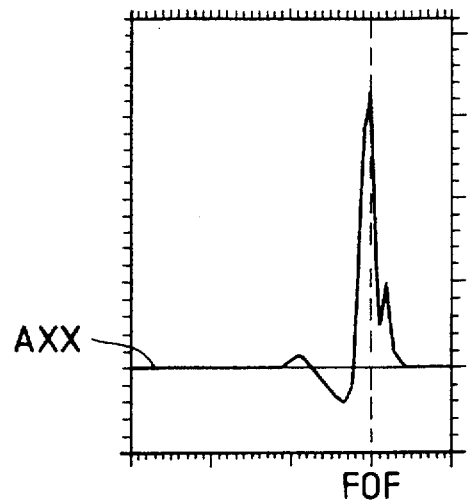
FIGS. 54A to 54C are views showing a defocused image correction filter.
Figure 54B:
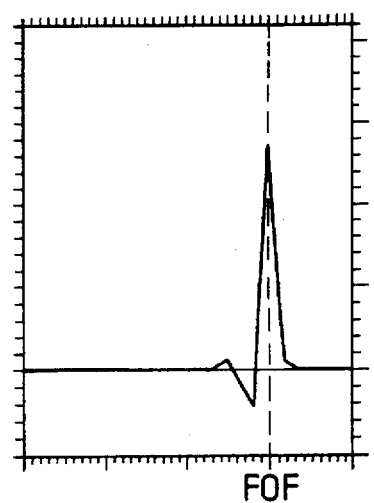
Figure 54C:
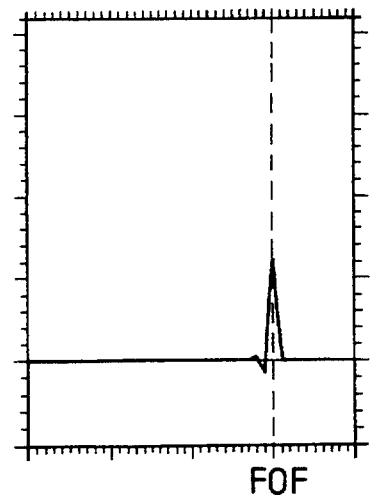
Figure 55A:
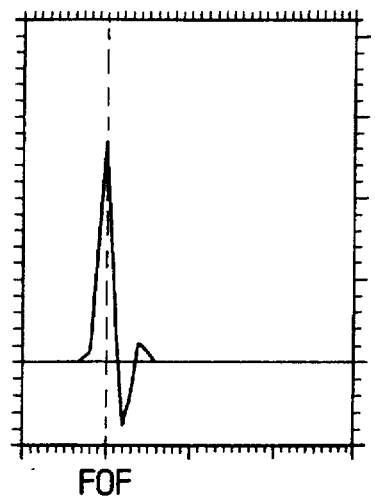
FIGS. 55A and 55B are views showing another defocused image correction filter.
Figure 55B:
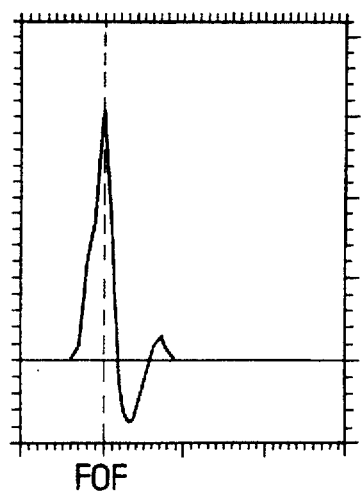
Figure 56A:
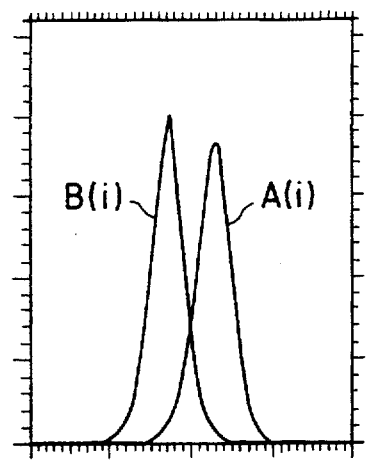
FIGS. 56A to 56C are views showing image data of corrected line images.
Figure 56B:
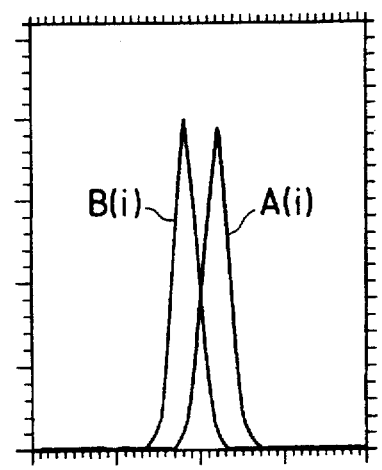
Figure 56C:
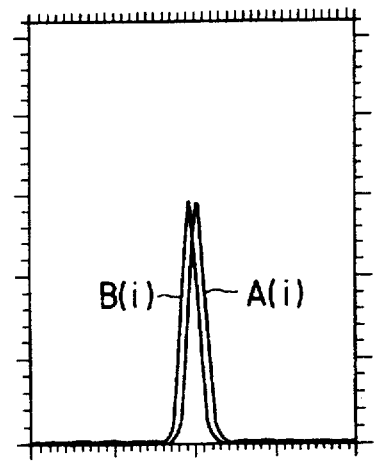
Figure 58A:
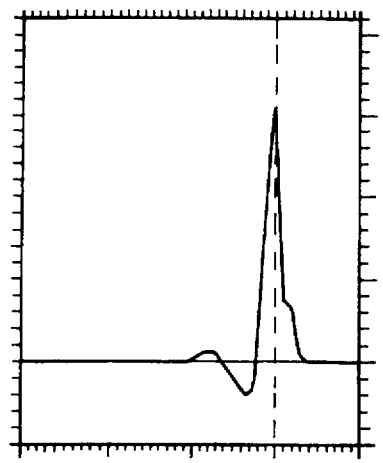
FIGS. 58A to 58D are views showing a defocused image correction filter, and image data of corrected line images.
Figure 58B:
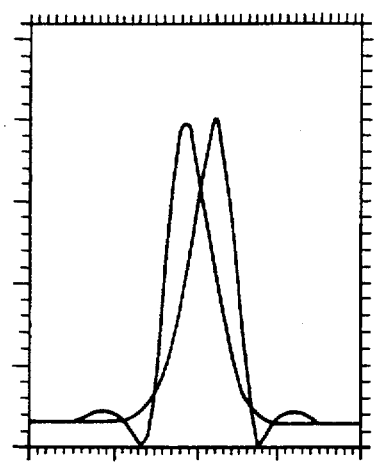
Figure 58C:
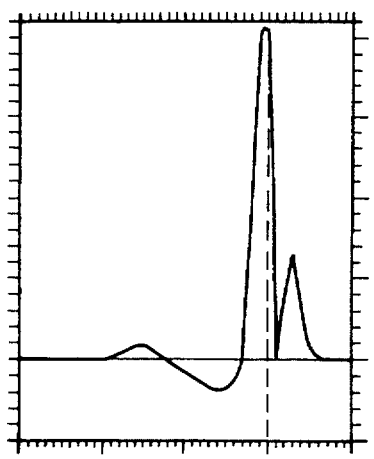
Figure 58D:
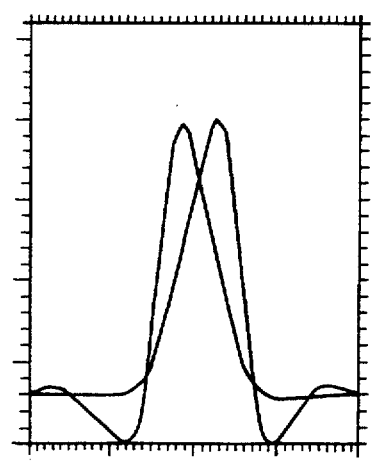

On the other hand, FIGS. 58A to 58D show states in which inappropriate correction filters act on the line images shown in FIG. 53B when the relative displacement amount k is sequentially changed. FIGS. 58A and 58C show correction filters different from that of FIG. 55B, and FIGS. 58B and 58D show images corrected by these correction filters. In this manner, when the relative displacement amount k is greatly different from the deviation amounts of the two images, the corrected images have a small degree of similarity. A change in relative evaluation amount with a relative displacement of the image becomes conspicuous.

In step 130 of the "defocus calculation" subroutine in FIGS. 34 and 35, a more accurate correction filter is produced using the relative displacement amount PR' in units of sub-picture elements obtained in interpolation, and the final image deviation amount is calculated by the most correlation calculation while the shape of the correction filter is fixed.

Figure 57A:
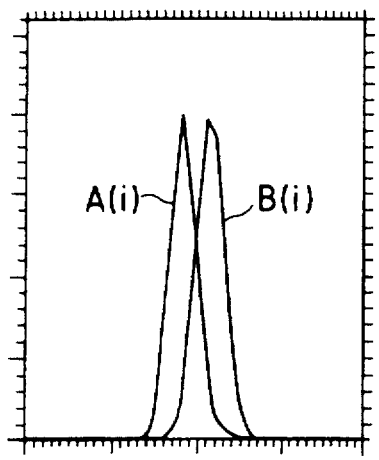
FIGS. 57A and 57B are views showing image data of other corrected line images.
Figure 57B:
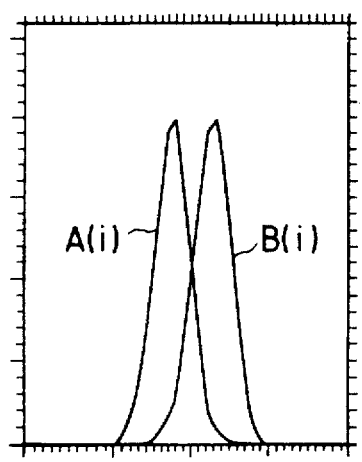
Figure 59:
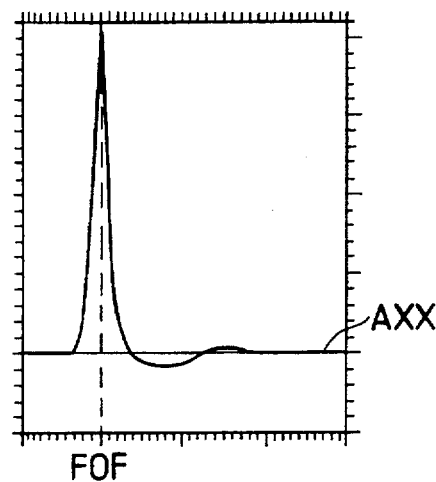
FIG. 59 is a view of a correction filter corresponding to a bright phototaking lens having a small f-number when this bright phototaking lens is mounted on a camera body.

In order to obtain a correction filter suitable for various conditions for determining the degree of vignetting of the distance measuring beam, the horizonal and vertical axes of the original filter are enlarged or reduced ("execution filter production" subroutine) on the basis of the f-number correction coefficients 1HVR to 4HVR, 1HVL to 4HVL, 1LVR to 4LVR, and 1LVL to 4LVL and the pupil position correction coefficients 1KVR to 4KVR, 1KVL to 4KVL, 1MVR to 4MVR, and 1MVL to 4MVL which are obtained as a function of the open f-number, the exit pupil positions, and the distance measuring field position. For example, FIG. 59 shows a correction filter corresponding to a bright phototaking lens having a small f-number. In this case, slight vignetting is still present, and the relative displacement amount in FIG. 57B is assumed. This filter is obtained such that the length of the original filter is caused to correspond to the relative displacement amount, the ZR portion is enlarged in the horizontal axis direction and reduced in the vertical axis direction, and the ZS portion is reduced in the horizontal axis direction.

The above description exemplifies the defocus detection method utilizing image correction in the distance measuring optical system having the diffusion plate in the optical path. This defocus detection method is not limited to this distance measuring optical system, but is applicable to various other distance measuring optical systems.

For example, in the conventional distance measuring optical system obtained by omitting the diffusion plate 42 from the distance measuring optical system shown in FIG. 1, this defocus detection is effective when a considerably dark phototaking lens is mounted and the distance measuring beam is vignetted. For this reason, the following combination may be proposed. That is, a distance measuring optical system is arranged such that a distance measuring beam is not vignetted by a phototaking lens having an open f-number of 5.6 or less. The conventional distance measurement is performed for a phototaking lens having an open f-number of 5.6 or less. However, when a phototaking lens having an open f-number of more than 5.6 is mounted, the above image correction is performed to detect a defocus amount.

If this conventional distance measuring optical system has an aperture as shown in FIG. 3, strictly speaking, the shapes of two pairs of blurred images are not symmetrical with each other due to the following reason. The shapes of the aperture openings 48a and 48b do not overlap each other when one of the openings is translated to the other. The blurred images behave as if the outer side of the rectangular opening is vignetted in an arcuated shape. Therefore, as described above, the image can be corrected later in the filter processing. Note that the correction filter is different from that described above except that the correction filter is formed not as a function of the f-number and exit pupil position of the phototaking lens, and the distance measuring field position.

According to the embodiment described above,
(a) since vignetting of the distance measuring beam is allowed, the limitations of the aperture ratio of the imaging optical system in the conventional focus detection apparatus can be relaxed, and focus detection of a dark imaging lens having a large f-number can be performed.

In particular, in a focus detection apparatus having an improved distance measuring optical system having a diffusion plate in the optical path of a distance measuring optical system, distance measuring precision as the characteristic feature of this apparatus can be achieved for a bright imaging lens. At the same time, focus detection can be performed for even a dark imaging lens in which the distance measuring beam is conventionally vignetted.

(b) Even if the distance measuring beam is vignetted, distance measurement can be performed. The distance measuring field can be located at an arbitrary position within the phototaking frame without darkening the beam incident on the focus detection optical system.

(c) Accurate image correction can be performed even if the imaging lens is set in the front- or rear-focus state. As a result, focus detection precision can be remarkably improved.

Accurate defocus detection can be performed regardless of the imaging states of the imaging optical system. The nun%bet of times of driving the lens to achieve the in-focus state can be reduced.

(d) All the correction filters can be produced in accordance with the aperture ratios of phototaking lenses on the basis of two original filters.

Accurate defocus detection can be performed regardless of the aperture ratio of the imaging optical system. The number of times of driving the lens to achieve the in-focus state can be reduced.

In addition, if the correction filter is calculated as a function of the aperture ratio, the volume of information required to be stored in the focus detection apparatus can be minimized, and a small ROM can be used, resulting in low cost. In particular, a great effect can be obtained for industrial equipment such as cameras having restricted costs.

(e) Since all the correction filters can be produced in accordance with the exit pupil position of the phototaking lens on the basis of the two original filters, focus detection can be performed for imaging lenses having different exit pupil positions.

Accurate defocus detection can be performed regardless of the exit pupil position of the imaging optical system. The number of times of driving the lens to achieve the in-focus state can be reduced.

In addition, if the correction filter is calculated as a function of the exit pupil position, the volume of information required to be stored in the focus detection apparatus can be minimized, and a small ROM can be used, resulting in low cost. In particular, a great effect can be obtained for industrial equipment such as cameras having restricted costs.

(f) In focus detection of a dark imaging lens having a large f-number, the filter in the "A2" processing step is determined on the basis of the image deviation amount obtained in the "A1" processing step. The accurate correction filter can be produced in the "A2" processing step. The image deviation amount can be calculated with high precision. Therefore, the restrictions as to the aperture ratio of the imaging optical system can be relaxed, unlike the conventional focus detection apparatus.

(g) Even if the relative displacement amount is zero, the digital filter is arranged to correct the first and second signals. A slight image noncoincidence in the in-focus state can be corrected. In the focus detection of a dark imaging lens having a large f-number and a large vignetting amount of the distance measuring beam, the images can coincide with each other with high precision.

As a result, the restrictions as to the aperture ratio of the imaging optical system can be relaxed, unlike the conventional focus detection apparatus, and focus detection of a dark imaging lens having a large f-number can be performed.

An accurate defocus amount of the imaging optical system can be detected regardless of whether the in-focus state is obtained. The number of times of driving the lens to achieve the in-focus state can be reduced.

(h) In focus detection of a dark imaging lens having a large f-number, the filter in the "B2" processing step is determined on the basis of the image deviation amount obtained in the "B1" processing step. In addition, the correction filter is fixed in the "B2" processing step regardless of the relative displacement of the image signal. The weighting coefficients of the evaluation amounts at the respective relative displacements obtained by interpolation of the evaluation amounts representing the coincidence between the signals in units of sub-picture elements do not change, and high-precision evaluation amounts can be obtained. Therefore, the restrictions as to the aperture ratio of the imaging optical system can be relaxed, unlike the conventional focus detection apparatus, and focus detection of a dark imaging lens having a large f-number can be performed.

Accurate defocus detection can be performed regardless of the aperture ratio of the imaging optical system. The number of times of driving the lens to achieve the in-focus state can be reduced.

(i) All the correction filters can be produced in accordance with the distance measuring field positions of phototaking lenses on the basis of two original filters. Focus detection in a plurality of distance measuring fields can be performed for imaging lenses having different aperture ratios.

In addition, if the correction filter is calculated as a function of the distance measuring field position, the volume of information required to be stored in the focus detection apparatus can be minimized, and a small ROM can be used, resulting in low cost. In particular, a great effect can be obtained for industrial equipment such as cameras having restricted costs.

(j) Since the length of the correction filter adaptive to a given focus amount is decreased when the defocus amount is decreased, the number of picture elements used in the defocus calculation is smaller than that of the actual image signal by five picture elements at each end of the actual image signal. When the defocus amount is several millimeters or less, a filter corresponding to a small defocus amount can be operated without any error. Therefore, accurate defocus detection can be performed, and the number of times of driving the lens to achieve the in-focus state can be reduced.

Since vignetting of the distance measuring beam is allowed, the limitations of the aperture ratio of the imaging optical system in the conventional focus detection apparatus can be relaxed, and focus detection of a dark imaging lens having a large f-number can be performed.

(k) Since the correction filter having the above-mentioned arrangement is used, the corrected images do not excessively come close to the original line. The high-frequency component of the original image data is not excessively amplified, and the right and left tails of the image signal can be set equal to each other. Therefore, even if random noise caused by thermal noise is superposed on image data, distance measuring precision is rarely degraded.

Since vignetting of the distance measuring beam is allowed, the limitations of the aperture ratio of the imaging optical system in the conventional focus detection apparatus can be relaxed, and focus detection of a dark imaging lens having a large f-number can be performed.

(l) The calculation time for producing the correction filters can be halved as compared with a case in which correction filters for the two images are independently produced.

Since vignetting of the distance measuring beam is allowed, the limitations of the aperture ratio of the imaging optical system in the conventional focus detection apparatus can be relaxed, and focus detection of a dark imaging lens having a large f-number can be performed.

In addition, since the correction filter for one image can be produced from that for the other image, the volume of information required to be stored in the focus detection apparatus can be minimized, and a small ROM can be used, resulting in low cost. In particular, a great effect can be obtained for industrial equipment such as cameras having restricted costs.

What is claimed is:

1. A focus detection apparatus comprising an optical system for forming first and second optical distributions associated with object images whose relative positional 1. relationship is changed in accordance with an imaging state of an imaging optical system subjected to focus detection, photoelectric converting means, having a plurality of picture elements, for outputting first and second signals respectively corresponding to the first and second optical distributions, and calculating means for performing filter processing of the first and second signals, wherein the first and second signals are respectively processed through filters having mutually different characteristics, processed sequentially displacing the first and second signals relative to each other, calculating an evaluation amount representing a coincidence between the first and second signals at the relatively displaced positions, obtaining positional deviations between the first and second object images on the basis of a change in evaluation amount, and detecting the imaging state of the imaging optical system on the basis of the deviations, the filter processing being performed using a filter determined by the relatively displaced positions.

2. An apparatus according to claim 1, wherein said calculating means has a first processing step of producing said filter from first original filter information and a second processing step for producing said filter from second original filter information, and further comprises selecting means for selecting one of the first and second processing steps in accordance with the relative displacement of the first and second signals.

3. A focus detection apparatus comprising an optical system for forming first and second optical distributions associated with object images whose relative positional relationship is changed in accordance with an imaging state of an imaging optical system subjected to focus detection, photoelectric converting means, having a plurality of picture elements, for outputting first and second signals respectively corresponding to the first and second optical distributions, and calculating means for, when the first and second signals are sequentially displaced relative to each other, and an evaluation amount representing a coincidence between the first and second signals at the relatively displaced positions is calculated, performing filter processing of the first and second signals, obtaining deviations between the first and second object images on the basis of a change in evaluation amount, and detecting the imaging state of the imaging optical system, the filter processing, wherein the first and second signals are respectively processed through filters having mutually different characteristics, being performed using a filter determined by an aperture ratio of said imaging optical system subjected to focus detection.

4. A focus detection apparatus comprising an optical system for forming first and second optical distributions associated with object images whose relative positional relationship is changed in accordance with an imaging state of an imaging optical system subjected to focus detection, photoelectric converting means, having a plurality of picture elements, for outputting first and second signals respectively corresponding to the first and second optical distributions, and calculating means for, when the first and second signals are sequentially displaced relative to each other, and an evaluation amount representing a coincidence between the first and second signals, obtaining deviations between the first and second object images on the basis of a change in evaluation amount, and detecting the imaging state of the imaging optical system, the filter processing, wherein the first and second signals are respectively processed through filters having mutually different characteristics, being performed using a filter determined by an exit pupil position of said imaging optical system subjected to focus detection.

5. A focus detection apparatus comprising an optical system for forming first and second optical distributions associated with object images whose relative positional relationship is changed in accordance with an imaging state of an imaging optical system subjected to focus detection, photoelectric converting means, having a plurality of picture elements, for outputting first and second signals respectively corresponding to the first and second optical distributions, and calculating means for, when the first and second signals are sequentially displaced relative to each other, and an evaluation amount representing a coincidence between the first and second signals at the relatively displaced positions is calculated, performing filter processing of the first and second signals, obtaining deviations between the first and second object images on the basis of a change in evaluation amount, and detecting the imaging state of the imaging optical system, wherein said calculating means has a first processing step of performing the filter processing using a filter determined by the relative displacement and a second processing step, performed next to the first processing step, of performing the filter processing using a fixed filter regardless of the relative displacement, and said filter in the second processing step is determined on the basis of the image deviation obtained in the first processing step.

6. A focus detection apparatus comprising an optical system for forming first and second optical distributions associated with object images whose relative positional relationship is changed in accordance with an imaging state of an imaging optical system subjected to focus detection, photoelectric converting means, having a plurality of picture elements, for outputting first and second signals respectively corresponding to the first and second optical distributions, and calculating means for, when the first and second signals are sequentially displaced relative to each other, and an evaluation amount representing a coincidence between the first and second signals at the relatively displaced positions is calculated, performing filter processing of the first and second signals, Wherein the first and second signals are respectively processed through filters having mutually different characteristics, using a filter determined by the relative displacement, obtaining deviations between the first and second object images on the basis of a change in evaluation amount, and detecting the imaging state of the imaging optical system, wherein said filter corrects the first and second signals even when the relative displacement is zero.

7. A focus detection apparatus comprising an optical system for forming first and second optical distributions associated with object images whose relative positional relationship is changed in accordance with an imaging state of an imaging optical system subjected to focus detection, photoelectric converting means, having a plurality of picture elements, for outputting first and second signals respectively corresponding to the first and second optical distributions, and calculating means for, when the first and second signals are sequentially displaced relative to each other, and an evaluation amount representing a coincidence between the first and second signals at the relatively displaced positions is calculated, performing filter processing of the first and second signals, obtaining deviations between the first and second object images on the basis of a change in evaluation amount, and detecting the imaging state of the imaging optical system, wherein said calculating means has a first processing step of performing the filter processing using a filter determined by the relative displacement and a second processing step, performed next to the first processing step, of performing the filter processing using a fixed filter regardless of the relative displacement, and further comprises selecting means for selecting one of the first and second processing steps.

8. A focus detection apparatus comprising an optical system for forming first and second optical distributions associated with object images whose relative positional relationship is changed in accordance with an imaging state of an imaging optical system subjected to focus detection, photoelectric converting means, having a plurality of picture elements, for outputting first and second signals respectively corresponding to the first and second optical distributions, and calculating means for, when the first and second signals are sequentially displaced relative to each other, and an evaluation amount representing a coincidence between the first and second signals at the relatively displaced positions is calculated, performing filter processing of the first and second signals, obtaining deviations between the first and second object images on the basis of a change in evaluation amount, and detecting the imaging state of the imaging optical system, the filter processing being performed using a filter determined by a distance from an optical axis of the imaging optical system subjected to focus detection to a distance measuring field determined by said photoelectric converting means.

9. A focus detection apparatus comprising an optical system for forming first and second optical distributions associated with object images whose relative positional relationship is changed in accordance with an imaging state of an imaging optical system subjected to focus detection, photoelectric converting means, having a plurality of picture elements, for outputting first and second signals respectively corresponding to the first and second optical distributions, and calculating means for, when the first and second signals are sequentially displaced relative to each other, and an evaluation amount representing a coincidence between the first and second signals at the relatively displaced positions is calculated, performing filter processing of the first and second signals using a filter determined by the relatively displaced positions, obtaining image deviations between the first and second object images on the basis of a change in evaluation amount, and detecting the imaging state of the imaging optical system, wherein said filter has only a positive component in one direction and positive and negative components in the other direction with respect to an origin.

10. A focus detection apparatus comprising an optical system for forming first and second optical distributions associated with object images whose relative positional relationship is changed in accordance with an imaging state of an imaging optical system subjected to focus detection, photoelectric converting means, having a plurality of picture elements, for outputting first and second signals respectively corresponding to the first and second optical distributions, and calculating means for, when the first and second signals are sequentially displaced relative to each other, and an evaluation amount representing a coincidence between the first and second signals at the relatively displaced positions is calculated, performing filter processing of the first and second signals, obtaining deviations between the first and second object images on the basis of a change in evaluation amount, and detecting the imaging state of the imaging optical system, wherein said calculating means has a first processing step of performing filter processing of the first signal and a second processing step of performing filter processing of the second signal, and a filter used in the second processing step has characteristics obtained by inverting a filter used in the first processing step.

11. A focus detection apparatus comprising an optical system for forming first and second optical distributions associated with object images whose relative positional relationship is changed in accordance with an imaging state of an imaging optical system subjected to focus detection, photoelectric converting means, having a plurality of picture elements, for outputting first and second signals respectively corresponding to the first and second optical distributions, and calculating means for, when the first and second signals are sequentially displaced relative to each other, and an evaluation amount representing a coincidence between the first and second signals the relatively displaced positions is calculated, performing filter processing of the first and second signals using a filter determined by the relatively displaced positions, obtaining image deviations between the first and second object images on the basis of a change in evaluation amount, and detecting the imaging state of the imaging optical system, wherein said photoelectric converting means has picture elements used in the filter processing, which are located outside picture elements whose outputs are used to calculate the evaluation amounts.

12. A focus detection apparatus comprising an optical system for forming first and second optical distributions associated with object images whose relative positional relationship is changed in accordance with an imaging state of an imaging optical system subjected to focus detection, photoelectric converting means, having a plurality of picture elements, for outputting first and second signals respectively corresponding to the first and second optical distributions, and calculating means for, when the first and second signals are sequentially displaced relative to each other, and an evaluation amount representing a coincidence between the first and second signals at the relatively displaced positions is calculated, performing filter processing of the first and second signals using a filter determined by the relatively displaced positions, obtaining image deviations between the first and second object images on the basis of a change in evaluation amount, and performing a defocus conversion calculation of the image deviation to form a signal representing the imaging state of the imaging optical system, wherein the defocus conversion calculation of the image deviation is a function of an aperture ratio of the imaging optical system subjected to focus detection.

13. A focus detection apparatus comprising an optical system for forming first and second optical distributions associated with object images whose relative positional relationship is changed in accordance with an imaging state of an imaging optical system subjected to focus detection, photoelectric converting means, having a plurality of picture elements, for outputting first and second signals respectively corresponding to the first and second optical distributions, and calculating means for, when the first and second signals are sequentially displaced relative to each other, and an evaluation amount representing a coincidence between the first and second signals at the relatively displaced positions is calculated, performing filter processing of the first and second signals using a filter determined by the relatively displaced positions, obtaining image deviations between the first and second object images on the basis of a change in evaluation amount, and performing a defocus conversion calculation of the image deviation to form a signal representing the imaging state of the imaging optical system, wherein the defocus conversion calculation of the image deviation is a function of an exit pupil position of the imaging optical system subjected to focus detection.

14. A focus detection apparatus comprising an optical system for forming first and second optical distributions associated with object images whose relative positional relationship is changed in accordance with an imaging state of an imaging optical system subjected to focus detection, photoelectric converting means, having a plurality of picture elements, for outputting first and second signals respectively corresponding to the first and second optical distributions, and calculating means for, when the first and second signals are sequentially displaced relative to each other, and an evaluation amount representing a coincidence between the first and second signals at the relatively displaced positions is calculated, performing filter processing of the first and second signals using a filter determined by the relatively displaced positions, obtaining image deviations between the first and second object images on the basis of a change in evaluation amount, and performing a defocus conversion calculation of the image deviation to form a signal representing the imaging state of the imaging optical system, wherein the defocus conversion calculation of the image deviation is a function of a representative distance from an optical axis of said imaging optical system subjected to focus detection to a distance measuring field determined by said photoelectric converting means comprising the plurality of picture elements.

15. A focus detection apparatus comprising:
an optical system for forming first and second optical distributions associated with object images whose relative positional relationship is changed in accordance with an imaging state of an imaging optical system;
photoelectric converting means, having a plurality of picture elements, for outputting first and second signals respectively corresponding to the first and second optical distributions;
filter processing means for employing filter-processing wherein the first and second signals are respectively processed through filters having mutually different characteristics; and
detection means for detecting a focal point state of said imaging optical system on the basis of the first and second signals to which said filter-processing is applied.

* * * * *

UNITED STATES PATENT AND TRADEMARK OFFICE
CERTIFICATE OF CORRECTION

PATENT NO. : 5,367,153
DATED : November 22, 1994
INVENTOR(S) : YASUO SUDA, ET AL.

It is certified that error appears in the above-indentified patent and that said Letters Patent is hereby corrected as shown below:

<u>COLUMN 4</u>

Line 65, "FIG." should read --FIGS.--.

<u>COLUMN 8</u>

Line 38, "vignet" should read --vignette--.

<u>COLUMN 31</u>

Line 66, 1KVFR" should read --1KVR--.

<u>COLUMN 40</u>

Line 56, "nun%bet" should read --number--.

Signed and Sealed this

Thirtieth Day of May, 1995

Attest:

BRUCE LEHMAN

Attesting Officer

Commissioner of Patents and Trademarks